United States Patent
Pfister et al.

(10) Patent No.: US 11,732,133 B2
(45) Date of Patent: Aug. 22, 2023

(54) PROCESS FOR PRODUCING A THREE-DIMENSIONAL OBJECT

(71) Applicant: EOS GmbH Electro Optical Systems, Krailling (DE)

(72) Inventors: Andreas Pfister, Fürth (DE); Andreas Hotter, Rosenheim (DE); Peter Keller, Krailling (DE); Karl Freihart, Neuried (DE)

(73) Assignee: EOS GmbH Electro Optical Systems, Krailling (DE)

( * ) Notice: Subject to any disclaimer, the term of this patent is extended or adjusted under 35 U.S.C. 154(b) by 894 days.

(21) Appl. No.: 16/607,473

(22) PCT Filed: Apr. 25, 2018

(86) PCT No.: PCT/EP2018/060629
§ 371 (c)(1),
(2) Date: Oct. 23, 2019

(87) PCT Pub. No.: WO2018/197577
PCT Pub. Date: Nov. 1, 2018

(65) Prior Publication Data
US 2020/0140706 A1    May 7, 2020

(30) Foreign Application Priority Data

Apr. 25, 2017 (DE) .......................... 102017206963.5

(51) Int. Cl.
*B29C 64/153* (2017.01)
*C08L 79/08* (2006.01)
(Continued)

(52) U.S. Cl.
CPC ............ *C08L 79/08* (2013.01); *B29C 64/153* (2017.08); *B33Y 10/00* (2014.12); *B33Y 70/00* (2014.12);
(Continued)

(58) Field of Classification Search
None
See application file for complete search history.

(56) References Cited

U.S. PATENT DOCUMENTS

| 5,730,925 A | 3/1998 | Mattes et al. | |
| 2011/0311821 A1* | 12/2011 | Kaiso ..................... | C08J 3/14 521/90 |

(Continued)

FOREIGN PATENT DOCUMENTS

| CN | 102388088 | 3/2012 |
| CN | 102863784 | 1/2013 |

(Continued)

OTHER PUBLICATIONS

International Search Report for Application No. PCT/EP2018/060629, dated Jul. 17, 2018, 3 pages.

(Continued)

Primary Examiner — Mohammad M Ameen
(74) Attorney, Agent, or Firm — Seyfarth Shaw LLP

(57) ABSTRACT

A process for producing a three-dimensional object by selectively layer-by-layer solidification of a powdery material layer at the locations corresponding to the cross-section of the object in a respective layer by exposure to electromagnetic radiation. The powdery material comprises at least one polymer which is obtainable from its melt only in substantially amorphous or completely amorphous form, or a polyblend which is obtainable from its melt only in substantially amorphous or completely amorphous form. The powdery material has a specific melting enthalpy of at least 1 J/g.

28 Claims, 23 Drawing Sheets

(51) Int. Cl.
*B33Y 10/00* (2015.01)
*B33Y 70/00* (2020.01)
*C09D 11/037* (2014.01)
*C09D 11/102* (2014.01)
*B29K 79/00* (2006.01)
*B29K 105/00* (2006.01)
*B29K 507/04* (2006.01)

(52) U.S. Cl.
CPC .......... *C09D 11/037* (2013.01); *C09D 11/102* (2013.01); *B29K 2079/085* (2013.01); *B29K 2105/0032* (2013.01); *B29K 2105/0094* (2013.01); *B29K 2105/251* (2013.01); *B29K 2507/04* (2013.01); *B29K 2995/0063* (2013.01)

(56) References Cited

U.S. PATENT DOCUMENTS

| | | |
|---|---|---|
| 2013/0012643 A1 | 1/2013 | Monsheimer et al. |
| 2014/0275365 A1 | 9/2014 | Kalayaraman et al. |
| 2015/0252190 A1 | 9/2015 | Rodgers et al. |
| 2015/0259530 A1 | 9/2015 | Rodgers et al. |
| 2017/0028632 A1* | 2/2017 | Cox ........................ B33Y 10/00 |
| 2018/0178413 A1* | 6/2018 | Kalyanaraman ...... B29C 64/153 |
| 2018/0244863 A1* | 8/2018 | Leenders ................ C08L 69/00 |
| 2020/0048481 A1* | 2/2020 | Pai-Paranjape ....... B29C 64/153 |

FOREIGN PATENT DOCUMENTS

| | | |
|---|---|---|
| CN | 105189617 | 12/2015 |
| CN | 106170506 | 11/2016 |
| DE | 19514740 | 4/1996 |
| EP | 0401606 | 12/1990 |
| EP | 2123430 | 11/2009 |
| WO | 2016209870 | 12/2016 |
| WO | WO-2016-209870 A1 * | 12/2016 |
| WO | 2017033146 | 3/2017 |
| WO | 2018119409 | 6/2018 |

OTHER PUBLICATIONS

Nelson et al., Journal of Applied Polymer Science, 1991, vol. 42, pp. 1289-1296, 8 pages.
Falkai and Hinrichsen, J. Polym. Sci. Polym. Symp., 58, 1977, pp. 225-235—abstract-wiley-library, 3 pages.
Schmid M., Selektives (SLS) mit Kunststoffen. München 2015. Kapitel 4, pp. 67-103, 50 pages.
Translation of relevant parts of Schmid M., Selektives (SLS) mit Kunststoffen. München 2015. Kapitel 4, pp. 67-104, 12 pages.
Wikipedia: Kristallisation (Polymer), 14 pages.
Wikipedia_Crystallization of polymers, 7 pages.

* cited by examiner

PROCESS FOR PRODUCING A THREE-DIMENSIONAL OBJECT

TECHNICAL FIELD OF THE INVENTION

The present invention relates to a process for producing a three-dimensional object by selective layer-by-layer solidification of a powdery material. Further, the invention relates to a process for producing such a powdery material, such a powdery material and a three-dimensional object made of such a powdery material.

BACKGROUND OF THE INVENTION

Processes of producing a three-dimensional object by selective layer-by-layer solidification of a powdery material are used for example in rapid prototyping, rapid tooling and additive production. An example of such a process is known as "selective laser sintering" or "selective laser melting". This involves repeatedly applying a thin layer of a powdery material within a construction area and selectively solidifying the powdery material in each layer by selective radiation with a laser beam, i.e. powdery material is melted or completely molten at these points and solidifies to form a composite material. In this way, a three-dimensional object is created. A powdery material comprising a polymer can be used.

For example, the publication DE 195 14 740 C1 describes a process for producing a three-dimensional object using selective laser sintering and a device for carrying out this process.

EP 2 123 430 A1 describes a process for producing a three-dimensional object with specific and adjustable crystallinity by selective sintering of a powder using electromagnetic radiation such as laser radiation. The powder contains a polymer or copolymer from the class of polyaryletherketones (PAEK).

Plastics/polymers which are obtainable from their melt only in substantially amorphous or completely amorphous form are, for example, the polyetherimides mentioned in EP 0 401 606 A1 with the trade names Ultem® (e.g. "Ultem® 1000", "Ultem® 5001" and "Ultem® 6000").

In NELSON, K. M., et al., Solvent-Induced Crystallization in Polyetherimide Thermoplastics and Their Carbon Fiber Composites, Journal of Applied Polymer Science, 1991, Vol. 42, pages 1289-1296 it is described to treat a polyetherimide film with dichloromethane or N-methylpyrrolidone, whereby crystallization takes place in the polyetherimide, which does not crystallize from the melt.

WO 2016/209870 describes a process for producing a three-dimensional object by powder-bed fusion of polymer powder, in which a first amorphous polymer is converted into an at least semi-crystalline polymer powder and then the at least semi-crystalline polymer powder is formed into the three-dimensional object, for example by selective laser sintering (SLS), which comprises a second amorphous polymer. In the example, amorphous polycarbonate, which had a mean particle size of 234 µm by grinding, is treated in acetone for about 30 minutes, and after removing the acetone, the polycarbonate powder, which was agglomerated, was subjected to a further grinding process to break up the agglomerates. The resulting powder had an almost unchanged mean particle size (237 µm) and had to be sieved to obtain a suitable fraction with a mean particle size of 41 µm in an SLS process.

In another example, polyetherimide is obtained by polycondensation in ortho-chlorobenzene solvent from which the polymer product precipitates. The dried polyetherimide powder was then ground to a mean particle size of 15 µm. Such a low mean particle size is unfavorable for an application in the additive production by powdery polymers, since a satisfactory coating and structuring of parts is hardly possible due to strong electrostatic charging effects, at least without the addition of a very high amount of flow additives/anticaking agents. Furthermore, such fine plastic powders usually have extremely low minimum ignition energies, which can necessitate powder handling in a protective gas atmosphere, even outside the additive production system. Furthermore, this patent document does not discuss which melting enthalpy of a polymer is advantageous for processing in the additive production process.

WO 2017/033146 describes the production of partly crystalline polycarbonate by dissolving amorphous polycarbonate in halogenated hydrocarbon and adding a miscible, crystallizing non-solvent to the solution while stirring strongly.

Documents WO 2016/209870 and WO 2017/033146 do not deal with the special features relevant to processes for producing a three-dimensional object, which concern the selective layer-by-layer solidification of a powdery material.

A challenge in the production of three-dimensional objects using one of the known processes of selective layer-by-layer solidification of a powdery material is to produce them with sufficient precision. A further challenge is to specifically endow the three-dimensional objects produced in this way with the desired material properties.

SUMMARY OF THE INVENTION

One object of this invention is to provide an improved or alternative process for producing a three-dimensional object by selective layer-by-layer solidification of a powdery material. In particular, it is preferred to provide a process for producing a three-dimensional object with improved properties, such as lower porosity, higher transparency, better dimensional stability and/or better shape retention, without simultaneously reducing the mechanical properties. Accordingly, a further object of the present invention is to provide a powdery material with which such an improved process can be carried out. A further object of the present invention is to provide a process for producing such a powdery material.

The features defined in the respective sub-claims and the features listed in the description represent further embodiments of the solution principle defined in the independent claims and each further contribute to the achievement of the surprising effects and unexpected benefits described below.

The invention makes it possible, in a manner not conventionally considered or expected, in the process of producing a three-dimensional object by selective layer-by-layer solidification of a powdery material comprising a polymer (homopolymer, copolymer or polyblend), to combine the advantages of a melt-amorphous material for the solidification process with the advantages of a semi-crystalline powdery material for the process of fusing or melting by means of electromagnetic radiation, without combining the disadvantages of a non-melt-amorphous material—i.e. a material that forms crystalline proportions when solidified from the melt. Thus it is achieved that the powdery material in accordance with the invention shows the behavior of a semi-crystalline polymer material during the production of a three-dimensional object during fusing or melting by means of electromagnetic radiation, and then shows the behavior of an amorphous polymer material during re-solidification (solidification), thus achieving a combination effect which hitherto had not been considered possible in the conventional manner.

One advantage of using an initially semi-crystalline polymer material in accordance with the invention, but with a melt-amorphous solidification behavior, is for example that when using such a polymer material in the course of selective layer-by-layer solidification by means of electromagnetic radiation, no volume change associated with crystallization, in particular no crystallization shrinkage, does occur. Due to the typical dependence of the specific volume of a polymer on the degree of crystallization, the use of polymers which would not be melt-amorphous during the solidification process from the melt would result in a change in volume if the melt formed by the action of electromagnetic radiation solidified. Typically, this would reduce the volume (so-called "crystallization shrinkage"). A volume change occurring in the course of solidification would, for example, impair the homogeneity of the application of layers of powdery material and thus the process stability of the process for producing a three-dimensional object as well as, among other things, the dimensional stability and shape accuracy of the three-dimensional object produced. The occurrence of a change in volume during solidification is therefore a disadvantage which would occur if non-melt-amorphous polymers were used, and which is avoided when melt-amorphous material is used in accordance with the invention.

When using an initially semi-crystalline polymer in accordance with the invention, but with a melt-amorphous polymer solidification behavior, a change in volume occurs only due to the heat shrinkage (thermal contraction) during cooling of the object after its manufacture. However, this would also occur if a non-melt-amorphous polymer were used; the occurrence of heat shrinkage is therefore not a disadvantage of using a melt-amorphous polymer in accordance with the invention. Heat shrinkage is typically much lower than the crystallization shrinkage that would occur if a non-melt-amorphous polymer was used. For example, when non-melt-amorphous, semi-crystalline polyamide 12 is used for laser sintering (e.g. the product sold by EOS GmbH Electro Optical Systems under the trade name "PA2200") at an appropriate processing temperature (e.g. approximately 175° C.), a xy-shrinkage (change in length in planes parallel to the applied layers of the powdery material in the course of cooling from the processing temperature to room temperature) of 3.2% is observed, whereas when using polymeric material for laser sintering, which is already initially amorphous, an xy-shrinkage of only 1% is observed at an appropriate processing temperature (e.g. approximately 100° C. in the case of the polystyrene material marketed by EOS GmbH Electro Optical Systems under the trade name "Primecast® 101"). For selected melt-amorphous polymers of the polyetherimide type and the polycarbonate type, thermal contraction of only 0.5 to 0.7% occurs in classical processing processes such as injection molding (see, for example, technical data sheets and product brochures on the products marketed by SABIC under the trade names "Ultem®" and "Lexan®").

Further advantages of an initially semi-crystalline material, but with a melt-amorphous polymer solidification behavior, used according to the invention are for example that objects with similarly good mechanical properties (e.g. elongation at break, tensile strength and/or impact strength) and/or with similarly high transparency can be obtained from it by selective layer-by-layer solidification, as is otherwise only the case by means of classical processing methods (e.g. injection molding), but not by using a polymer that is initially semi-crystalline and solidifies from the melt again semi-crystalline, i.e. a polymer that is not melt-amorphous.

A difficulty in laser sintering using a material that does not have the inventive property of melt-amorphousness but forms substantial crystalline parts during solidification could be that, due to the slow cooling rates typical of laser sintering, the degree of crystallization of the produced object would generally be greater than in the case of an object produced by conventional processes such as injection molding. A high degree of crystallization would not only lead to too much crystallization shrinkage, but could also, for example, lead to lower elongation at break and lower tensile strength. This difficulty is avoided in the case of the use of melt-amorphous material according to the invention.

In accordance with the invention, the advantages of the behavior Of a melt-amorphous polymer material for the process of (re-) solidification are combined simultaneously with the advantages of an initially semi-crystalline polymer material, in particular with the advantage of a better melting behavior in comparison with a conventional polymer material which is already substantially amorphous or completely amorphous at the beginning, by selecting the polymer material used in accordance with the invention in such a way that it initially, i.e. before a melting process, exhibits a melting enthalpy typical of an at least semi-crystalline polymer. This melting enthalpy should be at least 1 J/g, preferably at least 2 J/g, more preferably at least 4 J/g, more preferably at least 10 J/g, more preferably at least 20 J/g, in particular at least 40 J/g, and above all at least 80 J/g. If this condition is observed and a suitable polymer is selected, the powdery material, which is initially at least semi-crystalline, can be heated to a processing temperature close to the melting point without sticking. The processing temperature is understood to be the temperature which the build-up material has at a point, at which the build-up material is to be solidified under the influence of electromagnetic radiation, immediately prior to the exposure of the electromagnetic radiation. A processing temperature which is above the ambient temperature can be achieved, for example, by heating the build-up material in the storage tank and/or in a powder heating module and/or in the coater before it is applied to the construction area. Alternatively, or additionally, the build-up material can be heated for example, after application to the construction area, by means of radiant heating.

With an initially substantially amorphous or completely amorphous polymer material, heating to a processing temperature close to the melting point would not be possible. That is, according to the invention and in contrast to an initially substantially amorphous or completely amorphous polymer material, the maximum processing temperature is not at or below the glass transition temperature but above this glass transition temperature and below the melting point. This means, for example, that the polymer material selected according to the invention can be heated to a processing temperature which is relatively just below the temperature which must be achieved by the action of the laser when used for melting or fusing by means of electromagnetic radiation (in particular when using a laser) so that a sufficiently low-viscosity melt is achieved and thus solidification into components with preferred properties (e.g. mechanical properties, density of the built part and/or optical transparency) is possible. In comparison, a processing temperature above the glass transition temperature would cause the material to glue, i.e. aggregates of powder particles would form and the flowability of the powdery material would be reduced during the coating process; furthermore, there would be a tendency that the powdery material would not be able to be applied to the construction area to form a homogeneous layer and would possibly even glue before its application, for example in a storage container and/or in a coater. Furthermore, the powder not melted by the laser (=old powder) would stick strongly in the clip-on frame and/or on the construction platform and would possibly no longer be recyclable, e.g. by sieving. The radiation source, e.g. the laser, therefore is allowed to deliver less energy to obtain a sufficiently low-viscosity melt due to the relatively close processing temperature to the melting point when using the polymer material according to the invention, compared to using a polymer material which is substantially amorphous or completely amorphous by nature; this makes it possible to design the radiation source, e.g. the laser, weaker—i.e. with a lower power density—and/or to carry out the solidification faster. In particular, the invention can prevent the porosity of a manufactured object from being undesirably high, the mechanical properties from being undesirably low and/or areas inside the object from being degraded by the action of a laser beam with very high energy input.

The invention thus achieves to use the advantages of a specially selected and provided, initially at least partially semi-crystalline polymer material, but on the other hand not to dispense with the advantages of melt-amorphous behavior during solidification from the melt.

It goes without saying that polymers selected according to the invention can initially also be completely crystalline. However, since the degree of polymerization of a polymer is usually not 100% or almost 100%, the definition or the term "semi-crystalline" is preferred in the description. The invention principle can be realized not only in the case of semi-crystalline polymers initially, but also in the case of completely or substantially crystalline polymers initially.

According to the invention, the powdery material contains at least one polymer. According to the invention, the term "polymer" refers to homopolymers and copolymers with different types of repeating units as well as polyblends of such homopolymers and/or copolymers. The polymer can only be produced from the melt in a substantially amorphous or completely amorphous form. This means that the polymer crystallizes to a non-substantial extent or not at all when it solidifies from the melt. Such a polymer is also called "melt-amorphous".

According to the invention, copolymers can be statistical copolymers, alternating copolymers, block copolymers or graft copolymers, whereby statistical copolymers are preferred to the other copolymers mentioned in the invention due to their lower tendency to crystallize. In the case of random copolymers, the sequence of repeating units is essentially disordered.

A polyblend (also known as a polymer blend) is a mixture of several polymers. A polyblend can be a single-phase polyblend (homogeneous polyblend) or a multi-phase polyblend (heterogeneous polyblend). In multiphase polyblend, several glass transitions are typically observed by means of dynamic differential calorimetry. Furthermore, in a multi-phase polyblend several melting peaks corresponding to the melting points of the individual phases can be observed by means of dynamic differential calorimetry. In the case of a multi-phase polyblend it may be possible that the maximum processing temperature is below the highest but above the second highest melting point.

Polyblends can be formed from homopolymers and/or copolymers according to the invention.

The term "semi-crystalline" refers to a solid that contains both amorphous and crystalline proportions. With "partially semi-crystalline" a solid is meant which has semi-crystalline and amorphous regions. Preferably, a powdery material is used which comprises a polymer (homopolymer, copolymer or polyblend) which is initially semi-crystalline, but exhibits melt-amorphous behavior when solidified from the melt. The term "initially semi-crystalline" means that the polymer used in the inventive process to produce a three-dimensional object is semi-crystalline prior to the melting process. The initial crystallinity of the polymer is characterized by the specific melting enthalpy of the powdery material, which is at least 1 J/g according to the invention.

A polymer is considered to be substantially amorphous if its degree of crystallinity is 5% or less, in particular 2% or less. A polymer is considered substantially amorphous in particular if no melt peak is detectable by means of dynamic differential calorimetry.

The invention discloses a process for producing a three-dimensional object by selective layer-by-layer solidification of a powdery material at locations corresponding to the cross-section of the object in a respective layer by exposure to electromagnetic radiation, wherein the powdery material comprises at least one polymer which is obtainable from its melt only in substantially amorphous or completely amorphous form, or a polyblend which is obtainable from its melt only in substantially amorphous or completely amorphous form.

According to the invention, the powdery material used in the process provides a specific melting enthalpy of at least 1 J/g, i.e. the powdery material is initially at least partially semi-crystalline. The powdery material provides a specific melting enthalpy of preferably at least 2 J/g, more preferably at least 4 J/g, more preferably at least 10 J/g, more preferably at least 20 J/g, in particular at least 40 J/g and above all at least 80 J/g. In general, a powdery material with a higher specific melting enthalpy is preferred; in this tendency, the advantages described above resulting from the fact that the polymer is initially at least partially semi-crystalline are more pronounced the higher the specific melting enthalpy of the powdery material is.

In accordance with the invention, the selected powdery material preferably comprises at least one of the polymers from the group consisting of polyetherimides, polycarbonates, polyphenylene sulfones, polyphenylene oxides, polyether sulfones, acrylonitrile-butadiene-styrene copolymers (ABS), acrylonitrile-styrene-acrylate copolymers (ASA), polyvinyl chloride, polyacrylates, polyesters, polyamides, polyaryl ether ketones, polyethers, polyurethanes, polyimides, polyamide imides, polysiloxanes, polyolefins and copolymers which have at least two different repeat units of the abovementioned polymers, and/or at least one polyblend based on at least two of the abovementioned polymers and/or copolymers. Using one or more of said polymers (homopolymers, copolymers or polyblends), it is possible to produce a powdery material which is initially at least semi-crystalline but, after solidification from the melt, is substantially or even completely amorphous, whereby the advantageous properties of an initially at least semi-crystalline polymer for the process of melting during sintering by means of electromagnetic radiation can be realized in combination with the advantageous properties of a melt-amorphous polymer for the solidification process.

In a more preferred embodiment, a powdery material comprising a polymer or polyblend is used, wherein the polymer or polyblend is inherently flame-protected and/or the polyblend comprises a flame retardant.

In a special embodiment of the invention, the powdery material based on at least one polyetherimide or a polyblend is selected from at least one polyetherimide and at least one further polymer. It is further preferred according to the invention that the powdery polyblend has a polyetherimide content of at least 1% by weight, preferably at least 10% by weight, more preferably at least 20% by weight, even more preferably at least 30% by weight, and/or of at most 90% by weight, preferably at most 80% by weight, more preferably at most 70% by weight, wherein the polyetherimide content respectively refers to the total content of polymers in the powdery material without taking additives and fillers into account, and wherein in the case of the use of a polyetherimide-containing polyblend, the polyetherimide proportion by weight of a polyetherimide-containing polyblend is included. In this way, the advantageous properties of an initially at least partially semi-crystalline polymer for the process of fusing or melting during sintering by means of electromagnetic radiation in combination with the advantageous properties of a melt-amorphous polymer for the solidification process can be realized in a particularly effective manner.

In a more preferred embodiment, a powdery material is used which comprises a polyblend based at least on a polyetherimide and a polycarbonate, wherein more preferred the said polyetherimide parts being present in such a polyblend. The combination of the abovementioned advantages is then particularly pronounced.

In a more preferred embodiment, a powdery material is used which comprises a polyblend at least based on a polyetherimide and a polycarbonate, wherein the polyetherimide and/or the polycarbonate are inherently flame-protected and/or the polyblend comprises a flame retardant.

In a more preferred embodiment, a powdery material is used which comprises a polyblend at least based on
polycarbonate and ABS or
polycarbonate and ASA or
polycarbonate and ABS and ASA.

Polyblends sold by Covestro under the trade name "Bayblend®" are used as starting materials for the production of such polyblends.

In another preferred embodiment of the invention, a powdery material is used which comprises at least one polyaryletherketone-polyaryletherthersulfone copolymer or a polyblend comprising a polyaryletherketone-polyaiylethersulfone copolymer.

In another preferred embodiment at least one powdery polyblend is used selected from the group consisting of polyblends of polyaryletherketones with polyetherimides, polyblends of polyaryletherketones with polyetherimides and polycarbonates, polyblends of polyaryletherketones with polyimides, polyblends of polyaryletherketones with polyphenylene sulfones, polyblends of polyaryletherketones with polyethersulfones and polyblends of polyaryletherketones with polyarylates.

In a more preferred embodiment, the powdery material comprises a polyetherimide having repeating units A according to the formula

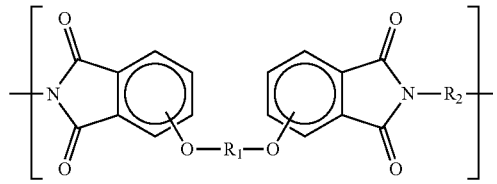

and with repeating units B according to the formula

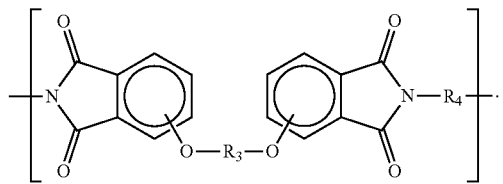

The proportion of repeating units A and the proportion of repeating units B, respectively based on the total content of A and B, is respectively at least 1% and/or at most 99%. Herein $R_1$ and $R_3$ are moieties which are different from each other and which are independently selected from the group consisting of

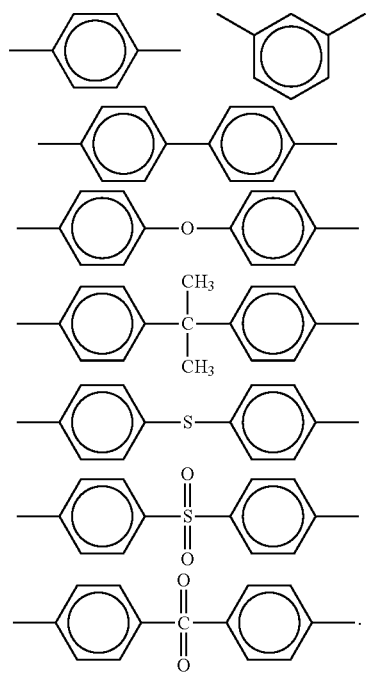

$R_2$ and $R_4$ are moieties which are different from each other and which are independent of each other and independent of $R_1$ and $R_3$ selected from the group consisting of

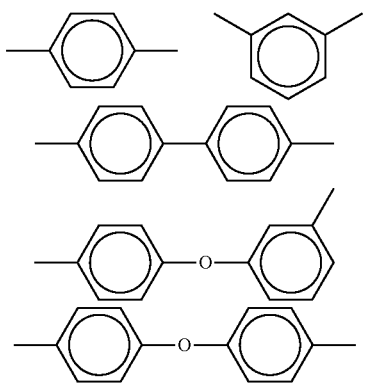

-continued

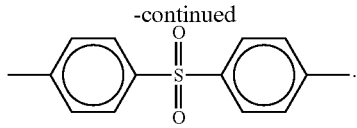

In a more preferred embodiment, the powdery material comprises a polyetherimide having repeating units according to the formula

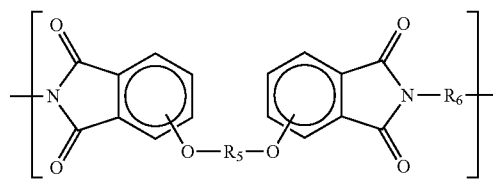

wherein $R_5$ is a moiety selected from the group consisting of

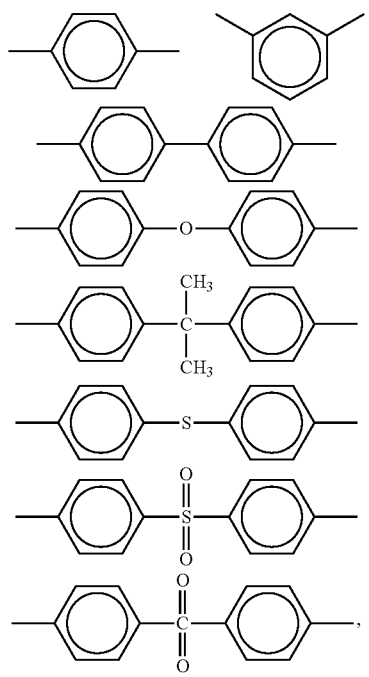

and wherein $R_6$ is a moiety independent of $R_5$ selected from the group consisting of

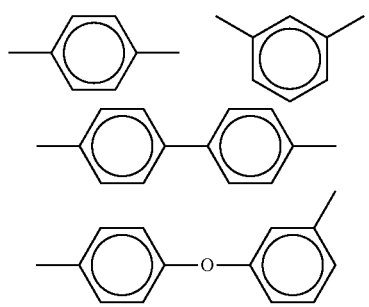

-continued

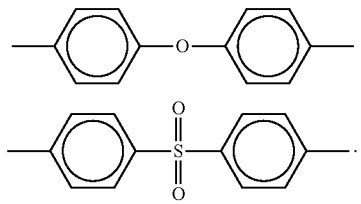

In a more preferred embodiment, the powdery material comprises a polyetherimide having repeating units C according to the formula

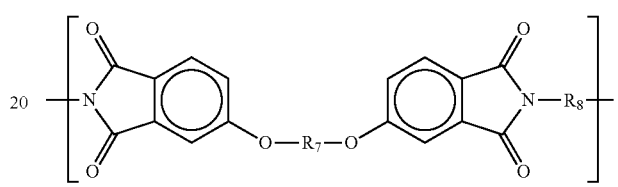

and with repeating units D according to the formula

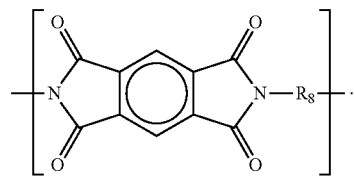

The proportion of repeating units C and the proportion of repeating units D, respectively based on the total content of C and D, shall be respectively at least 1% and/or at most 99%. Herein $R_7$ is a moiety selected from the group consisting of

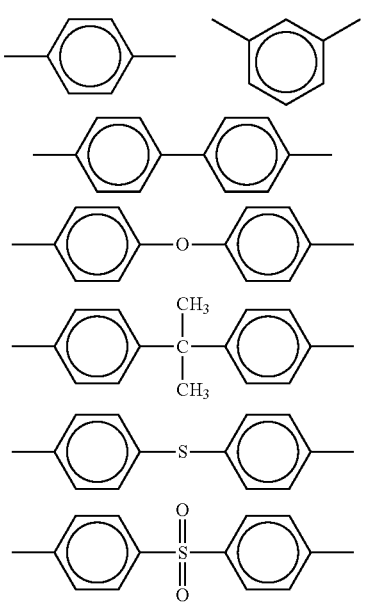

-continued

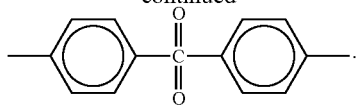

$R_8$ is a moiety independent of $R_7$ selected from the group consisting of

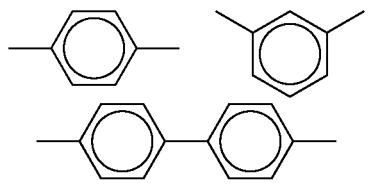

-continued

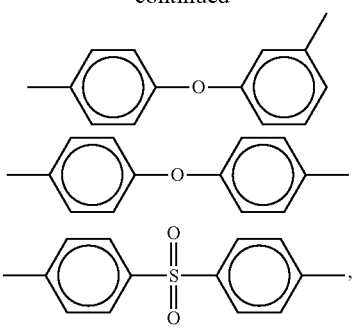

In a more preferred embodiment, the powdery material comprises a polyetherimide-polysiloxane copolymer having repeating units E according to the formula

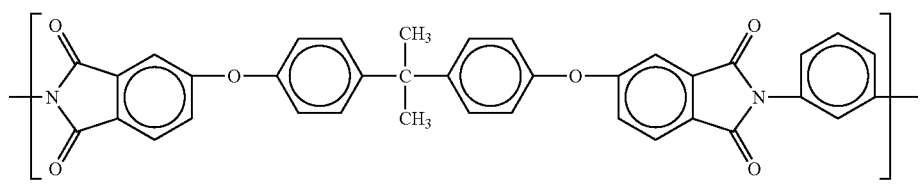

and repeating units F according to the formula

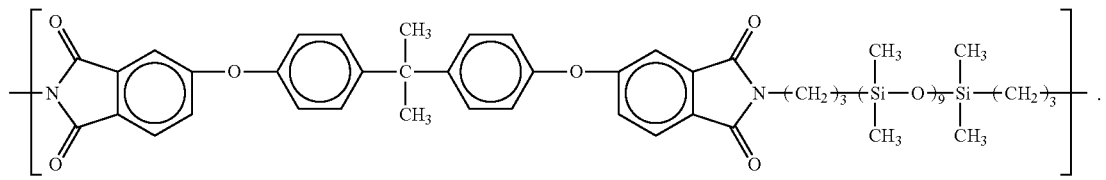

The proportion of the repeating units E and the proportion of the repeating units F, respectively based on the total content of E and F, is respectively at least 1% and/or at most 99%.

The invention has revealed that it is particularly advantageous to use a powdery material containing polyetherimide with repeating units according to the formula

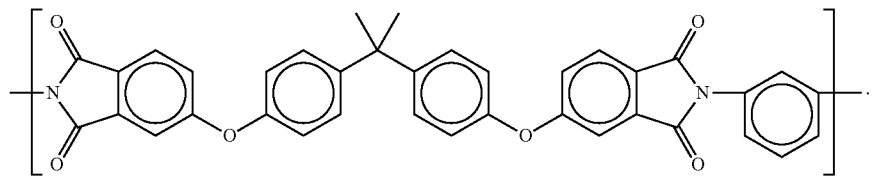

SABIC distributes this polyetherimide, which was used as a starting material in the Ultem® 1000 series, e.g. under the trade names "Ultem® 1000" and "Ultem® 1010". Using this polyetherimide starting material, a powdery material can then be produced particularly effectively in accordance with the invention, in which the polyetherimide is initially at least partially semi-crystalline and, after solidification from the melt, substantially or even completely amorphous. The advantageous combination properties described above for the inventive process are particularly pronounced on the basis of a polymer selected or provided in this way.

Further, correspondingly significant combination effects result when, as is preferred, powdery materials are used which are selected, provided or produced on the basis of the following materials:

a powdery material comprising polyetherimide having repeating units according to the formula

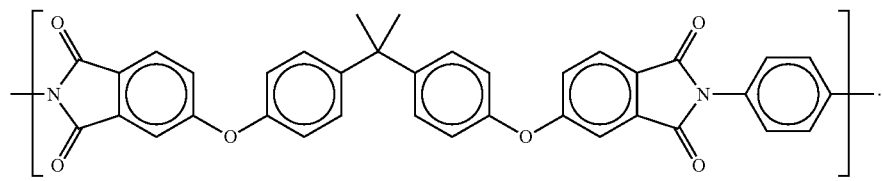

SABIC distributes this polyetherimide used as starting material in the Ultem® 5000 series e.g. under the trade name "Ultem® 5001";

a powdery material comprising polyetherimide having repeating units C according to the formula

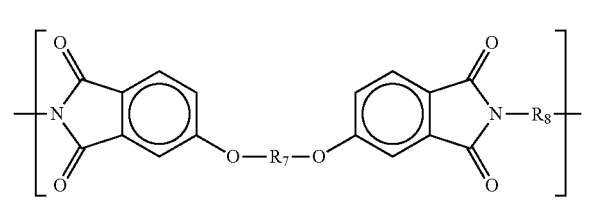

and repeating units D according to the formula

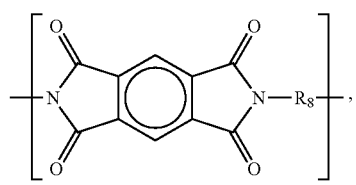

wherein the proportion of the repeating units C and the proportion of the repeating units D, respectively based on the total content of C and D, is respectively at least 1% and/or at most 99%, wherein $R_7$ is

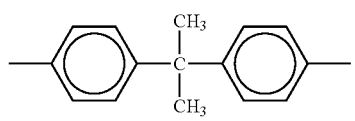

and $R_8$ is

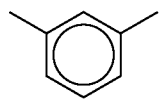

SABIC sells this polyetherimide used as starting material in the Ultem® 6000 series or Extem series e.g. under the trade name "Ultem® 6000";

a powdery material comprising polyetherimide with repeating units according to the formula

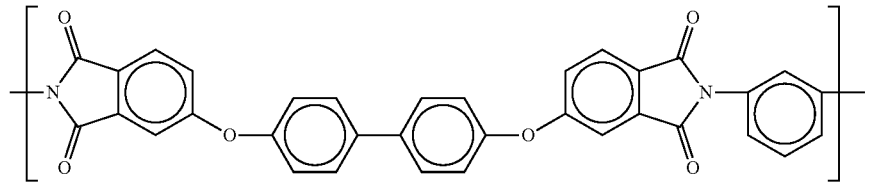

Other polyetherimides preferred as starting materials are marketed by SABIC under the trade names "Ultem® AUT230" and "Ultem® AUT210".

Under the trade name "Ultem®", polyetherimides are sold which are produced from the melt in amorphous form. In the presence of dichloromethane or N-methylpyrrolidone, however, a pronounced crystallinity is obtained. Therefore, these polyetherimides can be used to produce a powdery material in which polyetherimide is initially at least partially semi-crystalline and, after solidification from the melt, substantially or even completely amorphous.

In the context of the invention, it is also advantageously possible to use a powdery material comprising polycarbonate with repeating units according to the formula

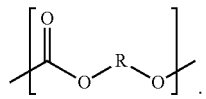

The moiety R may be for instance structural units of the bisphenol type, in particular bisphenol A, bisphenol E, or bisphenol F. The oxygen atoms of the hydroxyl groups of the bisphenols are then the two oxygen atoms bound to R in the above formula. The structural units of the bisphenol type can be substituted, for example on one or both benzene rings and/or on the C atom linking the benzene rings. Substituents may be acyclic or cyclic, saturated or unsaturated or aromatic hydrocarbon units. It is also possible to use a longer-chain, branched or unbranched, substituted or unsubstituted hydrocarbon group or an $SO_2$ group instead of a methylene group linking the benzene rings. Examples for the moiety R are given in BECKER, G. W., and BRAUN, D. (editors), Kunststoff-Handbuch, Munich: Hanser Verlag, 1992, Volume 3/1 (polycarbonates, polyacetals, polyesters, cellulose esters), pages 121-126. In the case of homopolymers all repeating units contain the same moiety R, in the case of copolymers different repeating units contain different moieties R. Using polycarbonate, a powdery material can be produced in which the polycarbonate is initially at least semi-crystalline, with a particularly high melting enthalpy, and after solidification from the melt is substantially or even completely amorphous. The advantageous properties of an initially at least partially semi-crystalline polymer for the process of fusing or melting during melting by means of electromagnetic radiation in combination with the advantageous properties of a melt-amorphous polymer for the solidification process have proved to be particularly pronounced when a powdery material comprising polycarbonate is used.

In a preferred form, the powdery material comprises polycarbonate having repeating units G according to the formula

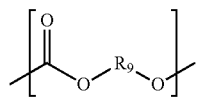

and repeating units H according to the formula

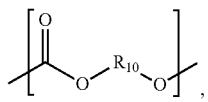

wherein $R_9$ and $R_{10}$ are moieties which are different from each other and which are independently selected from the group consisting of

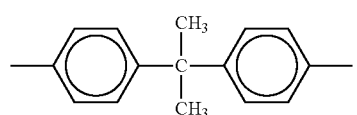

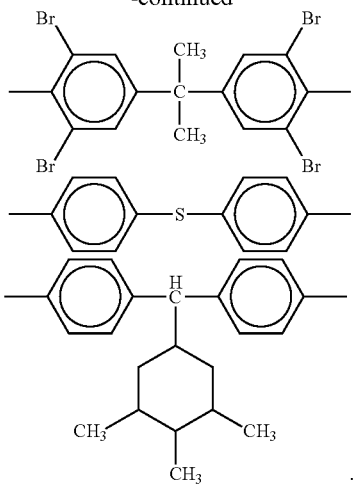

The proportion of the repeating units G and the proportion of the repeating units H, respectively based on the total content of G and H, is respectively at least 1% and/or at most 99%.

In a more preferred embodiment, the powdery material comprises polycarbonate having repeating units according to the formula

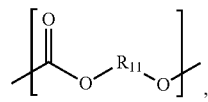

wherein $R_{11}$ is a moiety selected from the group consisting of

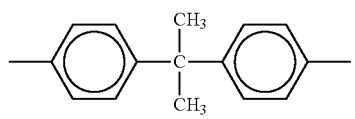

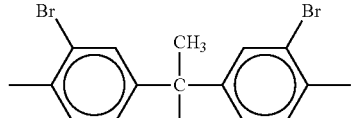

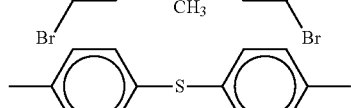

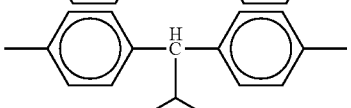

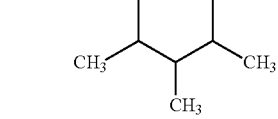

In a particularly preferred embodiment, the polycarbonate is a homopolymer having repeating units according to the formula

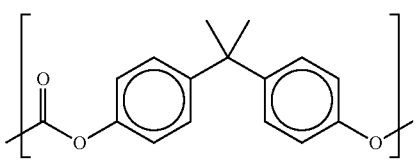

Such a polycarbonate suitable for use as a starting material is marketed by SABIC under the trade name "Lexan®" (e.g. "Lexan® 143R") or by Covestro under the trade name Makrolon®.

In another preferred embodiment, the powdery material comprises a copolymer having carbonate and carboxylic acid ester units, preferably a copolymer having repeating units according to the formula

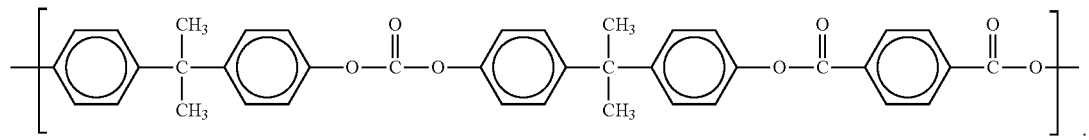

In accordance with the invention, it is still advantageously possible to use the combination effects described above, even if the powdery material additionally contains additives in other preferred embodiments. For example, in addition to the advantages of the additives mentioned above, the material properties of a manufactured three-dimensional object can be better adapted, for example with regard to the requirements of the planned application of the three-dimensional object. Additives can also be used, for example, to adapt the behavior of the polymer material before and/or during the sintering process. For example, additives can improve the flow behavior of the powdery material and thus simplify the application of layers of the polymer material and/or reduce the viscosity of the polymer melt, thus facilitating the merging of the melted powder particles during the sintering process.

For example, in order to obtain as uniform a distribution as possible of the additives in the melt of the polymer material and therefore in the polymer material after its resolidification, it is preferred that the additives are at least partially present in the grain of the powdery material, i.e. that the additives are preferably partially embedded in the particles of the powdery material and are not only present on the surface of these particles or between these particles.

According to the invention, numerous additives can be considered, for example one or more of the following materials: heat stabilizers, oxidation stabilizers, UV stabilizers, fillers, dyes, plasticizers, reinforcing fibers, coloring agents, IR absorbers, $SiO_2$ particles, carbon black particles, carbon fibers, glass fibers, carbon nanotubes, mineral fibers (e.g. wollastonite), aramid fibres (in particular Kevlar fibres), glass beads, mineral fillers, inorganic and/or organic pigments and/or flame retardants (in particular phosphate-containing flame retardants such as ammonium polyphosphate and/or brominated flame retardants and/or other halogenated flame retardants and/or inorganic flame retardants such as magnesium hydroxide or aluminum hydroxide). Polysiloxanes are another particular example of possible additives. Polysiloxanes can be used, for example, as flow additives/anticaking agents to reduce the viscosity of the polymer melt and/or, in the case of polyblends in particular, as plasticizers. In addition, flow additives/anticaking agents can also be added as additives. These flow additives/anticaking agents are preferably added to the powder as dry blend. An example of this is pyrogenic silicon dioxide. The powdery material may also contain several different additives, for example a polycarbonate may contain UV stabilizers and flame retardants.

For the definition of the specific melting enthalpy of the powdery material, the proportion of one or more possible additives (examples of additives are given above and below) in the mass of the powdery material is, according to the invention, preferably not taken into account, i.e. it is preferably only important that the melt-amorphous polymer contained in the powdery material provides a specific melting enthalpy of at least 1 J/g, preferably at least 2 J/g, more preferably at least 4 J/g, more preferably at least 10 J/g, more preferably at least 20 J/g, even more preferably at least 40 J/g, even more preferably at least 80 J/g.

According to the invention, it is possible that an auxiliary material is an additionally used polymer which differs from the polymer described above, which is used for the production of a three-dimensional object. For example, polymer fibres such as aramid fibres, in particular Kevlar fibres, are considered as additives. If such an additional polymer is semi-crystalline, but is not melted during the production of a three-dimensional object, the specific melting enthalpy of this additional polymer is preferably not taken into account within the scope of the invention, i.e. it is preferably only important that the remaining melt-amorphous polymer contained in the powdery material provides a specific melting enthalpy of at least 1 J/g, preferably at least 2 J/g, more preferably at least 4 J/g, more preferably at least 10 J/g, more preferably at least 20 J/g, even more preferably at least 40 J/g, even more preferably at least 80 J/g.

In the case of the use of an additive, the three-dimensional object produced may at least partially consist of a composite material. This comprises, for example, a matrix which has been formed by the re-solidification of the molten polymer material and which therefore has at least substantially amorphous or completely amorphous regions, preferably it is substantially amorphous or completely amorphous. The additive-particles are embedded in the matrix.

According to the invention, it is also possible to selectively solidify the powdery material layer-by-layer by only partially melting the powdery material by means of electromagnetic radiation. This is the case, for example, if the electromagnetic radiation acting on the powdery material is not powerful enough to melt the powdery material completely and/or if the electromagnetic radiation does not act on the powdery material long enough. The three-dimensional object produced can then have different regions, namely regions created by the solidification of molten material on the one hand and regions created by previously non-molten material on the other. Typically, the latter regions correspond to the inner area (core) of particles of the powdery material and the first regions correspond to the outer area (shell) of these particles, i.e. during partial melting typically only the shell of the particles melts. For the invention, it is then only important that the material which is melted solidifies into a substantially amorphous or completely amorphous form, i.e. that the areas of the three-dimensional object which have resulted from the solidification of melted material are substantially amorphous.

In accordance with the invention, it is also advantageously possible to enhance the combination effects described above if, in other preferred embodiments, the molecular weight Mn (number average) of a polymer or the molecular weight Mn of the polymers contained in a polyblend comprised in the powdery material is at least 5,000 u, preferably at least 10,000 u, more preferably 15,000 u to 200,000 u, in particular 15,000 u to 100,000 u, or that the molecular weight Mw (weight average) of these polymers is at least 20,000 u, more preferably 30,000 u to 500,000 u, in particular 30,000 u to 200,000 u. The unit u is the atomic mass unit, which is also called Dalton. Thus, it is possible to select the molar mass in a particularly suitable way for the production of a three-dimensional object by selective layer-by-layer solidification and also to realize or strengthen the combination effects described above.

According to the invention, it is still advantageously possible to use and even further improve the combination effects described above, even if a crosslinking reaction takes place in other preferred embodiments after melting of the powdery material, so that the once melted and again solidified material cannot be melted again. This makes it possible to obtain a three-dimensional object from a thermoset material by selective layer-by-layer solidification of a powdery material and also to make use of the combination effects described above.

According to the invention, a powdery material, which on the one hand comprises a polymer which by nature actually has melt-amorphous properties and which consequently solidifies substantially or completely amorphously in the process according to the invention for the production of a three-dimensional object after melting, but which on the other hand provides a specific melting enthalpy (i.e. of at least 1 J/g, preferably at least 2 J/g, more preferably at least 4 J/g, more preferably at least 10 J/g, more preferably at least 20 J/g, even more preferably at least 40 J/g and even more preferably at least 80 J/g), are effectively produced according to the following processes and at the same time result in an improved powder characteristic for use in laser sintering. The block diagrams shown in FIGS. 2 to 5 schematically illustrate the steps of how a crystalline proportion is produced in the powdery material from an originally (i.e. before one of these processes is carried out) substantially amorphous or completely amorphous polymeric material which is naturally melt-amorphous.

Entirely unexpected, a relationship was observed and used between the extent of the specific melting enthalpy, the processing temperature of the semi-crystallized or completely crystallized but melt-amorphous powder, and the mechanics of the three-dimensional object obtained by additive manufacturing, as it was obtained and demonstrated by the examples. The adjustment of the specific melting enthalpies, in particular as obtained by the processes described in detail below, plays an important role here.

As further evident from the experiments described in the examples, it was also surprisingly found that polymers with actually low melting enthalpies, e.g. of only 1 J/g etc., can also be preheated and processed advantageously above the glass transition temperature of the respective polymer without sticking during coating. Due to their good crystallization tendency, polymers which have been investigated in the additive production of powdery materials from the outset are typically characterized by high melting enthalpies above 30 J/g, which is why a correlation has neither been investigated nor recognized as of which melting enthalpy a polymer can be easily processed. For example, the polymer most frequently used in laser sintering, polyamide 12, has a melting enthalpy between 80-130 J/g, depending on the manufacturing process.

Higher melting enthalpies can, however, not only be advantageous at the maximum preheating temperature, but also when it comes to accurate boundaries of built parts, because thereby the fusion, to the built part, of powder that has not been sintered by the exposure unit, e.g. due to heat conduction effects, can be minimized.

In accordance with the invention, it was also found that the specific melting enthalpy can be further raised by subsequent tempering after crystallization of the melt-amorphous polymer by further ordering the crystalline structures, and that the distance between the glass transition temperature and the onset temperature of the melting point can be further increased. This becomes particularly evident from the polycarbonate examples.

In a first embodiment of the inventive process for producing the powdery material, here referred to as "Process I" in the context of the invention, a polymer material which comprises at least one polymer which is obtainable from its melt only in substantially amorphous or completely amorphous form, is dissolved in an organic solvent (step A in FIG. 2 and FIG. 3), and the solution is then emulsified with a liquid having a lower vapor pressure than the organic solvent, in particular with water, in the presence of an emulsion stabilizer (step B in FIG. 2 and FIG. 3). The emulsion is formed by stirring, preferably with an agitator, which is operated with a stirring rate of at least 400 rpm, preferably of at least 500 rpm and in particular of at least 600 rpm. Particulate polymer for obtaining the powdery material is then precipitated according to a first variant of the embodiment by evaporation of at least part of the organic solvent (step C in FIG. 2). Alternatively, in a second variant of the embodiment, precipitation may be effected by extraction of the organic solvent by means of a further organic solvent, preferably ethanol or 2-propanol, which is miscible with the first-mentioned organic solvent and the liquid for emulsification, and by evaporation of at least part of the first-mentioned organic solvent (step C' in FIG. 3). An extract procedure is a two-stage process. The first stage corresponds to the extraction of the halogenated solvent from the polymer solution; the second stage corresponds to the distillation of the halogenated solvent to ensure a continuous concentration gradient and at the same time to accelerate the precipitation process.

The preferred organic solvent is an halogenated hydrocarbon, especially dichloromethane. Halogenated hydrocarbons, especially dichloromethane, dissolve the polymer material well and are easily evaporated.

The emulsion stabilizer serves to improve the emulsion, in particular in combination with suitable stirring to achieve a later shape and size of the powdery polymer material improved for laser sintering, including an excellent sphericity in combination with particle size and particle size distribution as described in more detail below. These may, for example, be surfactants and/or protective colloids. As surfactants, ionic surfactants such as sodium lauryl sulphate, sodium dodecyl benzene sulphonate, sodium benzene sulphonate or non-ionic surfactants such as those marketed under the brand name "Triton X" are considered. For example, polyvinyl alcohol (at least partially saponified polyvinyl acetate), polyethylene glycol, polypropylene glycol and various block copolymers are considered as protective colloids. In the case of polyvinyl alcohols, partially saponified grades are preferred, which are marketed by Kuraray Europe GmbH under the trade name "Kuraray Poval®", for example. In addition, triblock polymers of polyethylene glycol and polypropylene glycol, such as those sold under the trade name "Pluronic®" by BASF SE, can also be considered.

In a second embodiment of the inventive process for producing the powdery material, here referred to as "Process II" in the context of the invention, a polymer material comprising at least one polymer which is obtainable from its melt only in substantially amorphous or completely amorphous form is dissolved in an organic solvent (step D in FIG. 4). By adding the solution to a liquid in which the solvent is partially or completely soluble and in which the at least one polymer is less soluble than in the solvent, the powdery material is precipitated (step E in FIG. 4). The liquid is preferably stirred, particularly preferably with an agitator which is operated with a rotation of at least 100 rpm, preferably of at least 150 rpm and in particular of at least 200 rpm.

The organic solvent of this second embodiment is preferably N,N-dimethylformamide, N,N-dimethylacetamide or N-methyl-2-pyrrolidone. The liquid to which the solution of the polymer is added is preferably water, ethanol, isopropanol, acetone, ethyl acetate or a mixture comprising water and/or ethanol and/or isopropanol and/or acetone and/or ethyl acetate.

In a third embodiment of the inventive process for the production of the powdery material, here referred to as "Process III" in the context of the invention, the production process comprises the following steps: as a first essential step, a polymer material comprising at least one polymer which is obtainable from its melt only in substantially amorphous or completely amorphous form, is brought into contact with a solvent which, at a first, relatively lower temperature, preferably at room temperature (e.g. in the range 20 to 25° C.), is a non-solvent for the polymer, i.e. which does not dissolve the polymer at the first temperature, but which dissolves the polymer at a second temperature which is higher than the first relatively low temperature (e.g. said room temperature). Then, the thus obtained polymer-solvent mixture is heated to the elevated second temperature or above while stirring, to dissolve the polymer in the solvent. Preferably the dissolving temperature is above the boiling temperature, and/or above the glass transition temperature of the polymer/blend, and preferably the dissolving takes place under increased pressure (>1 bar). When cooling to or below the first temperature while stirring, the polymer precipitates and crystallizes, after which—if necessary after drying—the powdery material is obtained.

In this embodiment according to "Process III", relevant conditions for achieving a later shape and size of the powdery polymer material improved for laser sintering, including an excellent sphericity in combination with particle size and particle size distribution as further described below, can be set in a controlled manner, in particular by selecting the particularly suitable elevated temperature and, where appropriate, the elevated pressure during dissolution with respect to non-solvent at the first temperature and solvent at the second temperature, and taking into account the cooling rate and stirring rate during precipitation and crystallization.

An example of a possible "non-solvent at first temperature and solvent at second temperature" is ethanol for polyamide 12 (PA12). PA12 is not soluble in ethanol at room temperature. At elevated temperature and pressure, the polymer dissolves in the solvent. When cooled, PA12 precipitates as a powder, which has a significantly higher crystallinity and a particularly stable crystal form (high melting point) compared to PA12 crystallized from melt by the solvent. The same process can also be applied to other polymers, in particular to amorphous PA.

Further, fourth and fifth embodiments of the process according to the invention, here referred to as "Process A" and "Process B", are particularly well suited for the production of an improved powdery material.

Process A) is particularly preferred for laser sintering due to its suitability for obtaining improved powder characteristics and includes special crystallization of particulate polymer material by swelling and grinding the thus crystallized particulate polymer material, and comprises the steps described below. As a first essential step, particulate polymer material comprising at least one polymer which is obtainable from its melt only in substantially amorphous form is brought into contact with an organic non-solvent or partial solvent in order to swell and crystallize the polymer. Swelling of the powdery material means that the initial polymer particles increase in volume by absorption of the organic non-solvent or partial solvent, but without breaking up the polymer structure, at least without breaking it completely, or without dissolving the polymer structure. The particulate polymer material to be swollen is preferably initially amorphous and is particularly preferred as initially unground granules or in unground coarse powder form. Contact with the organic non-solvent or partial solvent takes place— preferably with stirring—for a sufficient time so that the polymer material is crystallized, preferably completely or approximately completely through-crystallized.

After the crystallization step, the non-solvent or partial solvent is separated, preferably by distillation, filtration and/or centrifugation. The particulate polymer material thus crystallized is then dried.

The crystallized particulate polymer material is then ground to reduce the primary particle size of the crystallized powdery polymer material. The preferred processes of grinding are pin mill, impact mill, impact cutting mill or counter jet mill, especially pin mill with a stirring rate ≥200 rpm. Grinding reduces the primary particle size, i.e. it does not only break up agglomerated secondary particles, i.e. subsequent grinding of agglomerates of the semi-crystalline powder is advantageously dispensable.

Optionally, post-crystallization can be carried out after grinding, for example by tempering and/or by treatment with non-solvent or partial solvent.

Finally, the desired powdery material is obtained.

The particulate polymer material used in process A) for the crystallization step is preferably provided by forming amorphous polymer by melt based powder generation processes. Particularly good generation processes for the formation of amorphous powders are selected from melt dispersion, microgranulation and fiber spinning plus cutting.

In process A) for the production of (semi) crystalline, but melt-amorphous powder, grinding is not carried out with an amorphous powder material; rather, grinding deliberately acts upon the powdery polymer material in the form of being previously crystallized in the preceding step of process A). In contrast to the grinding of an amorphous powder, the invention thus achieves a much better powder characteristic for laser sintering and thus a significantly better powder rheology. The better powder rheology for laser sintering, which above all is expressed by a significantly higher bulk density, leads to better mechanical properties in the three-dimensional object obtained by laser sintering. It is assumed that the differences in the result occur from the fact that the mechanical grinding forces acting on more brittle, crystallized polymer particles lead to better powder characteristics and rheology than in the case of relatively more plastic, amorphous polymer particles. Such an achievement of the powder characteristics and rheology by considering the crystallized state of the polymer particles is more important than in the case of a reference powder, which is first ground in the amorphous state and then crystallized. In the case of grinding according to the invention in the crystallized state, in which a slight transformation of crystalline to amorphous regions in the polymer particles may occur during the grinding process, an optional post-crystallization after grinding is easily possible.

Examples of possible "swelling/crystallizing non-solvents" include:

For polycarbonate: crystallizing non-solvent/swelling agent: acetone, ethyl acetate, THF or toluene; For polyetherimides such as Ultem 5001: crystallizing non-solvent: DCM, chloroform.

In process B), polymer crystallization takes place directly from the polymerization reaction. Depending on the polymer type, the monomers which are known for this purpose and which are capable of producing the respective polymer type are therefore first reacted. In the synthesis step leading to the final polymer structure, however, care must be taken according to the invention, to use a suitable solvent, namely one that dissolves the monomers but is also a non-solvent for the synthesized polymer and in which the polymer crystallizes, so that a crystalline or semi-crystalline particulate polymer powder is obtained. Optionally, post-crystallization can be performed, for example by tempering and/or by treatment with non-solvent or partial solvent. Finally, the powdery and partially or completely crystallized but melt-amorphous polymer material is obtained.

In process B), the degree of crystallization and/or a grain size distribution can be obtained directly in the combination step of polymerization and crystallization. The particle size distribution and/or the degree of crystallization can be advantageously controlled by the type of non-solvent, by a temperature profile, by a stirring rate, by a polymerization reaction rate and/or by a choice of monomers in the polymerization reaction. As an alternative or in addition to this process control during synthesis, a semi-crystalline or completely crystalline coarse powder can be obtained in process B), which is then further comminuted by grinding to a desired grain size distribution. Since the process-related influencing variables and the grinding in turn have a direct effect on the crystallized particulate polymer material, the powder characteristics are significantly improved by what has already been said for process A).

In a further embodiment of the process for producing the powdery material, polymer fibers are stretched (i.e., stretched along the fiber direction) to produce semi-crystalline proportions/components. In principle, polymer fibers from all melt-amorphous polymers that can be spun from the melt or from the solution into fibers and that become semi-crystalline during stretching of the polymer fibers can be used for this purpose. The original polymer fibres are provided according to this embodiment (step F in FIG. 5). The polymer fibres are then stretched (step G in FIG. 5). Then the stretched polymer fibres are comminuted to powdery material (step H in FIG. 5). An example of such a polymer is polycarbonate, see FALKAI, B., et al., Drawing behavior and mechanical properties of highly oriented polycarbonate fibres, J. Polym. Sci. Polym. Symp., 1977, Vol. 58, page 225. The stretched polymer fibres are comminuted to powdery material. It is advantageous that the fiber length of a powder produced in this way corresponds approximately to the fiber diameter, i.e. the aspect ratio is about 1.

In a further embodiment, the powdery material produced according to one of the aforementioned processes is tempered below the highest melting point and above the highest glass transition temperature with a specific melting enthalpy of at least 1 J/g, which preferably has a single melting peak. Tempering is preferably carried out at a temperature which leads to an increase in the total melting enthalpy and a reduction in the peak half-width, and/or which, in the presence of several melting points, leads to the formation of only one melting point. If several melting points are present, the tempering treatment preferably leads to the formation of only one melting point or only one melting range (whereby melting point or melting range respectively is defined by a peak maximum). In addition, tempering is preferably carried out under an inert gas atmosphere (e.g. nitrogen, argon) under ambient pressure, low pressure or gauge pressure or under vacuum, preferably in a heated furnace, particularly preferably in a rotating furnace or a furnace with circulation, such as, for example, a rotary kiln dryer, a tumble dryer or a paddle dryer, in particular one having a heated wall or jacket.

In the processes described above, the process and the extent of crystallization can be measured or controlled in order to achieve the best possible and homogeneous crystallization through the grain of the polymer particles, which is of particular importance in the embodiments of Processes I, II, III, A and B described above. Methodically this can be done e.g. by (1) DSC: crystallization is complete or substantially complete when the melting enthalpy has reached a constant or approximately constant value; and (2) making a cut through one or more granules, preferably through a representative number, of a production batch and examination of the granules thus cut by means of optical microscopy or polarization microscopy, wherein (partial) crystallinity of the structure is determined by light scattering and (residual) amorphousness is determined by light transmission.

In the embodiments of the processes described above, in particular in processes I, II, III, A and B, it is advantageous when the powdery material is obtained by the respectively specified steps in the desired final particle shape and final size/size distribution favorable for the laser sintering process, without particulate polymer intermediate product or the powdery material obtained as a result of production being subjected to a (possibly further) primary particle size-reducing treatment. This means, for example, that the final particle shape and size/size distribution are obtained directly from the precipitation of the emulsion in the case of process I, directly from the precipitation with non-solvent for the polymer in the case of process II, by controlling the cooling rate in the case of process III, in the case of process A) directly after the grinding of crystallized particulate polymer material, and in which, furthermore, the particle size and shape are preferably controlled by stirring rates in the corresponding production steps.

According to the invention, it is preferred to reuse the powdery material which has remained as unsolidified powdery material during the production of a three-dimensional object (so-called "old powder"). For this purpose, old powder is mixed with powdery material which has not previously been used in the production of a three-dimensional object (so-called "new powder"). In comparison with a purely amorphous, i.e. initially not semi-crystalline polymer material, the present invention—due to the fact that the polymer material has been given an initial crystallinity—makes it possible, for example, that the waste powder is more suitable for reuse together with new powder and that a mixture of waste and new powder containing a higher proportion of waste powder can be used in the reuse of waste powder. This makes it possible, for example, to reduce the consumption of powdery material in an economically advantageous and environmentally friendly manner while at the same time exploiting the combination effects described above. It is preferred if the proportion of used powder in the mixture is at least 20 percent by weight, more preferred 40 percent by weight and even more preferred 80 percent by weight.

In another aspect, the present invention provides a powdery material which comprises at least one polymer or a polyblend which is obtainable from its melt only in substantially amorphous or completely amorphous form and provides a specific melting enthalpy of at least 1 J/g.

Thus, a powdery material is available with which the combination effects described above can be realized and which is particularly well suited for use in the inventive process for producing a three-dimensional object.

With regard to preferred embodiments of the powdery material in accordance with the invention, reference is made to the above description.

The correspondingly defined powdery material preferably comprises at least one of the polymers from the group consisting of polyetherimides, polycarbonates, polyphenylene sulfones, polyphenylene oxides, polyethersulfones, acrylonitrile-butadiene-styrene copolymers (ABS), acrylonitrile-styrene-acrylate copolymers (ASA), polyvinyl chloride, polyacrylates, polyesters, polyamides, polyaryletherketones, polyethers, polyurethanes, polyimides, polyamidimides, polysiloxanes, polyolefins and copolymers which comprise at least two different repeating units of the abovementioned polymers, and/or at least one polyblend based on the abovementioned polymers and copolymers.

In accordance with the invention, it is advantageously possible to use and improve the combination effects described above if the particle size distribution of the powdery material according to the invention has mean particle sizes (d50 value) of at least 20 µm, preferably at least 30 µm, more preferably at least 40 µm and/or at most 100 µm, preferably at most 80 µm, more preferably at most 60 µm. The powdery material preferably has a distribution width ((d90−d10)/d50) of less than 3, preferably less than 2 and even more preferably less than 1. Such a powdery material is, for example, very well suited to be applied layer-by-layer and selectively solidified by exposure to radiation, so that the combination effects described above can also occur.

In accordance with the invention, it is also advantageous to use and improve the combination effects described above if the powdery material in accordance with the invention has a sphericity SPHT greater than 0.8, preferably greater than 0.9, more preferably greater than 0.95. The definition of SPHT is given below. Such a powdery material, for example, is very well suited to be applied layer-by-layer and selectively solidified by exposure to radiation, so that the combination effects described above can also occur.

In accordance with the invention, it is possible by observing the special process conditions, in particular within the framework of the special process variants I, II, III, A and B, to produce the polymer materials in powder form which are in themselves melt-amorphous in such a way that, on the one hand, they have the specific melting enthalpy values already described and, on the other hand, they have one or more of the following property(s) which are particularly relevant for the selective layer-by-layer solidification of a powdery material, in particular for laser sintering (LS):

(i) the powder distribution has a d90 value of <150 µm, preferably <100 µm;

(ii) the mean particle size (d50 value) is at least 20 µm, preferably at least 30 µm, more preferably at least 40 µm;

(iii) the mean particle size (d50 value) is at most 100 µm, preferably at most 80 µm, more preferably at most 60 µm;

(iv) the powdery polymer material has a sphericity greater than 0.8, preferably greater than 0.9, more preferably greater than 0.95;

(v) the powdery polymer material has a distribution width ((d90−d10)/d50) of less than 3, preferably less than 2, more preferably less than 1;

(vi) the powdery polymer material has a bulk density of at least 0.35 g/cm³ (more preferably at least 0.40) and/or at most 0.70 g/cm³ (more preferably at most 0.60 g/cm³);

(vii) the powdery polymer material has a melt viscosity determined by means of ISO-1133 at 5 kg load and a test temperature in a temperature range of preferably 50-80° C. above the highest melting temperature (e.g. 60° C. above the highest melting temperature) of at least 10 cm³/10 min, preferably at least 15 cm³/10 min, more preferably at least 20 cm³/10 min, optionally at most 150 cm³/10 min;

(viii) the powdery polymer material has a particle shape or particle size distribution as obtainable from one of the processes described above, optionally—based on the processes II, III, B—respectively without carrying out a mechanical treatment of polymer particles, in particular without grinding, wherein particle shape or particle size distribution is preferably defined according to one or more of the properties (i) to (vii).

The advantages of the invention are in particular realizable if the powdery material, which as such is melt-amorphous but has the specific melting enthalpy already described due to the special preparation, is selected from the group of polymers, copolymers and polymer blends comprising polyetherimide, more preferably if the polyetherimide comprises repeat units according to the formula

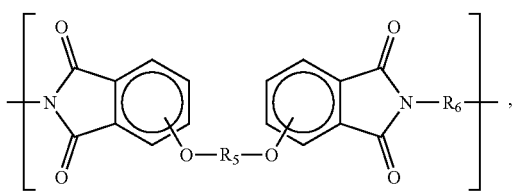

wherein $R_5$ and $R_6$ are the moieties as defined above, more preferably repeating units according to the formula

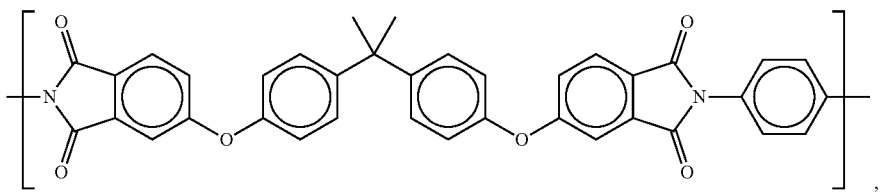

particularly preferable if said polymer, copolymer or polymer blend comprising polyetherimide has been prepared by one of the processes described above and in particular prepared by processes using a halogenated hydrocarbon, preferably dichloromethane and chloroform, for crystallization and optionally post-crystallization.

The then obtained preferred properties that can then be realized according to the invention are selectable independently of each other from:
- having a melting point of at least 260° C., preferably in the range 265-275° C., and a specific melting enthalpy of at least 4 J/g, preferably at least 10 J/g, more preferably at least 15 J/g, in particular at least 20 J/g and especially at least 25 J/g,
- having a bulk density of at least 0.40 g/cm$^3$, preferably in the range 0.40-0.65 g/cm$^3$,
- grain size distribution being defined as d90<150 μm, preferably d90<100 μm, d50 at least 30 μm, preferably d50 of at least 40 μm and/or at most 70 μm,
- having a sphericity of at least 0.8, preferably of at least 0.85, more preferably of at least 0.9 and in particular of at least 0.95 (optionally at most 0.99), and/or
- having a melt viscosity determined by ISO-1133 at 5 kg load and 360° C. test temperature of at least 10 cm$^3$/10 min, preferably larger than 15 cm$^3$/10 min, further preferably larger than 20 cm$^3$/10 min or at most 150 cm$^3$/10 min.

The specified high and even very high melt viscosity values are particularly preferred if the difference between glass transition temperature and melting point after crystallization is just small, as is the case, for example, with polyetherimides and in particular the polyetherimide type of formula XX (also known under the trade name Ultem 5000 series). Since chain mobility of the molecules is only possible after the glass transition temperature has been exceeded, the melt will only flow very well if the melt viscosity values are high or even very high. Only then can built parts with low porosities and thus good mechanical properties be obtained by single exposure with the laser. On the other hand, excessively high melt viscosity values can result in the molar mass of the polymer being very low and the toughness of the three-dimensional component being greatly reduced. Toughness is defined, for example, by the elongation at break in tensile strength tests, which can then be so low that, for example, brittle fracture can already occur and the tensile strength can therefore drop from the possible maximum value of the polymer's tensile strength. According to the invention, a suitable balance is created for the respective polymer type between a suitable melt viscosity on the one hand, which leads to a good flow of the polymer melt, and a still sufficient toughness of the three-dimensional component on the other hand.

In another object, the present invention provides a three-dimensional object made of a powdery material, which is produced in such a way that the powdery material comprises at least one polymer or a polyblend which is obtainable from its melt only in substantially amorphous or completely amorphous form, this amorphousness being found in the three-dimensional object produced, and the powdery material on the basis of which the three-dimensional object is produced having a specific melting enthalpy of at least 1 J/g, i.e. had a corresponding crystalline portion before the three-dimensional object was formed. Said three-dimensional object has at least substantially amorphous or completely amorphous regions and/or is at least partially composed of a composite material, wherein the matrix of the composite material has at least substantially amorphous or completely amorphous regions. It is preferred that the substantially amorphous or completely amorphous regions and/or the substantially amorphous or completely amorphous matrix and/or the substantially amorphous or completely amorphous three-dimensional object have a degree of crystallization of at most 2%, preferably at most 1%, more preferably 0.5%, even more preferably 0.1%. Furthermore, the three-dimensional object is preferred not only in regions, but also substantially amorphous or completely amorphous in its entirety.

Such a three-dimensional object is characterized, for example, by lower porosity and/or high transparency and/or good dimensional stability and/or good shape retention and/or high elongation at break and/or high impact strength. This is particularly the case if not only areas of the three-dimensional object or the matrix, but the three-dimensional object as a whole or the matrix as a whole is substantially amorphous or completely amorphous. The substantially amorphous regions and/or the substantially amorphous matrix and/or the substantially amorphous three-dimensional object preferably have a degree of crystallization of at most 2%, more preferably at most 1%, even more preferably 0.5% and even more preferably 0.1%. According to the invention, it is preferred to produce the three-dimensional object in such a way that when it is solidified, i.e. when the powdery material is solidified to form the three-dimensional object, it exhibits a xy-shrinkage factor of maximally 2%, more preferably maximally 1.5%, even more preferably maximally 1%. This allows good dimensional stability and/or good shape retention of the three-dimensional object to be achieved.

BRIEF DESCRIPTION OF THE DRAWINGS

Further features and advantages of the invention result from the description of the examples with reference to the attached figures.

DETAILED DESCRIPTION OF THE EMBODIMENTS

Figure 1:
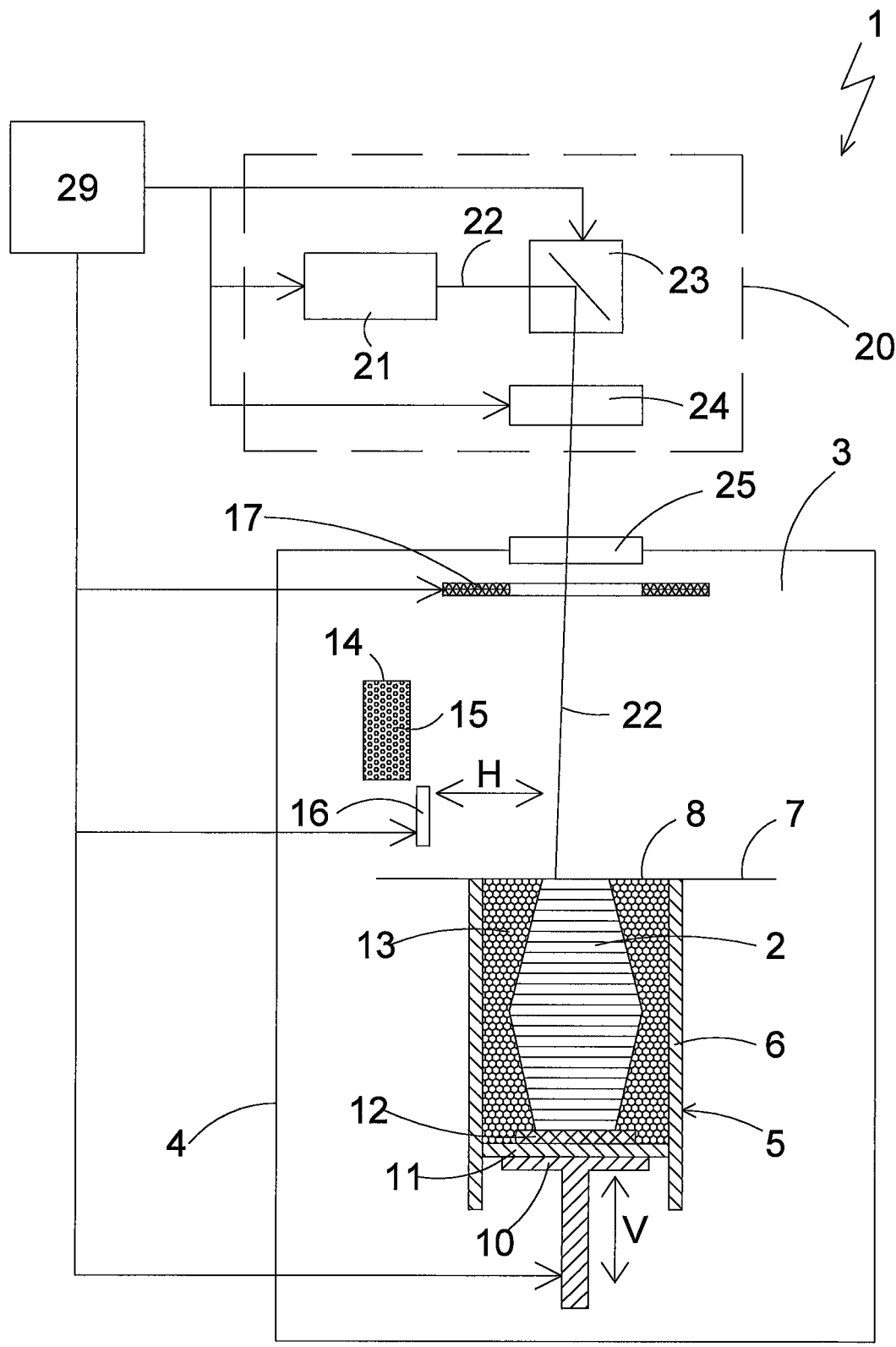
FIG. 1 shows a schematic and vertical view of a device that can be used to carry out the inventive process for producing a three-dimensional object.

The device shown in FIG. 1 is a laser sintering or laser melting device 1 for producing an object 2 from a powdery material 15. In this context, powdery material 15 is also referred to as "build-up material". For the choice of powdery material, reference is made to the description above.

The device 1 contains a process chamber 3 with a chamber wall 4. In the process chamber 3 an open top container 5 with a container wall 6 is arranged. A working plane 7 is defined by the upper opening of the vessel 5, whereby the area of working plane 7 within the opening which can be used to construct object 2 is referred to as construction area 8. A support 10 movable in a vertical direction V is arranged in the container 5, to which a base plate 11 is attached, which closes off the container 5 downwards and thus forms its bottom. The base plate 11 can be a plate formed separately from the support 10 and attached to the support 10, or it can be formed integrally with the support 10. Depending on the powder used and the process, a building platform 12 can be placed on the base plate 11 as a building base on which object 2 is built. Object 2 can also be mounted on the base plate 11 itself, which then serves as the building base. In FIG. 1, the object to be constructed is shown in an intermediate state. It consists of several solidified layers and is surrounded by unsolidified powdery material 13.

The device 1 further contains a storage container 14 for a powdery material 15 solidifiable by electromagnetic radiation and a coater 16 movable in a horizontal direction H for applying layers of the powdery material 15 within the construction area 8. Preferably a radiation heating 17 is arranged in the process chamber 3, which serves for heating the applied powdery material 15. An infrared radiator, for example, can be provided as radiation heater 17.

The apparatus 1 further comprises an radiation device 20 with a laser 21 which generates a laser beam 22 which is deflected by a deflection device 23 and focused by a focusing device 24 onto the working plane 7 via a coupling window 25 mounted on the upper side of the process chamber 3 in the chamber wall 4 via a coupling window 25.

The apparatus 1 further comprises control means 29 by means of which the individual components of the apparatus 1 are controlled in a coordinated manner to perform a process of producing a three-dimensional object 2. The controller 29 may include a CPU whose operation is controlled by a computer program (software). The computer program may be stored separately from device 1 on a storage medium from which it can be loaded into device 1, in particular into control device 29.

Depending on the processing temperature, the laser sintering devices distributed by the applicant under the type designations P110, P396, P770 and P800, for example, have proved to be suitable for carrying out the invention.

During operation, to apply a layer of powdery material 15, the carrier 10 is lowered by a height which preferably corresponds to the desired thickness of the layer of powdery material 15. The coater 16 first moves to the storage container 14 and takes from it a sufficient quantity of powdery material 15 to apply a layer. Then the coater 16 moves over the construction area 8 and applies a thin layer of the powdery material 15 onto the construction base 10, 11, 12 or an already existing powder layer. The application takes place at least over the entire cross-section of the object to be produced, preferably over the entire construction area 8. The powdery material 15 is preferably heated to a processing temperature by means of radiant heating 17. The cross-section of the object 2 to be produced is then scanned by the laser beam 22 so that this area of the applied layer is solidified. The steps are repeated until object 2 is finished and can be removed from container 5.

The invention is preferably applied to laser sintering or laser melting, but is not limited to it. It can be applied to various processes as far as these involve the production of a three-dimensional object by layer-by-layer application and selective solidification of a powdery material by exposure to electromagnetic radiation.

The radiation facility 20 may, for example, include one or more gas or solid-state lasers or lasers of any other type, such as laser diodes, in particular VCSEL (Vertical Cavity Surface Emitting Laser) or VECSEL (Vertical External Cavity Surface Emitting Laser) line exposure devices. In general, any radiation source can be used as a radiation device with which electromagnetic radiation can be selectively applied to a layer of powdery material. For example, instead of a laser, another light source or any other source of electromagnetic radiation capable of solidifying the powdery material 15 can be used. Instead of deflecting a beam, exposure with a mobile line exposer can also be used. Also on selective mask sintering, where a two-dimensional light source and a mask are used, or on high-speed sintering (HSS), where a material is selectively applied to the powdery material, which increases the radiation absorption at the locations corresponding to the cross-section of the three-dimensional object 2 (absorption sintering) or reduces it at the remaining locations of the construction area 8 (inhibition sintering), and is then exposed non-selectively over a large area or with a movable line exposer, the invention can be applied.

According to the invention, it is preferable to preheat the powdery material 15 before it is solidified by exposure to electromagnetic radiation. During preheating, the powdery material 15 is heated to an elevated processing temperature so that less energy is required from the electromagnetic radiation used for selective solidification. Preheating can, for example, be carried out by means of radiant heating. The maximum processing temperature is defined as the processing temperature of the powdery material 15 at which the powdery material 15 just does not fuse, so that no aggregates of powder particles form, and the powdery material is still sufficiently flowable for the coating process. The maximum processing temperature depends in particular on the type of powdery material used. The processing temperature is preferably selected so that it is at least 10° C. (more preferably at least 15° C. and even more preferably at least 20° C.) above the glass transition temperature of the at least one polymer or copolymer or polyblend and/or at most at the maximum processing temperature (more preferably at most 20° C., even more preferably at most 15° C. and even more preferably at most 10° C. below the melting point of the at least one polymer or copolymer or polyblend). The processing temperature shall preferably be above the glass transition temperature and below the melting point of the at least one polymer. This ensures that the processing temperature is as high as possible without the powder material sticking together. If a polyblend is used, it is preferred that the processing temperature is at least 10° C. (more preferably at least 15° C. and even more preferably at least 20° C.) above the highest glass transition temperature of the polyblend and/or at most the maximum processing temperature (more preferably at most 50° C., even more preferably at most 20° C. and even more preferably at most 10° C. below the highest melting point of the polyblend) in order to achieve as high a processing temperature as possible without sticking of the powdery material. The processing temperature is preferably above the highest glass transition temperature and below the highest melting point of the polyblend.

If the powdery material comprises a polyblend based on at least one polyetherimide and one polycarbonate, the invention states that it is preferable to preheat the powdery material before it is solidified by the action of electromagnetic radiation and to select the processing temperature accordingly, in that it is at least 10° C. (more preferably at least 15° C. and even more preferably at least 20° C.) above the glass transition temperature of the polyetherimide and at most 20° C. (more preferably at most 15° C. and even more preferably at most 10° C.) below the melting point of the polycarbonate in order to achieve as high a processing temperature as possible without the powdery material sticking together in the process.

Process for Producing the Powdery Material

Figure 2:
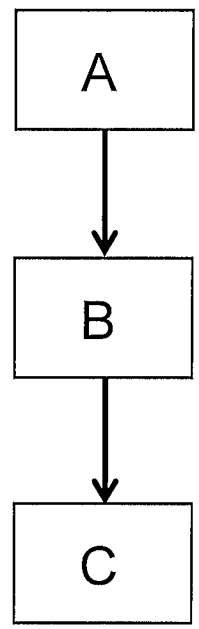
FIG. 2 Block diagram of the process for producing the powdery material according to a first variant of an embodiment of the invention.
Figure 3:
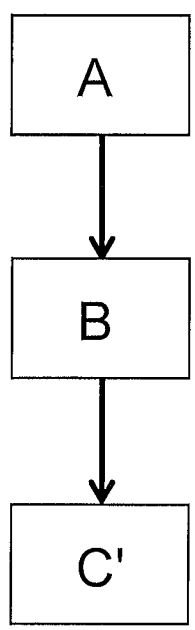
FIG. 3 Block diagram of the process for producing the powdery material according to a second variant of this embodiment.
Figure 4:
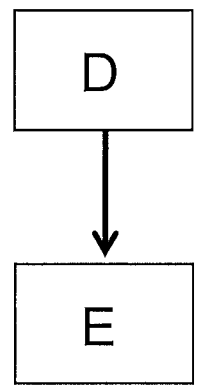
FIG. 4 Block diagram of the process for producing the powdery material according to a further embodiment of the invention.
Figure 5:
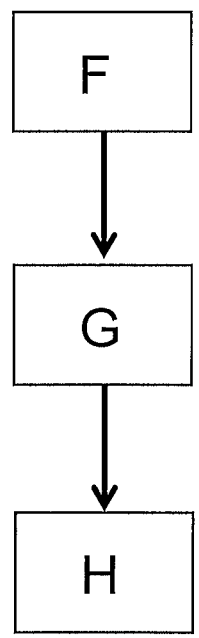
FIG. 5 Block diagram of the process for producing the powdery material according to another further embodiment of the invention.

The process described above for producing the powdery material according to a first and a second variant of a first embodiment is illustrated schematically in the block diagrams shown in FIG. 2 and FIG. 3, respectively. The process described above for producing the powdery material according to a second embodiment is illustrated schematically in the block diagram shown in FIG. 4. The process described above for producing the powdery material according to a third embodiment is schematically illustrated in the block diagram shown in FIG. 5.

Methods Applied

For the examples described below, among others, results obtained by means of dynamic differential calorimetry (hereinafter referred to as "DSC", derived from the English term "Differential Scanning calorimetry") are given. In addition, optical methods are used to provide certain measurement results for the size and shape of particles of powdery material. For example, the degree of crystallinity was determined using the method described in the book by Rudolf Allmann and Amt Kern "Röntgenpulverdiffraktometrie—Rechnergestütze Auswertung, Phaseanalyse and Strukturbestimmung" (Springer-Verlag Berlin Heidelberg 2003).

1. DSC:

The measurements were performed on a DSC instrument of the type "Mettler Toledo DSC823e" with automatic sample changer. The evaluations were performed with the software "STARe Software", version 9.30 (or version 15.00 from V26). Nitrogen 5.0, i.e. nitrogen with a purity of 99.999 volume percent, was used as purge gas. The measurements were carried out in accordance with DIN EN ISO 11357.

For the DSC measurements, the methods DSC1 to DSC4 and DSC6 were used, which differ from each other with regard to the temperature program. The methods used for the DSC measurements are described below. A DSC measurement is divided into successive sections ("segments"). The sample is either kept at a constant temperature during a segment, in which case the operating mode is referred to as "isothermal", or heated or cooled, in which case the operating mode is referred to as "dynamic". In the tables below, for each segment with an "isothermal" mode, the duration of the segment, referred to as the "hold time", is given. The holding time is the time for which the sample is held at the specified temperature (start temperature or, identical to this, end temperature). In the following tables, for each segment with the "dynamic" mode of operation, the rate at which the temperature of the sample is changed until it reaches the end temperature at the end of the segment, starting from the start temperature at the beginning of the segment. If the temperature increases during the segment, the rate has a positive sign and is referred to as the "heating rate". If the temperature decreases during a segment, the rate has a negative sign and is referred to as the "cooling rate".

From DSC measurements, the glass transition temperature $T_g$, the melting point $T_m$ and the specific melting enthalpy $\Delta H_m$ were determined for various samples in accordance with the DIN EN ISO 11357 standard. In the DSC curves shown in the figures, the glass transition temperature $T_g$ is designated as "Midpoint". In the DSC curves shown in the figures, the melting point $T_m$ is marked with "Peak". The integral of the melting peak of a DSC curve is referred to as "integral" in the DSC curves shown in the figures. The specific melting enthalpy $\Delta H_m$ is referred to as "normalized" in the DSC curves shown in the figures.

The conditions of the DSC1 method are described in Table 1. This serves to determine the melting point, melting enthalpy and crystallization point according to the heating and cooling rate recommended in the standard DIN EN ISO 11357. The glass transition temperature is also determined with this method in the same heating run, but deviating from the standard DIN EN ISO 11357 with a rate of 20° C./min.

TABLE 1

| Segment | Operating mode | Start-Temperature [° C.] | Final-Temperature [° C.] | Heating/cooling rate [° C./min] or holding time [min] |
|---|---|---|---|---|
| ]1[ | isothermal | 0 | 0 | 3 min |
| ]2[ | dynamic | 0 | 400 | 20° C./min |
| ]3[ | isothermal | 400 | 400 | 3 min |
| ]4[ | dynamic | 400 | 0 | −20° C./min |
| ]5[ | isothermal | 0 | 0 | 3 min |
| ]6[ | dynamic | 0 | 400 | 20° C./min |

The DSC2 method is used to simulate a laser sintering process with a processing temperature of 250° C. The process is performed by means of the DSC2 method. In the segment ]2[ the sample is heated up to the processing temperature. In the segments ]3[ and ]4[ the effect of a laser beam on the sample is simulated by very rapid heating to a temperature above the processing temperature immediately followed by very rapid cooling, as is the case with laser sintering. In the segment ]5[, whose final temperature is below the glass transition temperature of the sample, slow cooling takes place in order to simulate the cooling process in the course of laser sintering. In the segment ]8[ the sample is analyzed in the course of a new heating. The conditions of the DSC2 method are described in Table 2.

TABLE 2

| Segment | Operating mode | Start-Temperature [° C.] | Final-Temperature [° C.] | Heating/cooling rate [° C./min] or holding time [min] |
|---|---|---|---|---|
| ]1[ | isothermal | 0 | 0 | 3 min |
| ]2[ | dynamic | 0 | 250 | 20° C./min |
| ]3[ | dynamic | 250 | 350 | 50° C./min |
| ]4[ | dynamic | 350 | 250 | −50° C./mm |
| ]5[ | dynamic | 250 | 200 | −0.1° C./min |
| ]6[ | dynamic | 200 | 0 | −20° C./min |
| ]7[ | isothermal | 0 | 0 | 3 min |
| ]8[ | dynamic | 0 | 350 | 20° C./min |

The DSC3 method is used to simulate a laser sintering process with a processing temperature of 215° C. In the segment ]2[ the sample is heated up to the processing temperature. In the segments ]3[ and ]4[ the effect of a laser beam on the sample is simulated by very rapid heating to a temperature above the processing temperature immediately followed by very rapid cooling, as is the case with laser sintering. In the segment ]5[, whose final temperature is below the glass transition temperature of the sample, slow cooling takes place in order to simulate the cooling process in the course of laser sintering. In the segment ]8[ the sample is analyzed in the course of a new heating. The conditions of the DSC3 method are described in Table 3.

TABLE 3

| Segment | Operating mode | Start-Temperature [° C.] | Final-Temperature [° C.] | Heating/cooling rate [° C./min] or holding time [min] |
|---|---|---|---|---|
| ]1[ | isothermal | 0 | 0 | 3 min |
| ]2[ | dynamic | 0 | 215 | 20° C./min |

TABLE 3-continued

| Segment | Operating mode | Start-Temperature [° C.] | Final-Temperature [° C.] | Heating/cooling rate [° C./min] or holding time [min] |
|---|---|---|---|---|
| ]3[ | dynamic | 215 | 300 | 50° C./min |
| ]4[ | dynamic | 300 | 215 | −50° C./min |
| ]5[ | dynamic | 215 | 150 | −0.1° C./min |
| ]6[ | dynamic | 150 | 0 | −20° C./min |
| ]7[ | isothermal | 0 | 0 | 3 min |
| ]8[ | dynamic | 0 | 300 | 20° C./min |

The DSC4 method is used to simulate a laser sintering process with a processing temperature of 250° C., whereby the sample is only partially melted. In the segment ]2[ the sample is heated to the processing temperature. In the segments ]3[ and ]4[, the short-term effect of a laser beam on the sample is simulated by very rapid heating to a temperature above the processing temperature immediately followed by very rapid cooling, as is the case with laser sintering. The final temperature of the segment ]3[ is lower than in the case of the DSC2 method, at which the processing temperature is also 250° C. The temperature of the laser beam is also lower than in the case of the DSC2 method. In the segment ]5[, whose final temperature is below the glass transition temperature of the sample, slow cooling takes place in order to simulate the cooling process in the course of laser sintering. In the segment ]8[ the sample is analyzed in the course of a new heating. The conditions of the DSC4 method are described in Table 4.

TABLE 4

| Segment | Operating mode | Start-Temperature [° C.] | Final-Temperature [° C.] | Heating/cooling rate [° C./min] or holding time [min] |
|---|---|---|---|---|
| ]1[ | isothermal | 0 | 0 | 3 min |
| ]2[ | dynamic | 0 | 250 | 20° C./min |
| ]3[ | dynamic | 250 | 275 | 50° C./min |
| ]4[ | dynamic | 275 | 250 | −50° C./min |
| ]5[ | dynamic | 250 | 150 | −0.1° C./min |
| ]6[ | dynamic | 150 | 0 | −20° C./min |
| ]7[ | isothermal | 0 | 0 | 3 min |
| ]8[ | dynamic | 0 | 350 | 20° C./min |

The conditions of the DSC6 method are described in Table 5.

TABLE 5

| Segment | Operating mode | Start-Temperature [° C.] | Final-Temperature [° C.] | Heating/cooling rate [° C./min] or holding time [min] |
|---|---|---|---|---|
| ]1[ | isothermal | 0 | 0 | 3 min |
| ]2[ | dynamic | 0 | 360 | 20° C./min |
| ]3[ | isothermal | 360 | 360 | 3 min |
| ]4[ | dynamic | 360 | 0 | −1° C./min |
| ]5[ | isothermal | 0 | 0 | 3 min |
| ]6[ | dynamic | 0 | 360 | 20° C./min |

2. Optical Methods to Determine Particle Size and Shape:

The optical methods used to determine particle size and shape are based on the ISO 13322-2 standard. The sample is dispersed in a liquid medium. The liquid medium is pumped so that it flows past a calibrated optical unit. For evaluation, 10000 individual images are taken. The particle sizes and shapes are determined on the basis of defined measuring parameters. Determined parameters are the minimum chord length (given as d10, d50 and d90, i.e. as 10% quantile, 50% quantile and 90% quantile of the volumetric particle size distribution) as a measure for the particle sizes and the sphericity SPHT as a roundness measure according to the following definition:

$$SPHT = \frac{4 \cdot \pi \cdot A}{U^2}$$

U is the measured circumference of the particle projection. A is the measured area of the particle projection. The mean sphericity of all measured particles is given. According to the definition, the result for a sphere is SPHT=1. The more the shape of a particle deviates from the shape of a sphere, the smaller the value for SPHT.

From the quantiles determined as described above, the distribution width of the particle size distribution can be calculated according to the following formula:

$$\text{Distribution width} = \frac{d90 - d10}{d50}$$

To perform the optical methods, distilled water with the X-Flow module is placed and degassed in a reservoir in a Camsizer XT measuring instrument (Retsch Technology, software version 6.0.3.1008) with the X-Flow module. The surface density of measured particles/air bubbles is less than 0.01%. A sample quantity of approximately 1 to 3 mg of the powdery material to be examined is dispersed in 2 to 3 mL of a solution of Triton X in water. The concentration of Triton X in the solution is 3 mass percent. The dispersed sample is slowly dripped into the distilled water in the receiver until a measured areal density of 0.4% to 0.6% is obtained. The measurement is started and repeated several times to produce a statistical measured value.

EXAMPLES

Several examples of this invention are described below. The examples described below serve to illustrate this invention and therefore do not limit the scope of this invention in any way. For the person skilled in the art, it is obvious in the context of the entire disclosure that the examples described below can be rearranged and modified. The characteristics of the individual examples can, where possible, be combined as desired.

Examples V1 and V2

In the case of examples V1 and V2, the powdery material is a polyetherimide which contains repeating units according to the formula

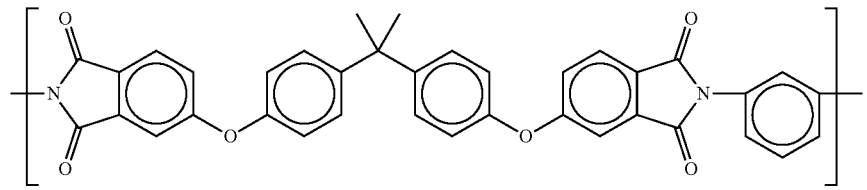

SABIC distributes the polyetherimide used as the starting material under the trade names "Ultem® 1000", "Ultem® 1010" and "Ultem® 1040". The products sold under the trade names mentioned differ in the molecular weight of the polyetherimide molecules; this is higher for "Ultem® 1000" than for "Ultem®1010" and higher for "Ultem® 1010" than for "Ultem® 1040".

The polyetherimide, which basically has the property of melt-amorphousness and is therefore initially completely amorphous or substantially amorphous, was dissolved in dichloromethane so that a solution with 20 mass percent polyetherimide was obtained. To prepare the solution, polyetherimide in powder or granulated form was preferably treated with dichloromethane. A solution of a protective colloid of the polyvinyl alcohol type in distilled water with a protective colloid concentration of 5% by mass was added at room temperature. The volume ratio between the polyetherimide solution and the protective colloid solution was 1:3.3. An emulsion was produced by stirring with a vane stirrer, for example at 450 or 600 rounds per minute. Dichloromethane was distilled off by applying a vacuum and heating for 3 to 5 hours. The dispersion formed was stirred. The precipitated polymer was filtered off, washed with warm water and dried at 150° C. in a nitrogen atmosphere in a circulating air furnace. The powdery material produced in this way has a very round shape (i.e. a sphericity close to 1).

The examples V1 and V2 differ with regard to the production of the powdery material in that in the case of example V1 the vane stirrer was operated at a stirring rate of 600 rounds per minute, while in the case of example V2 it was operated at a stirring rate of 450 rounds per minute.

Table 6 shows the results obtained by DSC and optical methods for samples of powdery material obtained from "Ultem® 1040" according to examples V1 and V2. The values are given for the melting point $T_m$ and the specific melting enthalpy $\Delta H_m$ determined by the DSC1 method. Values for particle size and SPHT determined by optical methods are also given. The starting material used was a polyetherimide sold under the trade name "Ultem® 1040".

TABLE 6

| Example | Polymer | $T_m$ [° C.] | $\Delta H_m$ [J/g] | Particle size [μm] | | | |
| | | | | d10 | d50 | d90 | SPHT |
|---|---|---|---|---|---|---|---|
| V1 | Ultem 1040, SABIC | 273 | 3.5 | 36 | 83 | 150 | 0.98 |
| V2 | Ultem 1040, SABIC | 290 | 2.0 | 42 | 144 | 227 | 0.98 |

The fact that the stirring rate of the vane stirrer has a significant influence on the particle size can be seen from the values given in Table 6: faster stirring can therefore lead to smaller particle size and changed particle size distribution.

Figure 6:
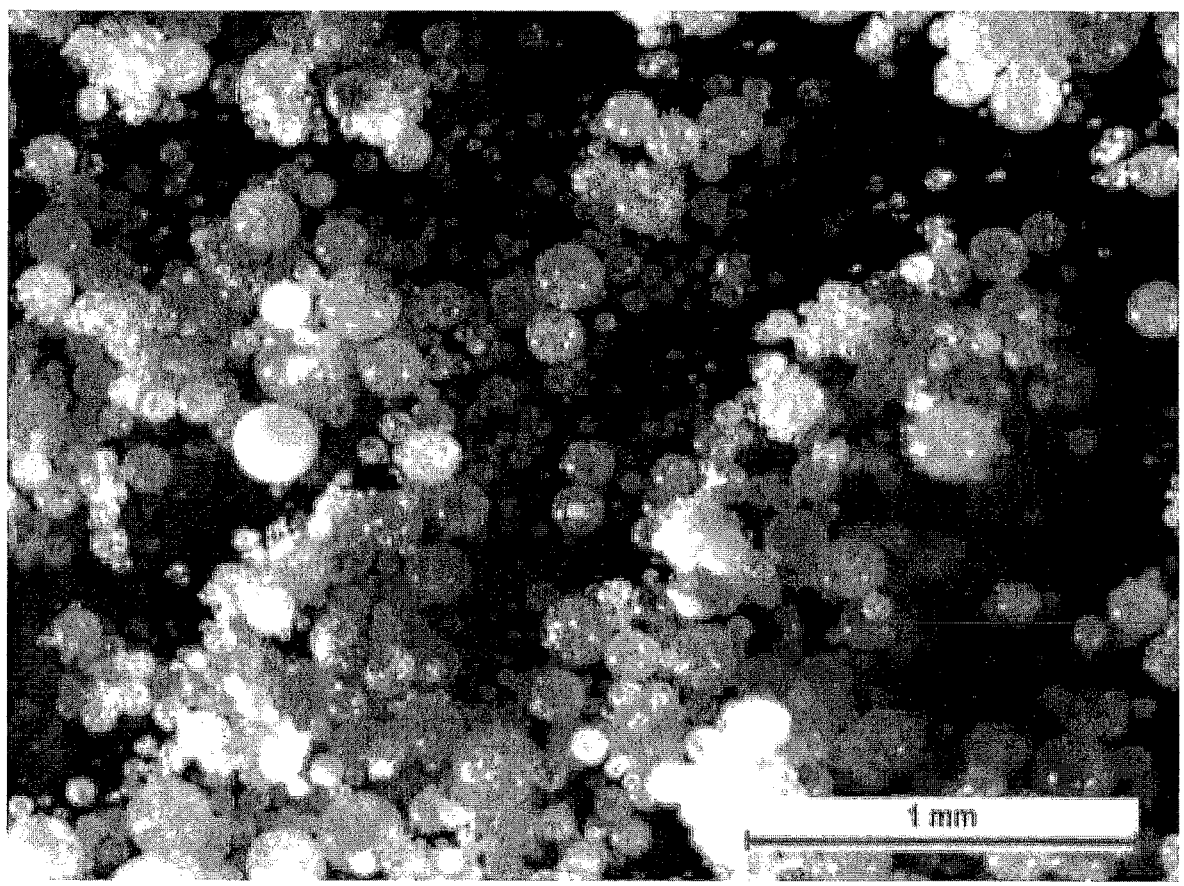
FIG. 6 shows a microscopic image of a powdery material according to an example of the present invention.

FIG. 6 shows a microscopic image of the powdery material produced according to example V2.

Figure 7:
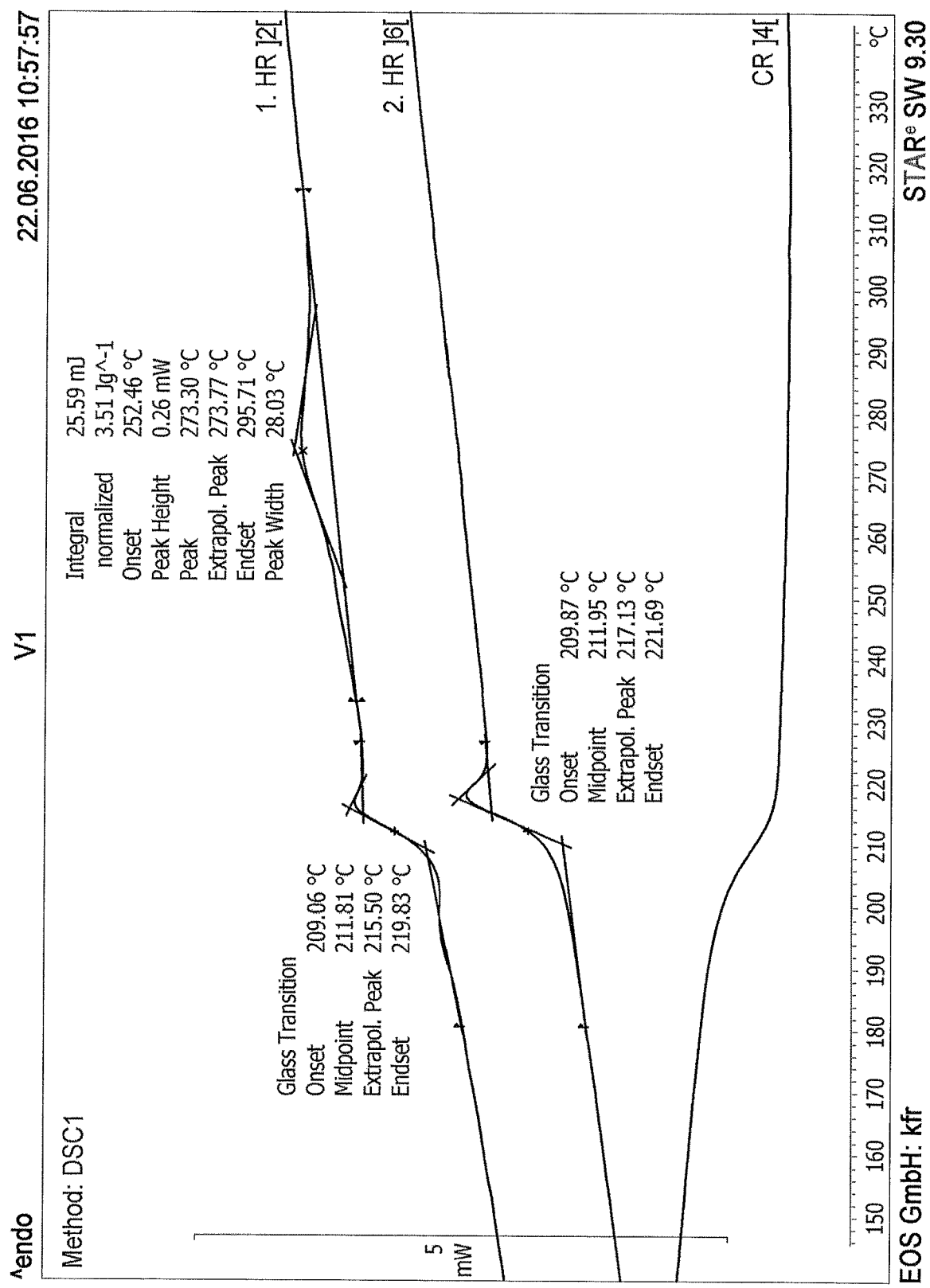
FIG. 7 shows DSC curves for an example according to the invention.

FIG. 7 shows DSC curves obtained for example V1 using the DSC1 method. The highest of the three curves corresponds to the segment ]2[ (heating), the lowest curve corresponds to the segment ]4[ (cooling), the middle curve corresponds to the segment ]6[ (heating). The uppermost curve shows a melting peak corresponding to a melting point of $T_m=273°$ C. and a specific melting enthalpy of $\Delta H_m=3.5$ J/g, i.e. the sample of the powdery material produced was initially (at the beginning of the segment ]2[) at least partially semi-crystalline. The mean curve shows no melt peak, i.e. the sample was substantially amorphous or completely amorphous at the beginning of the segment ]6[. It follows from this that the initially at least partially semi-crystalline sample solidified after initial melting (segment ]2[) during cooling (segment ]4[) not in the form of a semi-crystalline material but in the form of a substantially amorphous or completely amorphous material. Powdery material produced according to example V1 thus loses its initially present crystalline part due to melting, i.e. it solidifies during cooling in such a way that the crystalline part present at the beginning of the segment ]2[ does not form again or does not form again to a substantial extent. The property of melt-amorphousness, which originally existed by nature for the polymer, thus reappears after the procedure according to the invention has been carried out.

Figure 8:
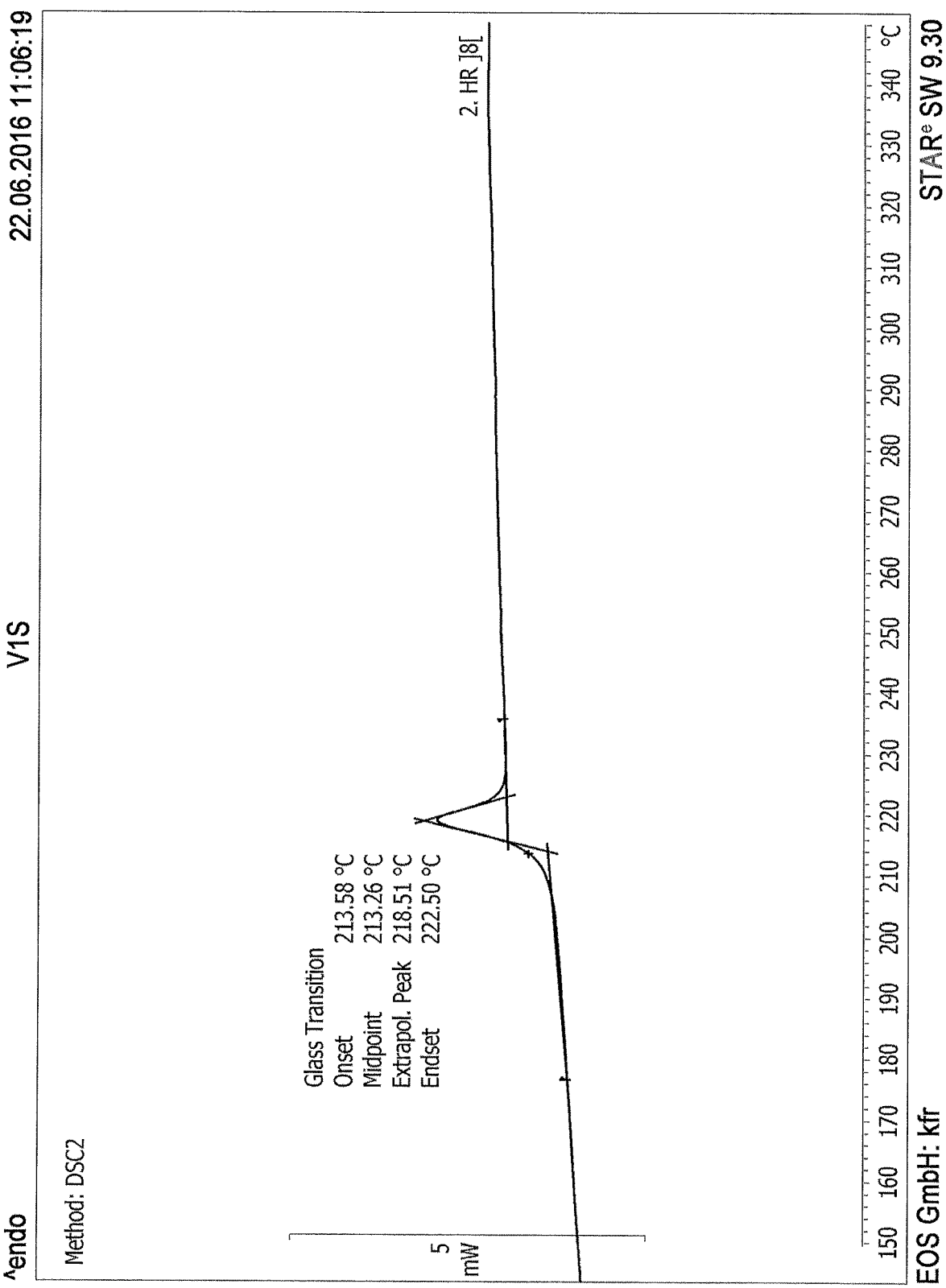
FIG. 8 shows another DSC curve for the same example.

FIG. 8 shows the curve corresponding to the segment ]8[, which was obtained for another sample of the powdery material according to example V1 using the method DSC2. The curve shows no melt peak. Since the DSC2 method simulates the laser sintering of an object and the segment ]8[ represents an analysis of this object, it follows from the absence of the melting peak that an object made of the powdery material produced, which is initially at least semi-crystalline, by means of laser sintering is made of an substantially amorphous or completely amorphous material.

The DSC curves obtained for the powdery material according to example V2 by means of methods DSC1 and DSC2 have at least qualitatively similar properties to the DSC curves shown in FIG. 7 and FIG. 8 for example V1. In particular, even in the case of example V2, the curve corresponding to segment ]2[ of method DSC1 has a melting peak which the curves corresponding to segments ]6[ of method DSC1 and ]8[ of method DSC2 do not have. Therefore, it can also be concluded for example V2 that the powdery material was at least partially semi-crystalline before the first melting and substantially amorphous or completely amorphous after the re-solidification, i.e. solidified after the first melting not in the form of a semi-crystalline material but in the form of a substantially amorphous or completely amorphous material. The powdery material produced according to example V2 loses its initially existing crystalline part due to the melting. Furthermore, it can be concluded that an object made of the initially at least partially semi-crystalline powdery material according to Example V2 by laser sintering consists of a substantially amorphous or completely amorphous material.

Examples V3 to V8

The production of powdery material according to the examples V3 to V8 corresponded, apart from the fact that an additive was dispersed in the polymer solution, to the production of powdery material according to the examples V1 and V2 described in detail above. In the case of the examples V3, V5, V7 and V8, the vane stirrer was operated at a stirring rate of 600 rounds per minute, while in the case of the examples V4 and V6, it was operated at a stirring rate of 450 rounds per minute.

The additive was carbon black particles (V3 to V6) or fumed silica (V7 and V8). Nanoparticles were preferred as additives. The quantities of the additive dispersed in the polymer solution were chosen differently as desired.

Table 7 shows results obtained by the DSC1 method ($T_m$ and $\Delta H_m$) and by optical methods (particle size and SPHT) for samples of powdery material according to the examples V3 to V8. Polyetherimide with the trade names "Ultem® 1040" (V3 to V7) and "Ultem® 1000" (V8) was used.

TABLE 7

| Example | Additive | $T_m$ [° C.] | $\Delta H_m$ [J/g] | Particle size [μm] | | | SPHT |
|---|---|---|---|---|---|---|---|
| | | | | d10 | d50 | d90 | |
| V3 | 1. quantity of carbon black | 275 | 3.2 | 10 | 35 | 88 | 0.95 |
| V4 | 1. quantity of carbon black | 292 | 1.2 | 36 | 130 | 271 | 0.97 |
| V5 | 2. quantity of carbon black | 280 | 1.1 | 15 | 28 | 41 | 0.94 |
| V6 | 2. quantity of carbon black | 292 | 1.3 | 27 | 93 | 252 | 0.97 |
| V7 | 1. quantity of fumed silica | 290 | 2.5 | 10 | 40 | 131 | 0.93 |
| V8 | 2. quantity of fumed silica | 298 | 1.0 | 19 | 41 | 68 | 0.96 |

The fact that the stirring rate of the vane stirrer has an influence on the particle size can be seen from the values given in Table 7: Faster stirring can lead to smaller particle size and changed particle size distribution as shown by the comparison of V3 with V4 and the comparison of V5 with V6. The variable amount of the additive dispersed in the polymer solution has an influence on the melting point, the specific melting enthalpy and the particle size, as can also be seen from the values given in Table 7.

Figure 9:
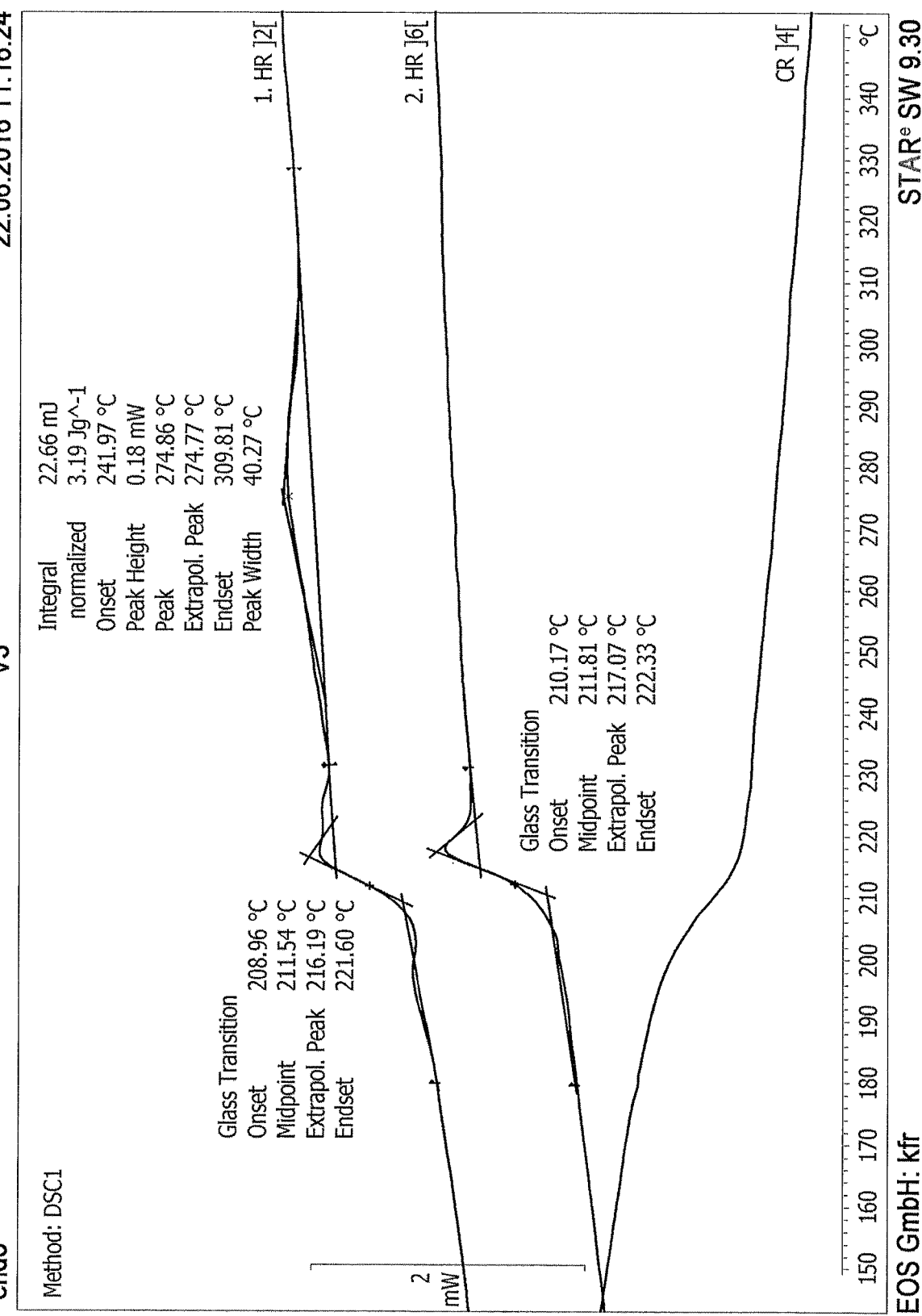
FIG. 9 shows DSC curves for another example according to the invention.

FIG. 9 shows DSC curves obtained for example V3 using the DSC1 method. The uppermost curve corresponding to segment ]2[ shows a melting peak, i.e. the sample of the powdery material produced was initially (at the beginning of segment ]2[) at least partially semi-crystalline. The mean curve shows no melt peak, i.e. the sample was substantially amorphous or completely amorphous at the beginning of segment ]6[. It follows from this that the initially at least partially semi-crystalline sample solidified after initial melting (segment ]2[) during cooling (segment ]4[) not in the form of a semi-crystalline material but in the form of a substantially amorphous or completely amorphous material. Powdery material produced according to example V3 thus loses its initially present crystalline part due to melting, i.e. it solidifies during cooling in such a way that the crystalline part present at the beginning of the segment ]2[ does not form again or does not form again to a substantial extent.

Figure 10:
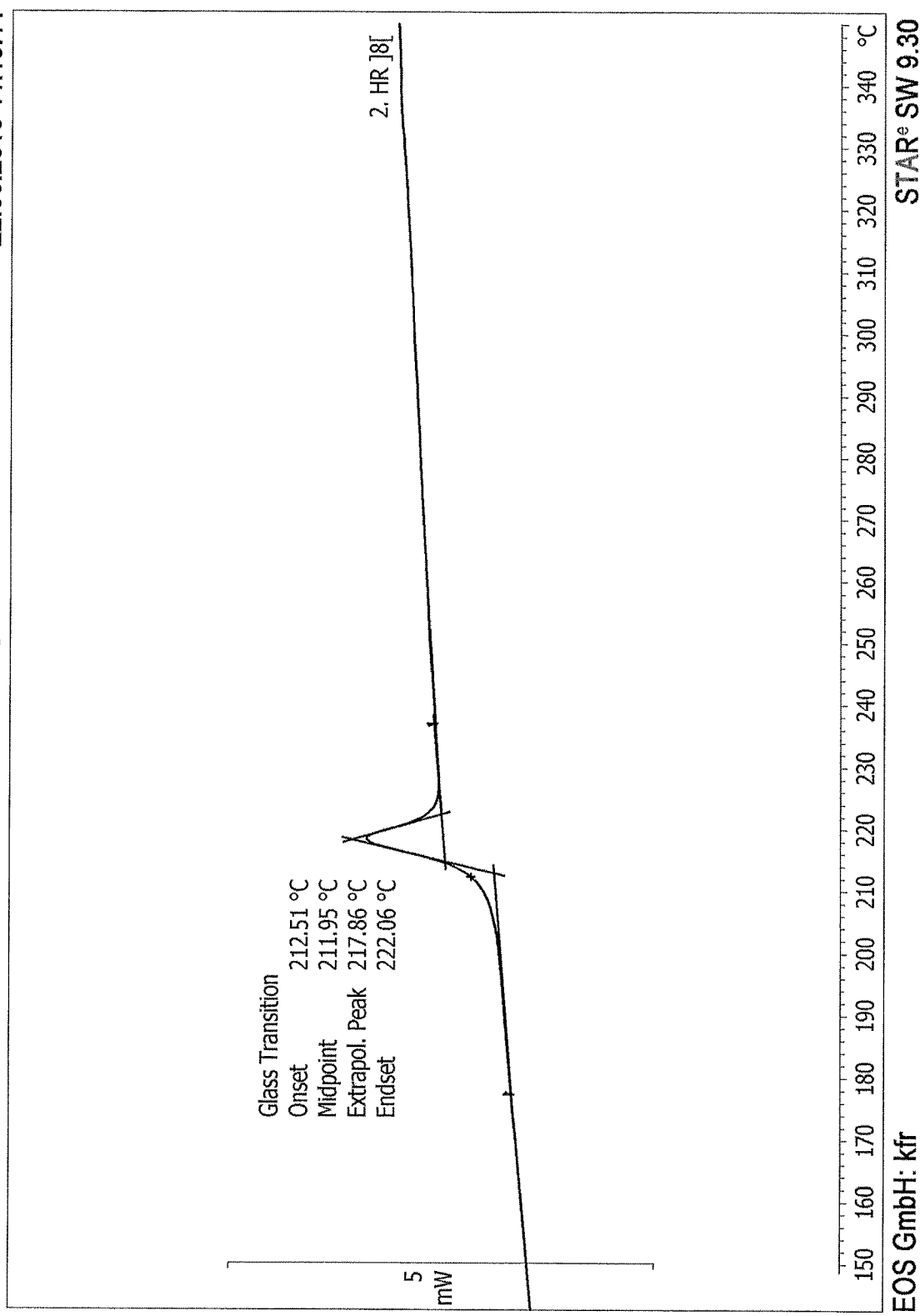
FIG. 10 shows another DSC curve for the same example.

FIG. 10 shows the curve corresponding to the segment ]8[ obtained for another sample of the powdery material according to example V3 using the DSC2 method. The curve shows no melt peak. It follows from this that an object made of the produced powdery material, which is initially at least semi-crystalline, by laser sintering, consists of a substantially amorphous or completely amorphous material.

The DSC curves obtained for the powdery material according to the examples V4 to V8 by means of the methods DSC1 and DSC2 show at least qualitatively similar properties as the DSC curves shown in FIG. 9 and FIG. 10 for the example V3. In particular, even in the case of examples V4 to V8, the curve corresponding to segment ]2[ of method DSC1 has a melting peak which the curves corresponding to segments ]6[ of method DSC1 and ]8[ of method DSC2 do not have. Therefore, it can also be concluded for the examples V4 to V8 that the powdery material was at least partially semi-crystalline before the first melting—also with the addition of functional additives—and substantially amorphous or completely amorphous after the re-solidification, i.e. after the first melting it did not solidify in the form of a semi-crystalline material but in the form of an substantially amorphous or completely amorphous material. Furthermore, it can be concluded that an object made from the initially at least partially semi-crystalline powdery material according to the examples V4 to V8 by means of laser sintering consists of a substantially amorphous or completely amorphous material.

Examples V9 to V11

The production of powdery material according to examples V9 to V11, apart from the fact that a polycarbonate was used as the polymer and drying was carried out in a nitrogen atmosphere in a convection furnace at 130° C., corresponded to the production of powdery material according to examples V1 and V5 described in detail above. The vane stirrer was operated at a stirring rate of 600 rounds per minute.

The polycarbonates used as starting materials for the production of the powdery material are marketed by SABIC under the trade names "RMC 8089" (examples V9 and V10) and "Lexan® 143R" (example V11).

In the case of example V10, unlike examples V9 and V11, an additive was dispersed in the polymer solution. For example, the additive consists of carbon black particles in the desired quantity.

Table 8 shows results obtained by the DSC1 method ($T_m$ and $\Delta H_m$) and by optical methods (particle size and SPHT) for samples of the powdery material according to examples V9 to V11.

TABLE 8

| Example | Polymer | $T_m$ [° C.] | $\Delta H_m$ [J/g] | Particle size [µm] | | | SPHT |
|---|---|---|---|---|---|---|---|
| | | | | d10 | d50 | d90 | |
| V9 | RMC 8089, SABIC | 240 | 25 | 20 | 38 | 62 | 0.93 |
| V10 | RMC 8089, SABIC | 233 | 25 | 13 | 28 | 46 | 0.94 |
| V11 | Lexan 143R, SABIC | 290 | 50 | — | — | — | — |

A comparison of the specific melting enthalpy values determined for the examples V1 to V11 shows that higher values can be expected for the specific melting enthalpy when using polycarbonates than for polyetherimides.

Figure 11:
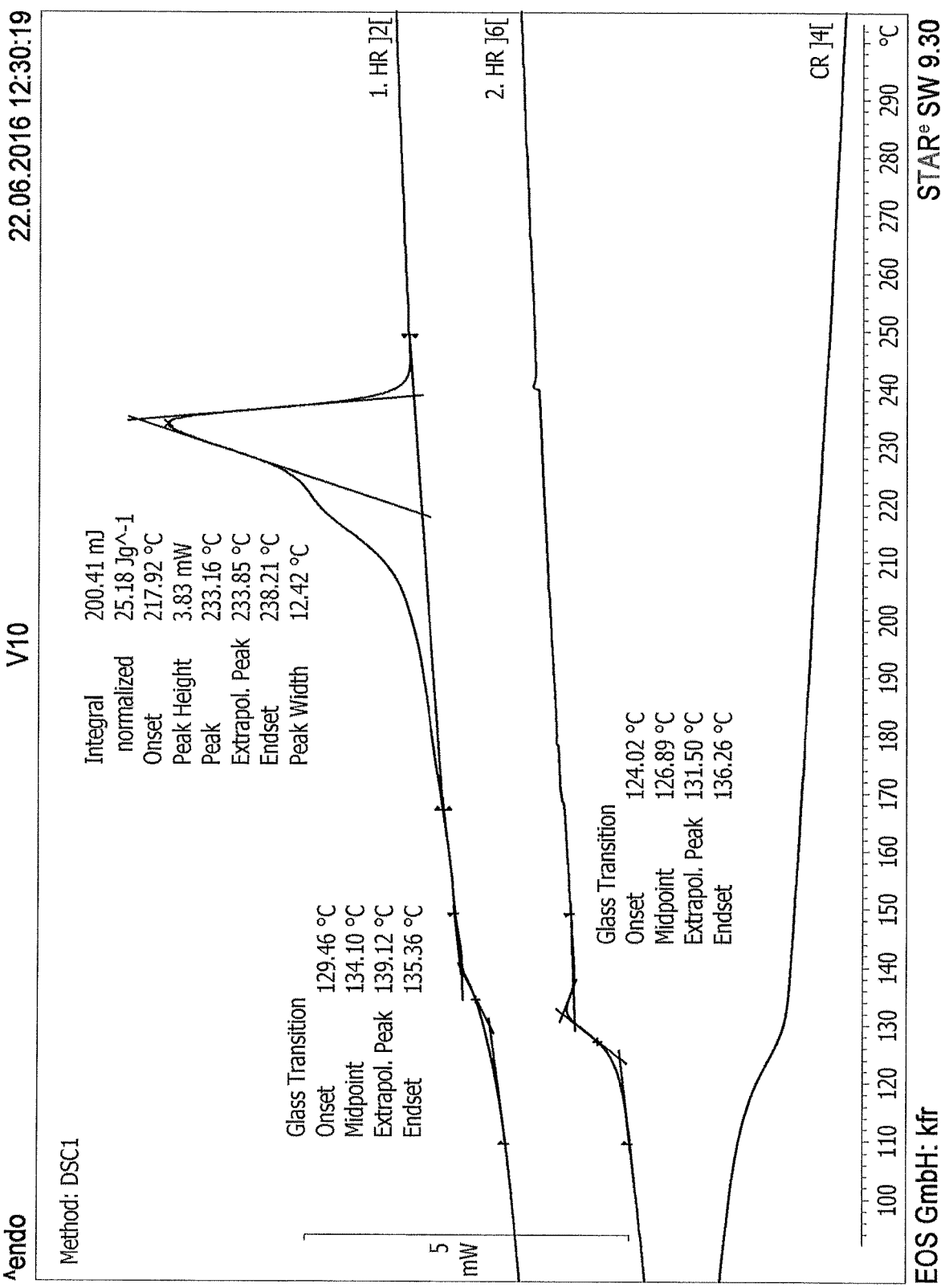
FIG. 11 shows DSC curves for another example according to the invention.

FIG. 11 shows DSC curves obtained for example V10 using the DSC1 method. The uppermost curve, corresponding to segment ]2[, shows a melting peak, i.e. the sample of the powdery material produced was initially—and also with the addition of functional additives—at least partially semi-crystalline (at the beginning of segment ]2[). The mean curve shows no melt peak, i.e. the sample was substantially amorphous or completely amorphous at the beginning of segment ]6[. It follows from this that the initially at least partially semi-crystalline sample solidified after initial melting (segment ]2[) during cooling (segment ]4[) not in the form of a semi-crystalline material but in the form of a substantially amorphous or completely amorphous material. Thus, powdery material produced according to example V10 loses its initially present crystalline part due to melting, i.e. it solidifies during cooling in such a way that the crystalline part present at the beginning of the segment ]2[ does not form again or does not form again to a substantial extent.

Figure 12:
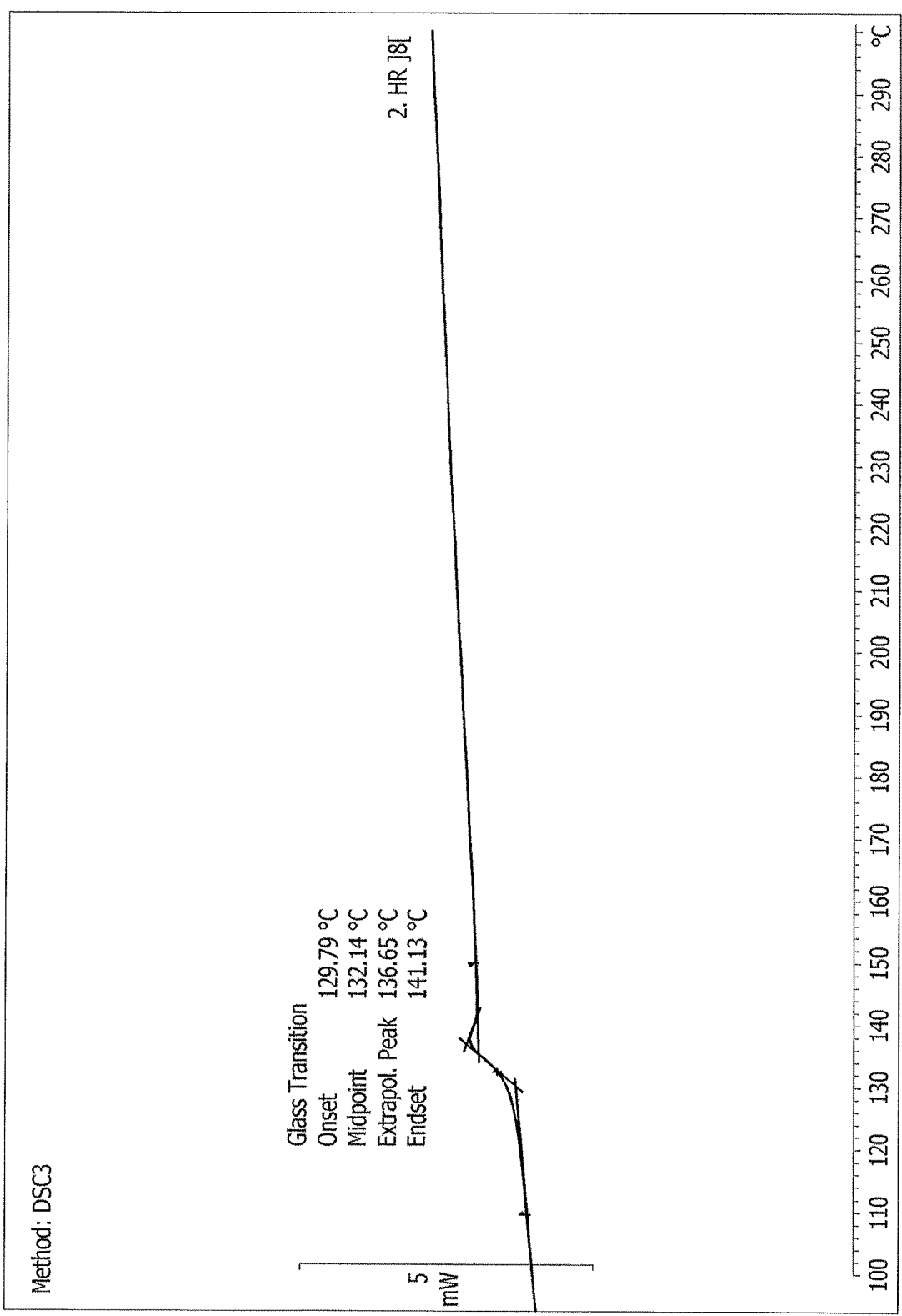
FIG. 12 shows another DSC curve for the same example.

FIG. 12 shows the curve corresponding to the segment ]8[ obtained for another sample of the powdery material according to example V10 using the DSC3 method. The curve shows no melt peak. It follows from this that an object made of the produced powdery material, which is initially at least semi-crystalline, by laser sintering, consists of a substantially amorphous or completely amorphous material.

The DSC curves obtained for the powdery material according to the V9 and V11 examples using the DSC1 and DSC3 methods have at least qualitatively similar properties to the DSC curves shown in FIG. 11 and FIG. 12 for the V10 example. In particular, even in the case of examples V9 and V11, the curve corresponding to segment ]2[ of method DSC1 has a melting peak which the curves corresponding to segments ]6[ of method DSC1 and ]8[ of method DSC2 do not have. Therefore, it can also be concluded for the examples V9 and V11 that the powdery material was at least partially semi-crystalline before the first melting and substantially amorphous or completely amorphous after the re-solidification, i.e. after the first melting (segment ]2[) it did not solidify in the form of a semi-crystalline material but in the form of a substantially amorphous or completely amorphous material during the cooling (segment ]4[). The powdery material produced according to the examples V9 and V11 thus loses its initially present crystalline portion through melting. Furthermore, it can be concluded that an object made of the initially at least semi-crystalline powdery material according to the examples V9 and V11 by laser sintering is made of a substantially amorphous or completely amorphous material.

Examples V12 to V19

The production of powdery material according to the examples V12 to V15 and V19 corresponds, apart from the fact that polycarbonate and polyetherimide were dissolved together in dichloromethane and the precipitated polymer or polyblend was dried in a nitrogen atmosphere in a convection furnace at 130° C., to the production of powdery material described in detail above according to example V1. The vane stirrer was operated at a stirring rate of 600 rounds per minute.

Polycarbonate and polyetherimide were used in a mass ratio of 1:1 (examples V12 and V13), 2:1 (example V14), 1:2 (example 15) and 2:3 (example V19). The V12 and V13 examples differ in the rate at which dichloromethane was distilled, V13 had a higher rate than V12, so that the DSC curve for V13 has a peak at 245° C. (see FIG. 13) which corresponds to the kinetically preferred crystallite structure and which the DSC curve does not have for V12.

The polycarbonate used as starting material and the polyetherimide used as starting material are sold by SABIC under the trade names "Lexan® 143R" and "Ultem® 1000" respectively.

Polycarbonate and polyetherimide were dissolved together in dichloromethane to produce the powdery material. The concentration of the solution of polycarbonate and polyetherimide was 20 mass percent. The powdery material was precipitated from the solution. At least in part, the precipitated powdery material was a polyblend of polycarbonate and polyetherimide.

For the production of the powdery material, the powdery material was tempered according to example V15 in the case of examples V16 to V18. For tempering, the powdery material was placed in an aluminum shell in a layer about 1 to 2 cm thick and the aluminum shell was closed with a perforated aluminum lid in a convection furnace (manufacturer: Hereaus) the powdery material was tempered under nitrogen atmosphere (inflow: 1.5 m³/h nitrogen with a purity of >99%). The furnace was heated from room temperature to 200° C. within one hour. The furnace was then heated to the target temperature (e.g. 220° C., 240° C., 250° C.) within one hour. The target temperature was maintained for another hour. Natural cooling in the furnace to below 60° C. then followed. The powdery material was sieved. The target temperature was 220° C. (example V16), 240° C. (example V17) or 250° C. (example V18).

Table 9 shows results obtained using the DSC1 method ($T_m$ and $\Delta H_m$) and optical methods (particle size and SPHT) for samples of powdery material according to the examples V12 to V19. If a double peak is present, as is the case with the DSC curves corresponding to the segment ]2[ for the examples V13 to V15 and V19, the melting point and the specific melting enthalpy are given in Table 9 for each of the two peaks (referred to as P1 and P2) of the double peak within a table field.

TABLE 9

| Example | Polymers | $T_m$ [° C.] | $\Delta H_m$ [J/g] | Particle size [µm] | | | SPHT |
|---|---|---|---|---|---|---|---|
| | | | | d10 | d50 | d90 | |
| V12 | Lexan 143R + Ultem 1000 (1:1) | 280 | 15 | 7 | 24 | 67 | 0.91 |
| V13 | Lexan 143R + Ultem 1000 (1:1) | 245 (P1) 273 (P2) | 6 (P1) 8 (P2) | 7 | 32 | 147 | 0.89 |
| V14 | Lexan 143R + Ultem 1000 (2:1) | 245 (P1) 278 (P2) | 10 (P1) 8 (P2) | — | — | — | — |
| V15 | Lexan 143R + Ultem 1000 (1:2) | 247 (P1) 269 (P2) | 7 (P1) 4 (P2) | — | — | — | — |
| V16 | V15, tempered at 220° C. | 252 | 27 | — | — | — | — |
| V17 | V15, tempered at 240° C. | 266 | 26 | — | — | — | — |
| V18 | V15, tempered at 250° C. | 273 | 18 | — | — | — | — |
| V19 | Lexan 143R + Ultem 1000 (2:3) | 243 (P1) 262 (P2) | 4 (P1) 4 (P2) | 9 | 20 | 54 | 0.91 |

Figure 13:
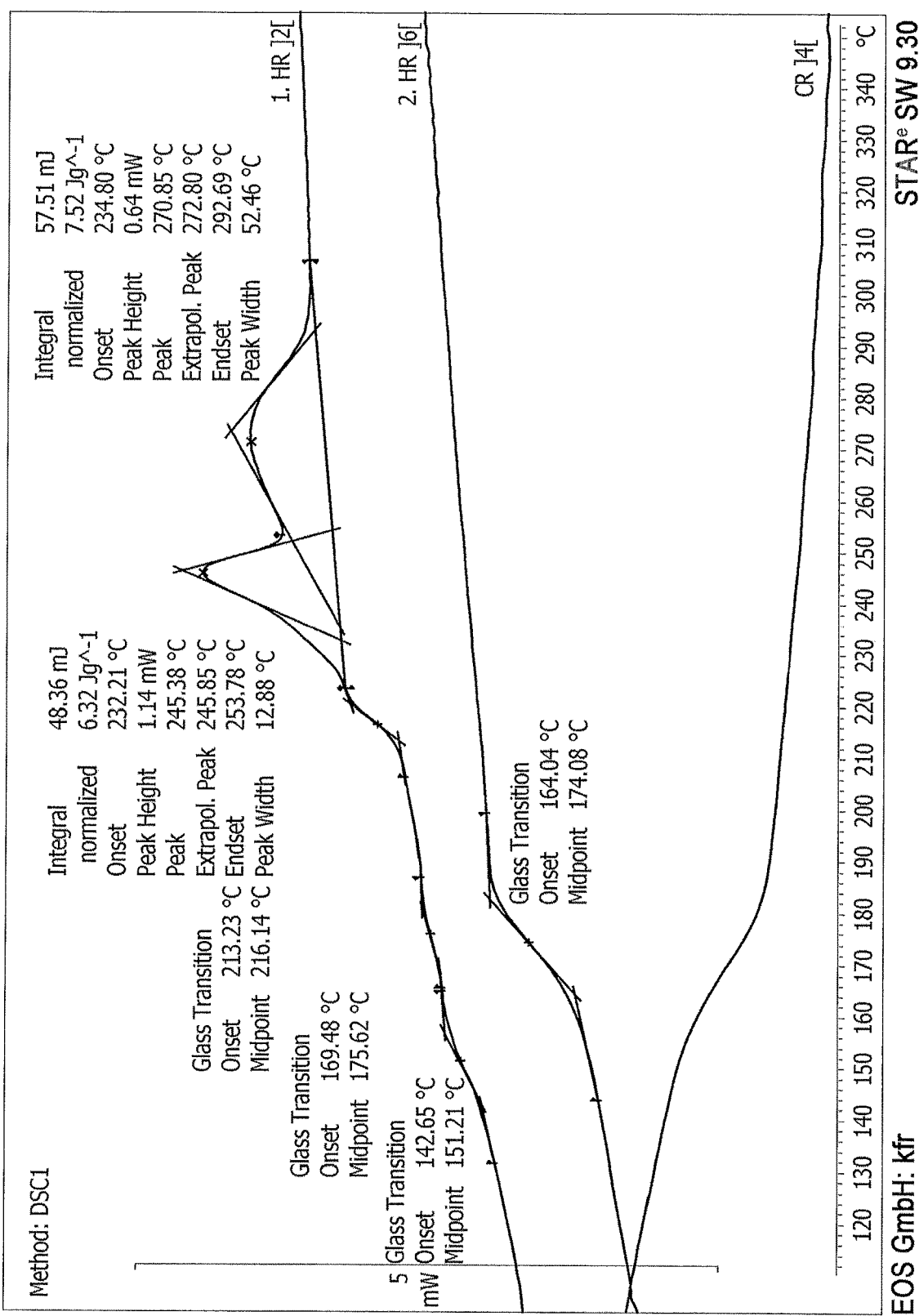
FIG. 13 shows DSC curves for another example according to the invention.

FIG. 13 shows DSC curves obtained for example V13 using the DSC1 method. The uppermost curve corresponding to segment ]2[ has a double peak corresponding to two melting peaks, i.e. the sample of the powdery material produced was initially (at the beginning of segment ]2[) at least partially semi-crystalline. The mean curve shows no melt peak, i.e. the sample was substantially amorphous or completely amorphous at the beginning of segment ]6[. It follows from this that the initially at least partially semi-crystalline sample solidified after initial melting (segment ]2[) during cooling (segment ]4[) not in the form of a semi-crystalline material but in the form of a substantially amorphous or completely amorphous material. Powdery material produced according to example V13 thus loses its initial crystalline part due to melting, i.e. it solidifies during cooling in such a way that the crystalline part present at the beginning of the segment ]2[ does not form again or does not form again to a substantial extent. Furthermore, it can be seen in FIG. 13 that the uppermost curve shows three glass transitions, one for the polycarbonate, one for the polyetherimide and a mixed glass transition. From this it can be concluded that a polyblend with several phases is partially present. The middle curve shows only the mixed glass transition.

Figure 14:
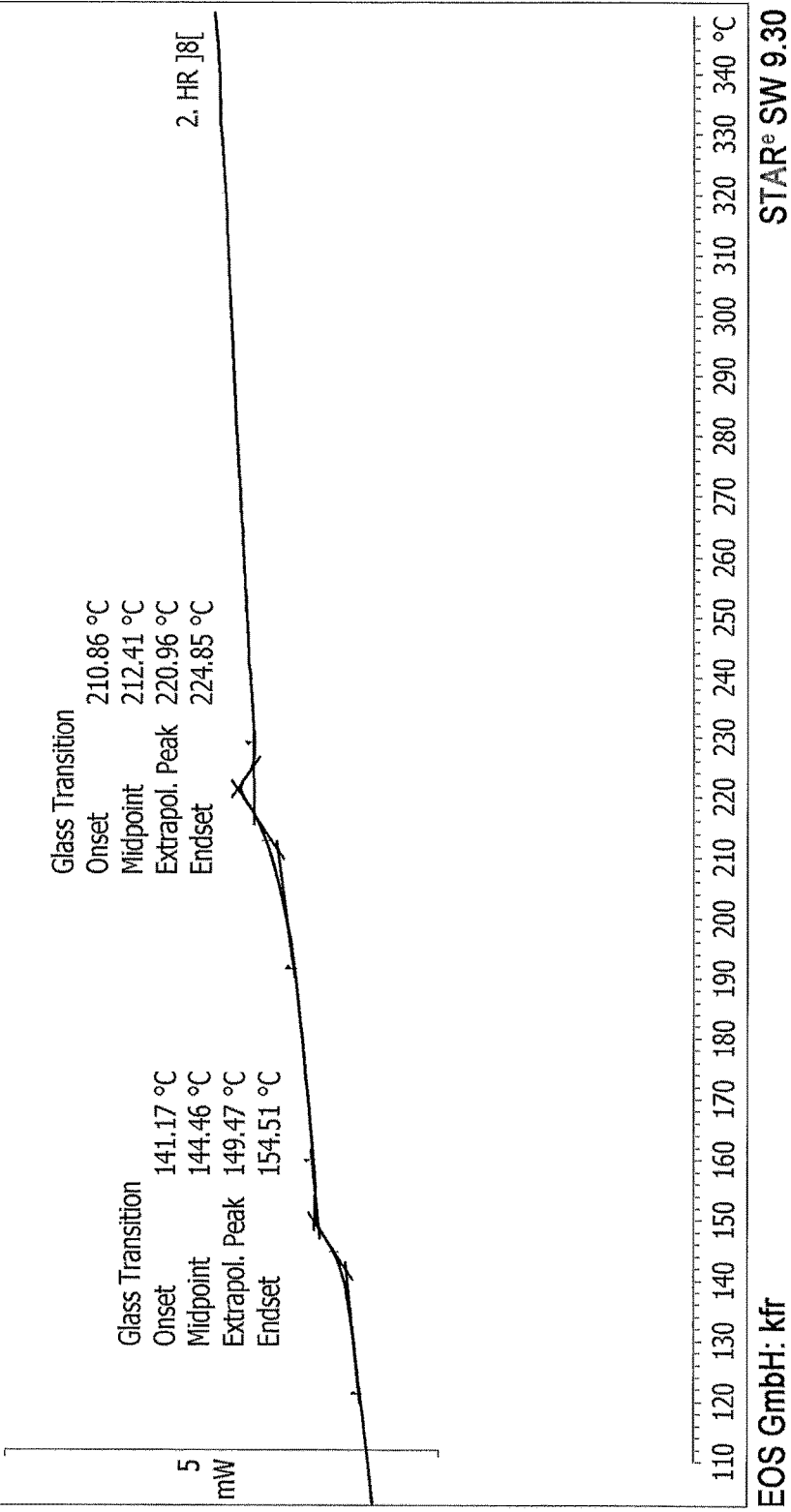
FIG. 14 shows another DSC curve for the same example.

FIG. 14 shows the curve corresponding to the segment ]8[ obtained for another sample of the powdery material according to example V13 using the DSC2 method. The curve shows no melt peak. It follows from this that an object made of the powdery material produced, which is initially at least semi-crystalline, by laser sintering is made of a substantially amorphous or completely amorphous material. Furthermore, only the glass transitions for polycarbonate and polyetherimide are visible in FIG. 14, but no glass transition for the polyblend, which indicates that in an object produced from the produced powdery material by laser sintering, the polyblend is substantially segregated and thus a polyphase polyblend is present.

In the case of examples V12 and V14 to V19, the curve corresponding to segment ]2[ of method DSC1 has melting peaks (in the form of a double peak) which the curves corresponding to segments ]6[ of method DSC1 and ]8[ of method DSC2 do not have. Therefore, it can also be concluded for the examples V12 and V14 to V19 that the powdery material was at least partially semi-crystalline before the first melting and substantially amorphous or completely amorphous after the re-solidification, i.e. solidified after the first melting not in the form of a semi-crystalline material but in the form of a substantially amorphous or completely amorphous material. The powdery material produced according to the examples V12 and V14 to V19 thus loses its initially present crystalline portion as a result of melting. Furthermore, it can be concluded that an object made of the initially at least semi-crystalline powdery material according to the examples V12 and V14 to V19 by means of laser sintering consists of a substantially amorphous or completely amorphous material.

Figure 15:
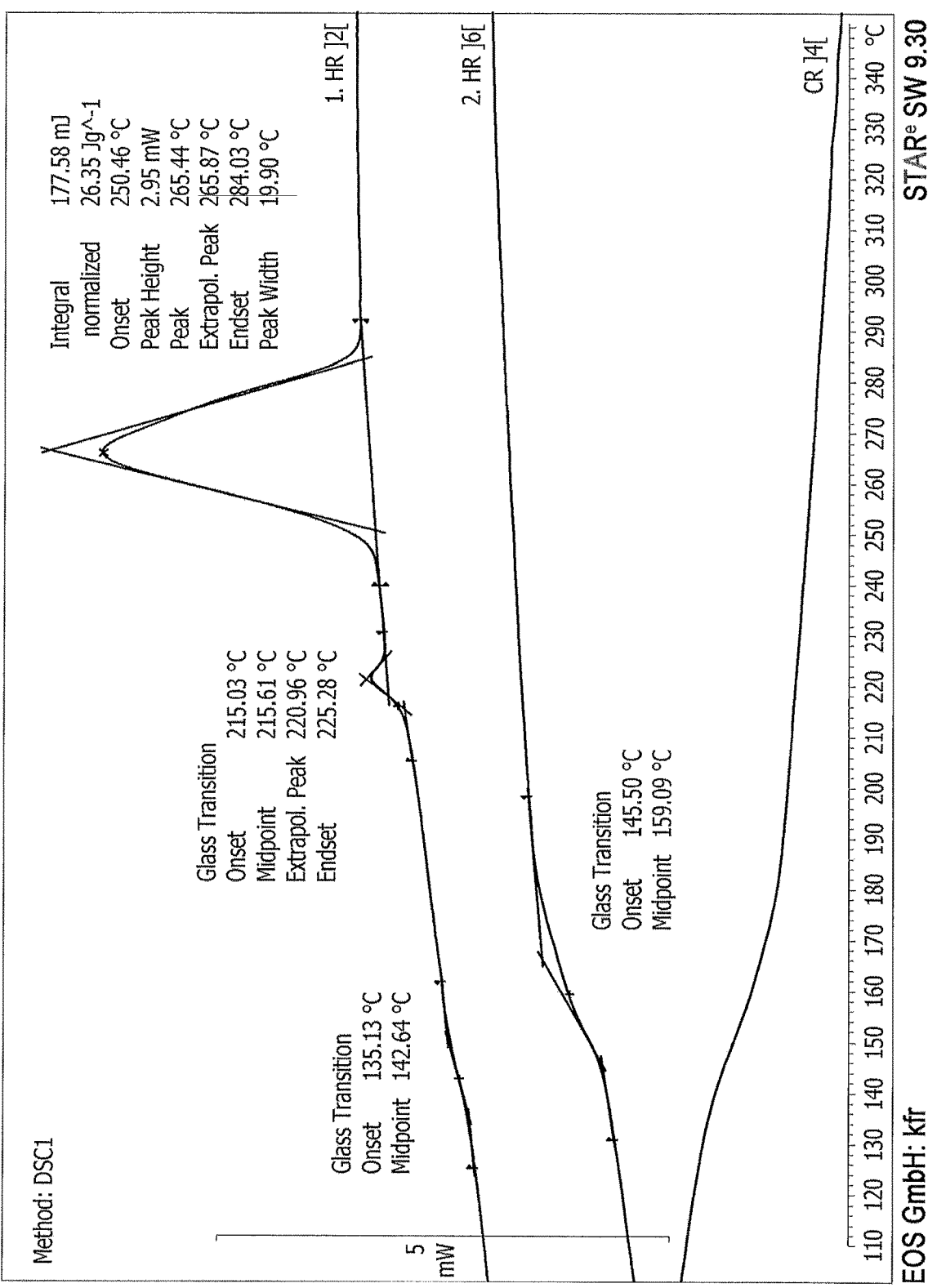
FIG. 15 shows DSC curves for another example according to the invention.

FIG. 15 shows DSC curves obtained for example V17 using the DSC1 method. The uppermost curve, corresponding to segment ]2[, has a single melt peak and no double peak.

A comparison of the values given for the example V15 on the one hand and the examples V16 to V18 in Table 9 shows that the melting enthalpy $\Delta H_m$ can be significantly increased by tempering. This reduces, for example, the sticking together of the powder particles. In addition, tempering shifts the melting point to a higher temperature, enabling a higher processing temperature. At the same time, the half-width of the melting peak may be reduced.

Examples V20 to V23

A polyetherimide preferably in powdery or granulated form was dissolved in N,N-dimethylacetamide to give a solution of 5 mass percent polyetherimide. An additive was dispersed in the polymer solution. The additive was carbon black particles in the desired amount. In particular, nanoparticles were used as additives. The polymer solution was slowly added at room temperature to a liquid known as a "non-solvent" in which the N,N-dimethylacetamide is soluble and in which the polyetherimide is insoluble or poorly soluble. A vane stirrer was used to stir at 250 rounds per minute. After dropping, the volume ratio between N,N-dimethylacetamide and the non-solvent was 1:3.3. By dropping the polymer solution into the non-solvent, the polyetherimide precipitated from the solution. The precipitated polymer was filtered off, washed with warm water and dried at 150° C. in a nitrogen atmosphere in a convection furnace.

Polyetherimides suitable as starting materials are marketed by SABIC under the trade names "Ultem® 1000", "Ultem® 1010" and "Ultem® 1040". Ultem® 1040 was used in the examples.

The following non-solvent materials were used: ethyl acetate (example V20), acetone (example V21), 96% ethanol (example V22) and distilled water (example V23).

Table 10 shows results obtained using the DSC1 method ($T_m$ and $\Delta H_m$) and optical methods (particle size and SPHT) for samples of powdery material according to the examples V20 to V23.

TABLE 10

| Example | Non-solvent | $T_m$ [° C.] | $\Delta H_m$ [J/g] | Particle size [μm] | | | SPHT |
|---|---|---|---|---|---|---|---|
| | | | | d10 | d50 | d90 | |
| V20 | ethyl acetate | 290 | 2.2 | 20 | 42 | 69 | 0.81 |
| V21 | Acetone | 291 | 1.2 | 12 | 33 | 62 | 0.80 |
| V22 | Ethanol 96 % | 289 | 1.1 | 8 | 22 | 40 | 0.83 |
| V23 | distilled water | 287 | 1.2 | 7 | 21 | 38 | 0.84 |

Figure 16:
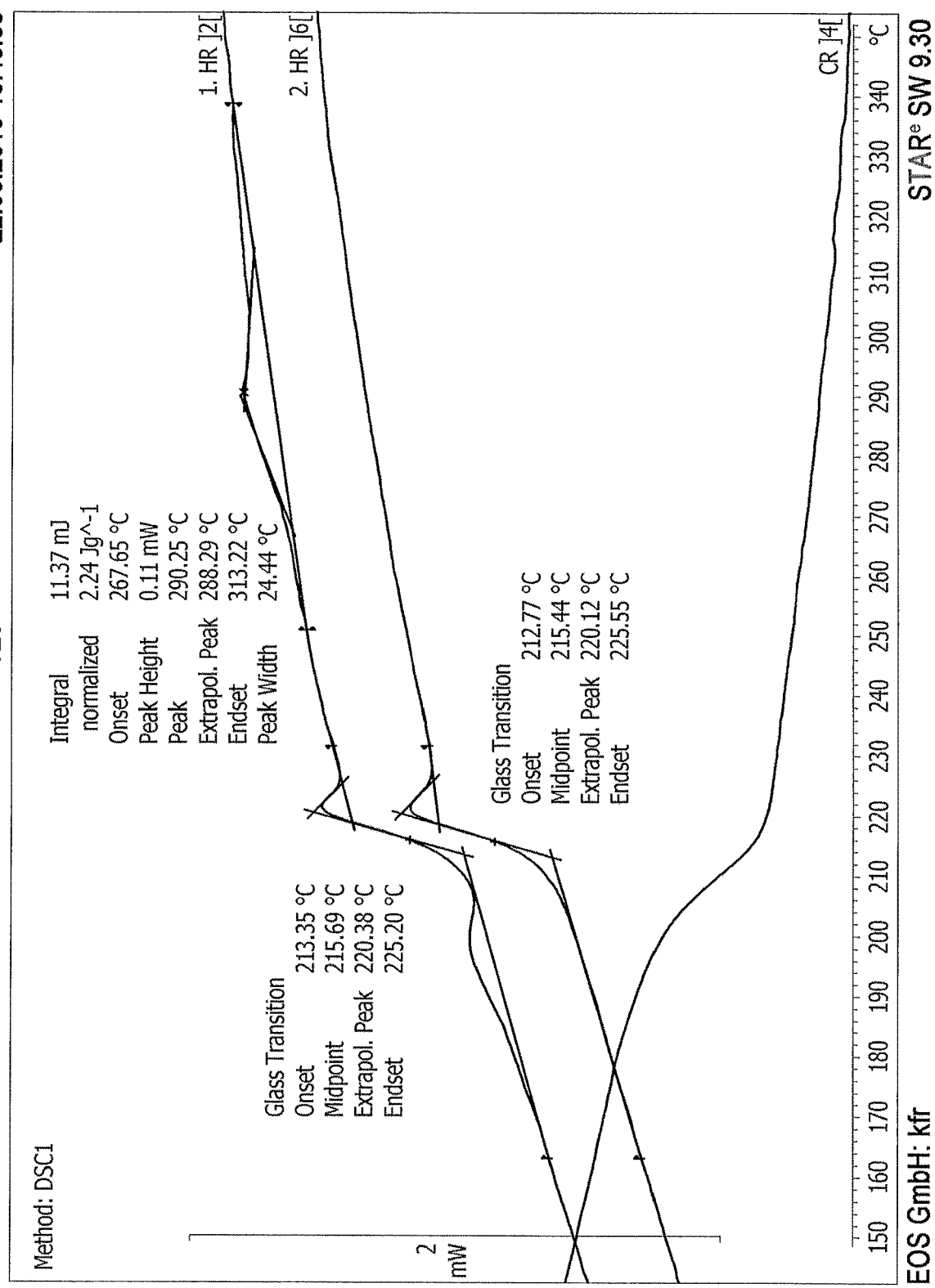
FIG. 16 shows DSC curves for yet another example according to the invention.

FIG. 16 shows DSC curves obtained for example V20 using the DSC1 method. The uppermost curve corresponding to segment ]2[ has a melting peak, i.e. the sample of the powdery material produced was initially (at the beginning of segment ]2[) at least partially semi-crystalline. The mean curve shows no melt peak, i.e. the sample was substantially amorphous or completely amorphous at the beginning of segment ]6[. It follows from this that the initially at least partially semi-crystalline sample solidified after initial melting (segment ]2[) during cooling (segment ]4[) not in the form of a semi-crystalline material but in the form of a substantially amorphous or completely amorphous material. The powdery material produced according to example V20 thus loses its initially present crystalline part due to melting, i.e. it solidifies during cooling in such a way that the crystalline part present at the beginning of the segment ]2[ does not form again or does not form again to a substantial extent.

Figure 17:
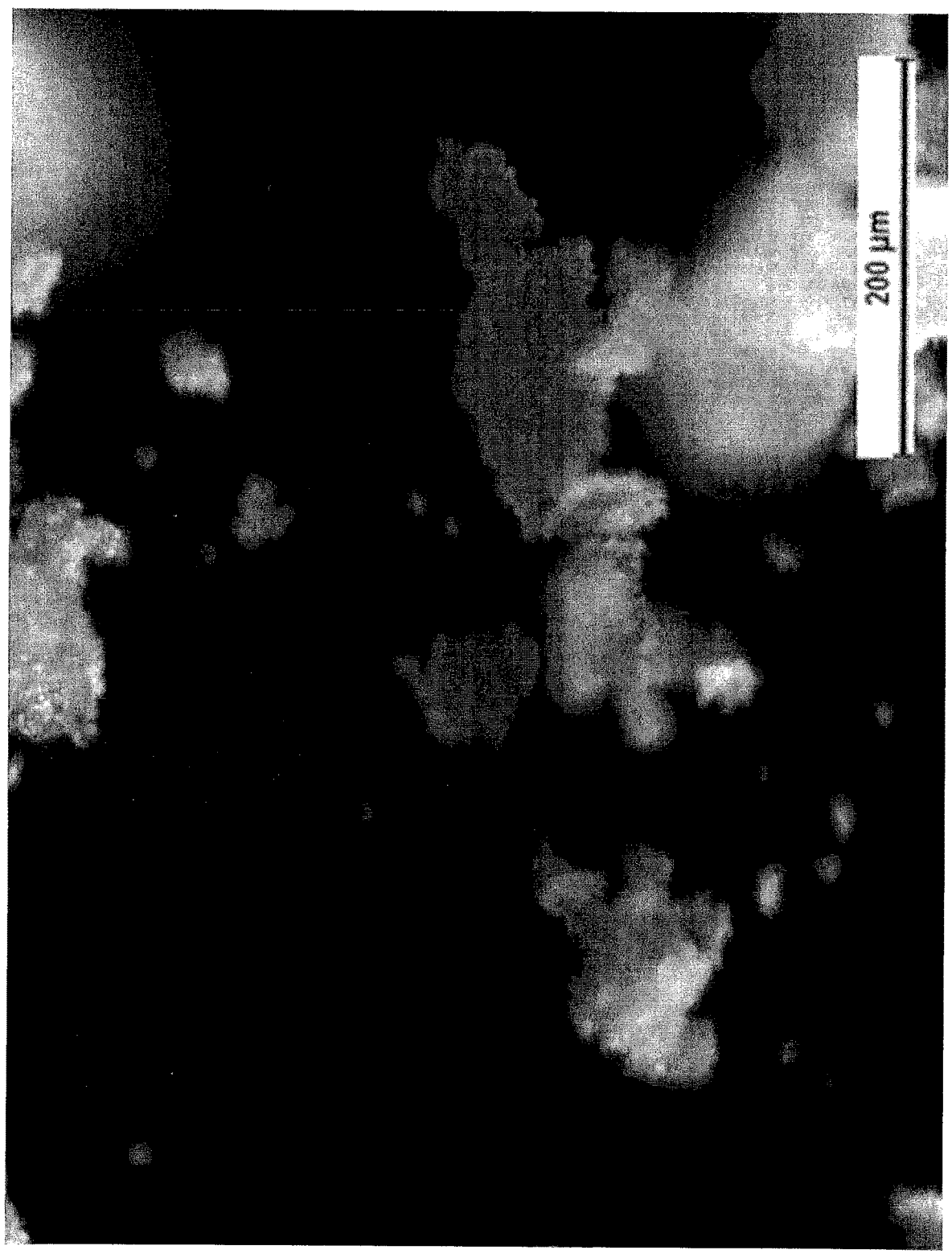
FIG. 17 shows a microscopic image of a powdery material according to the same example.
Figure 18:
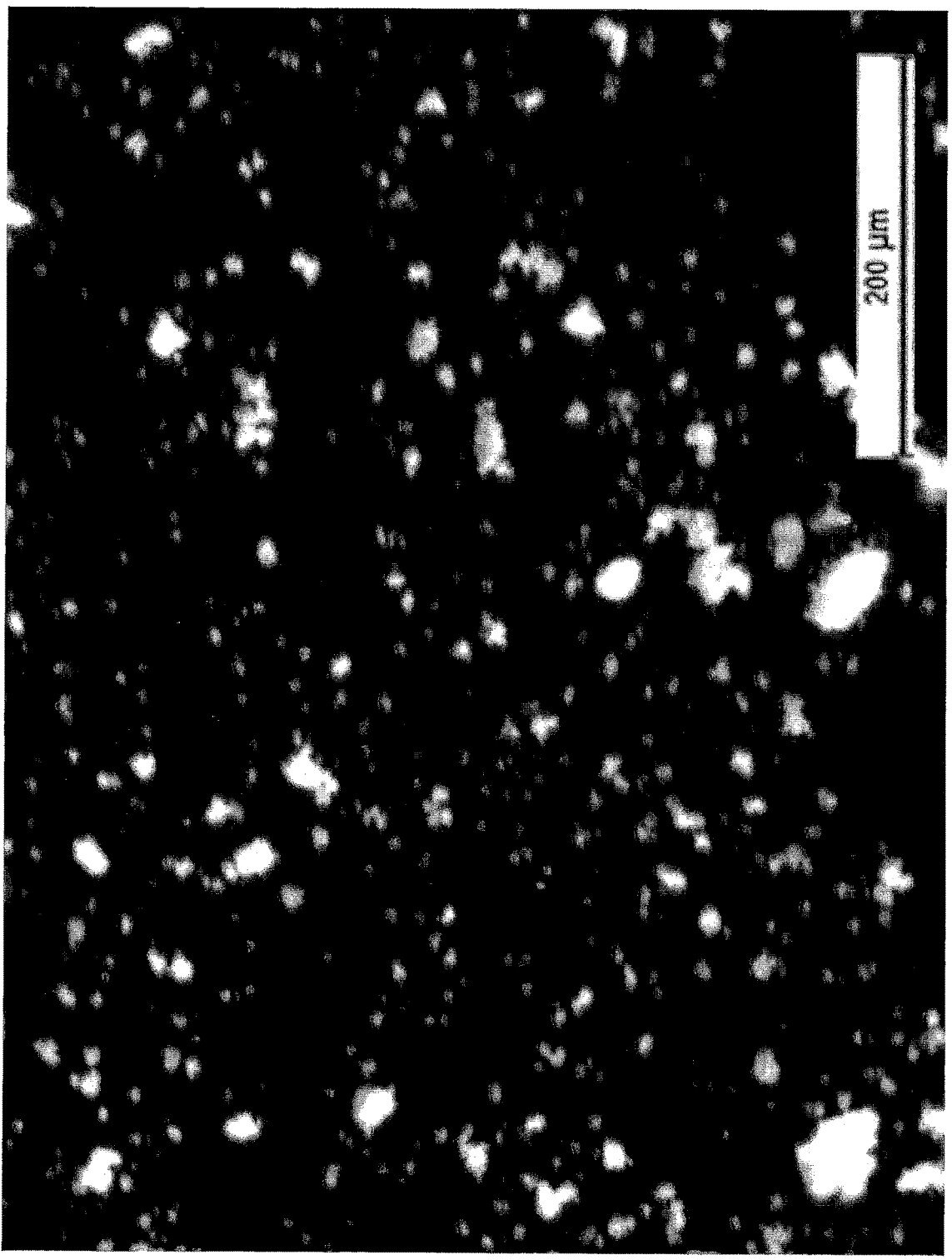
FIG. 18 shows a microscopic image of a powdery material according to another example of the present invention.

Microscopic analysis of the powdery material shows that the particles are composed of partly aggregated primary particles and that the particles have a high surface area and a low sphericity. Particle size, aggregation tendency and surface roughness increase with decreasing polarity of the non-solvent. FIG. 17 shows a microscopic image of the powdery material produced according to example V20. FIG. 18 shows a microscopic image of the powdery material produced according to example V22. A comparison of these two images with the image shown in FIG. 6 of the powdery material produced according to example V2 shows that powder particles with considerably higher sphericity were obtained by the process used in example V2 to produce the powdery material than by the process used in examples V20 and V22.

Example V24

The powdery material according to example V24 was produced and tempered like the powdery material according to example V17. However, the examination of the powdery material was carried out differently than in the case of example V17 using the DSC4 method. The DSC4 method simulates a laser sintering process in which the powdery material only partially melts.

Figure 19:
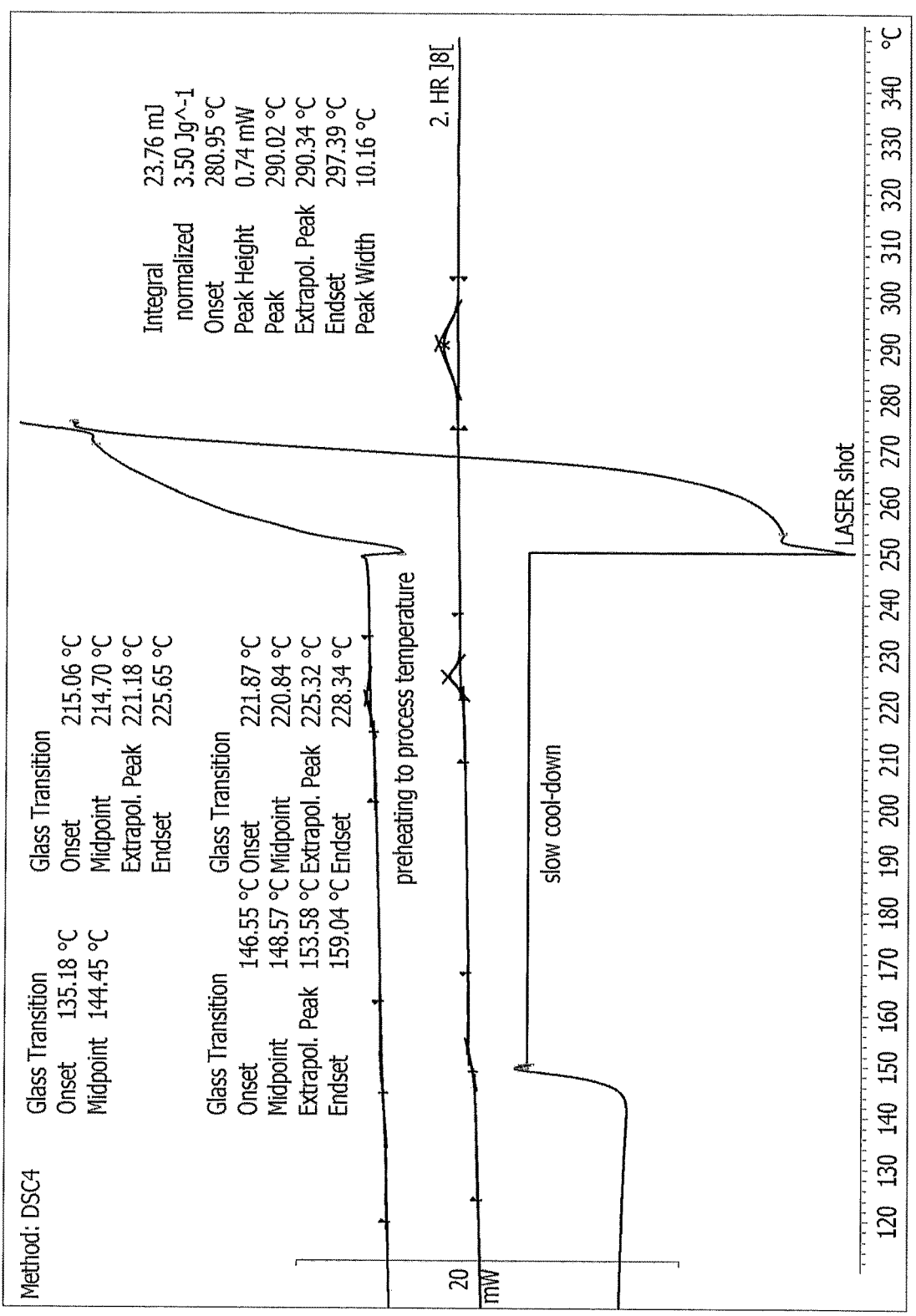
FIG. 19 shows DSC curves for another example according to the invention.

FIG. 19 shows DSC curves obtained for the V24 example using the DSC4 method. No crystallization was visible during cooling. In the segment ]8[ a melting peak corresponding to a melting point of $T_m=290°$ C. and a melting enthalpy of $\Delta H_m=3.5$ J/g can be recognized. For example V17, a melting peak at $T_m=266°$ C. and a melting enthalpy of $\Delta H_m=26$ J/g (see Table 9), i.e. a considerably higher value than 3.5 J/g, was detected. It follows from this that in the case of example V24, the first partial melting (segments ]2[ and ]3[) resulted in a reduction of the crystalline portion of the sample and that no crystallization occurred during cooling (segments ]4[, ]5[ and ]6[). This means that solidifying material did not solidify in the form of a semi-crystalline material but in the form of a substantially amorphous or completely amorphous material.

Example V25

The powdery material according to example V25 is produced like the powdery material in example V1. However, the polyetherimide copolymer marketed by SABIC under the trade name Ultem® 5001 is used as the starting material.

The analysis results from the article by K. M. NELSON et al. quoted above. By appropriate treatment, it is possible to achieve a crystallinity of up to 30% for the melt-amorphous material.

COMPARATIVE EXAMPLES

The samples used for comparative experiments, which were not carried out according to the invention, were untreated powdery materials which, for example, were used as starting materials in the case of examples V1 and V2 or V11, i.e. these materials were not treated by dissolving them in a solvent such as dichloromethane or N,N-dimethylacetamide and precipitating them from this solution.

Figure 20:
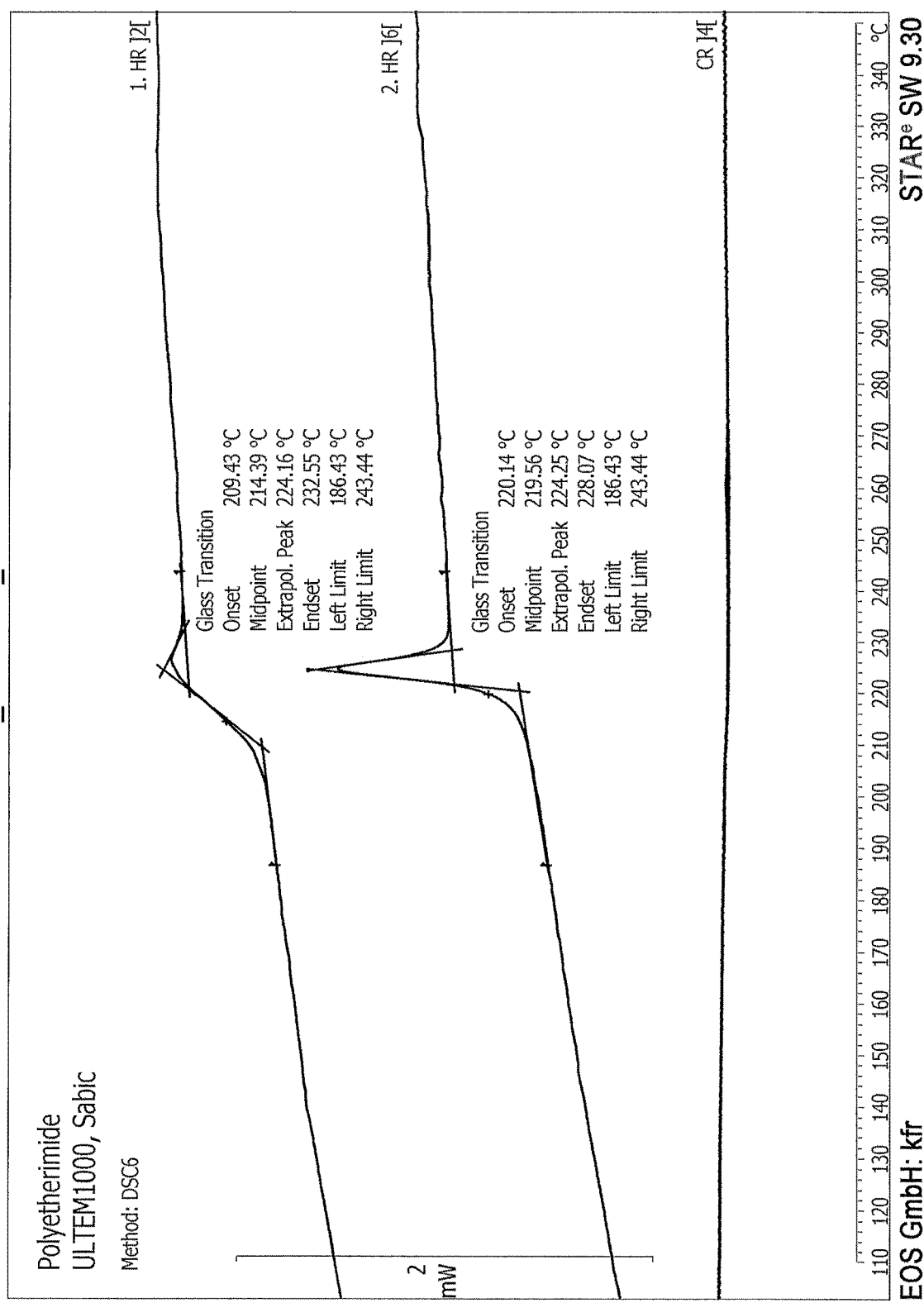
FIG. 20 shows DSC curves for a comparative example which was not prepared according to the invention.
Figure 21:
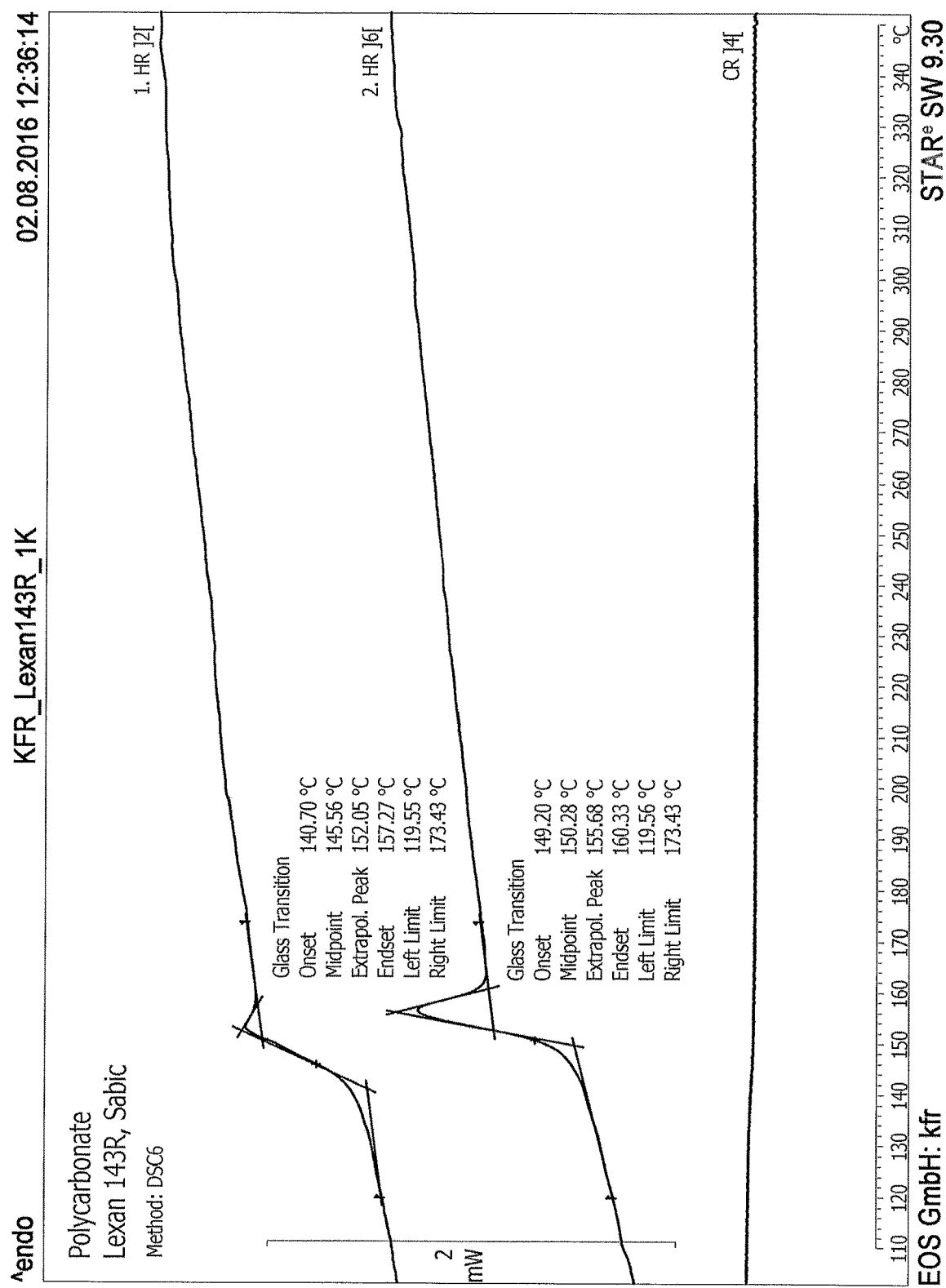
FIG. 21 shows DSC curves for another comparative example which was not prepared according to the invention.

FIGS. 20 and 21 show DSC curves from comparative experiments. FIG. 20 shows DSC curves for the polyetherimide, which was used as the starting material in examples V1 and V2, and FIG. 21 shows DSC curves for the polycarbonate, which was used as the starting material in example V11. The DSC curves were obtained using the DSC6 method. In contrast to the examples V1, V2 and V11, the uppermost curve corresponding to segment ]2[ has no melting peak, i.e. the sample of the powdery material was already substantially amorphous or completely amorphous at the beginning of segment ]2[. In contrast, the powdery material is selected or treated according to the invention in such a way that it is initially at least partially semi-crystalline. Also, the middle curve shows no melt peak, i.e. the sample was also at the beginning of the segment ]6[ substantially or completely amorphous. It follows from this that after the first melting (segment ]2[) the sample solidified again during cooling (segment ]4[) in the form of a substantially amorphous or completely amorphous material. In order to exclude the possibility that the solidification in amorphous form could only have taken place due to relatively rapid cooling, the cooling rate corresponding to segment ]4[was chosen relatively low (considerably lower than in method DSC1, see Table 1).

Example Series V26

A non-crystalline melt-amorphous polyetherimide having repeating units according to the formula

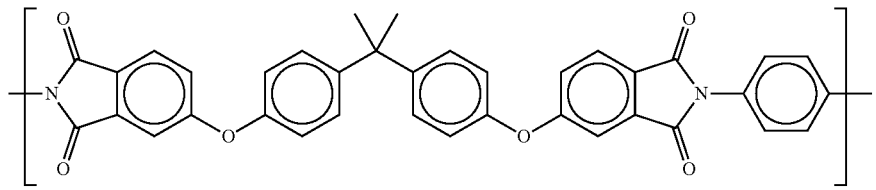

which is marketed by SABIC under the trade name "Ultem® CRS5001", has been subjected to a crystallization treatment in unground granular form by the action of at least 24 hours of dichloromethane. The almost complete crystallization after this period was demonstrated in preliminary tests by analysis of the granules using the DSC1 method. Longer residence times showed no increase in melt enthalpy.

After crystallization had been completed, the non-solvent was removed and the crystallized polymer granulate was subjected to grinding on a Torbellino type pin mill under cooling. The product was fractionated using a turbo sieve with a mesh size of 75 µm. The screen passage was used as product.

By varying the grinding parameters different products could be produced: Products P1, P2, and P3.

In a comparative example, the same granulate Ultem CRS5001 was ground in amorphous form, without prior crystallization treatment. In contrast to the products P1 to P3, fractionation was carried out with the turbo sieve at a mesh size of 104 µm. In addition, before the analysis of the sample, a protective sieving was carried out with a vibrating sieve at 106 µm mesh size. The product of this grinding is referred to as P4 in the following.

In a further modification, product P4 was then crystallized in dichloromethane to obtain product P5.

Table 11 shows the particle size distribution and grain shape of the products obtained. It becomes clear that the grinding of the pre-crystallized material results in an even, narrow particle size distribution, independent of the selected grinding parameters. The grain shape is also comparable in all cases.

Figure 22:
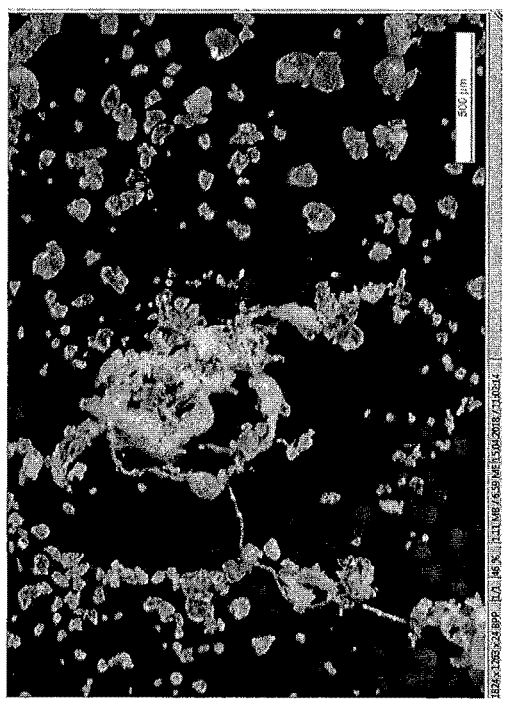
FIG. 22 shows a microscopic image of a powdery material according to a comparative example (sample P4 from test series V26).

On the other hand, the material that was ground in amorphous form is basically coarser and the grinding throughput in kg/h is reduced by about the factor XY compared to the pre-crystallized material. The latter has a negative effect on the economic efficiency of powder production. Grinding with a finer sieve showed no significant sieve passage. Mostly fibrous particles were formed, as they are still present in sample P4 (FIG. 22). Such fibrous particles lead to the formation of lumps, which lead to processing problems on the LS system and in particular have a negative effect on the powder application density due to deteriorated flow behavior. This is indicated by the bulk density according to DIN EN ISO 60, which is also included in Table 11. The amorphous ground powder P4 shows a significantly reduced bulk density compared to the samples P1 to P3 ground in semi-crystalline form. The post-crystallized material P5 also shows a significant increase in bulk density, which can be attributed to the detectable rounding effect caused by the solvent treatment (SPHT=0.91). A corresponding rounding effect can also be expected for semi-crystalline ground powder. A disadvantage for the amorphously ground, subsequently crystallized material P5, however, is the high distribution width and the high proportion of fine powder, which experience has shown can lead to problems during processing on LS systems. This effect is not to be expected to this extent in the post-crystallization of semi-crystalline ground powders, since the formation of the fine fraction is due in particular to the fibrous structures. The fibers, which have very small diameters, clump or break to very fine particles with diameters smaller than 10 µm.

TABLE 11

| Example | d10 [µM] | d50 [µM] | d90 [µM] | SPHT [—] | Bulk density [g/100 cm$^3$] |
|---|---|---|---|---|---|
| P1 | 27 | 56 | 77 | 0.89 | 44.0 |
| P2 | 24 | 49 | 74 | 0.89 | 46.0 |
| P3 | 23 | 50 | 77 | 0.89 | 45.4 |
| P4 | 24 | 56 | 103 | 0.86 | 41.0 |
| P5 | 11 | 71 | 123 | 0.91 | 45.4 |

Figure 25:
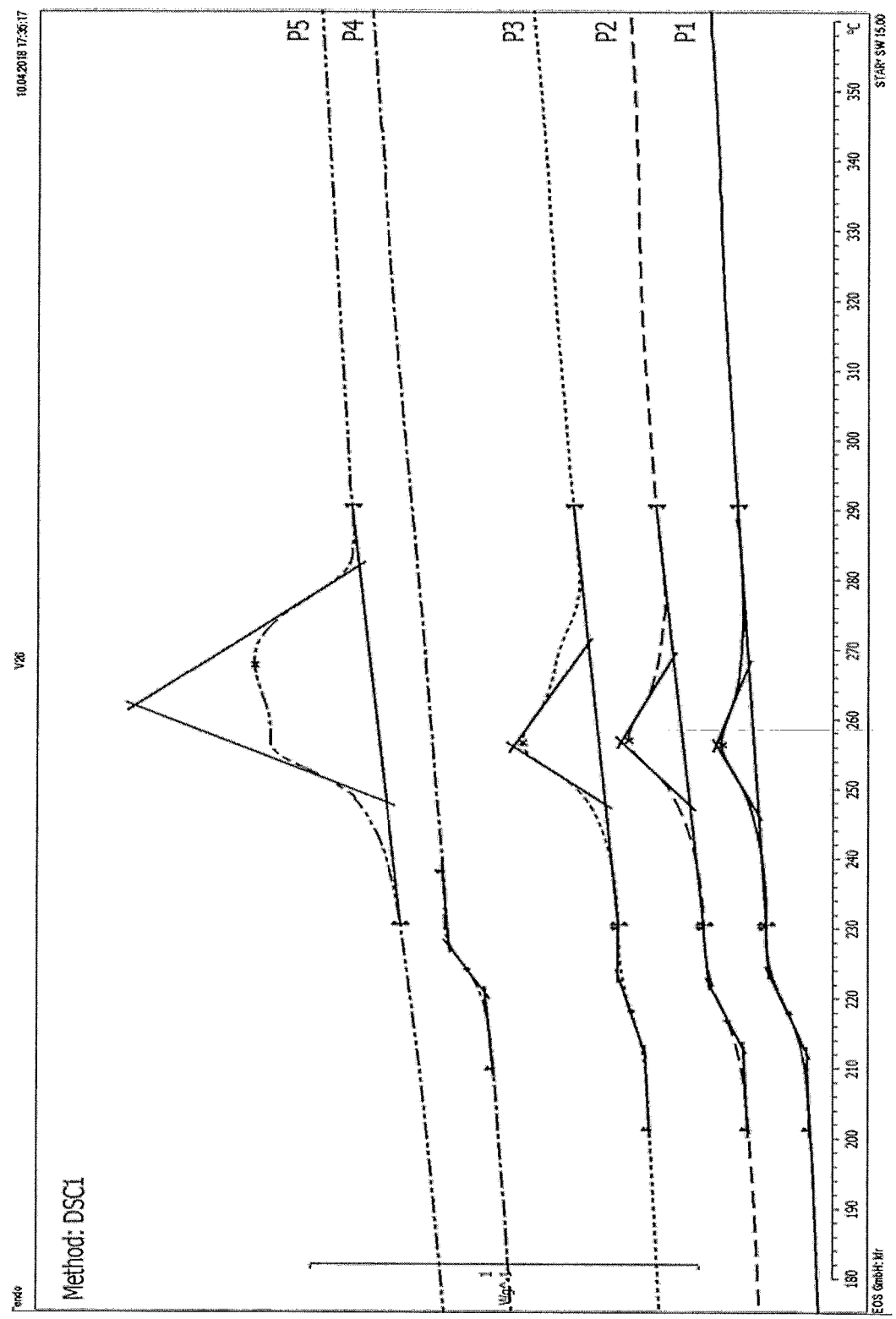
FIG. 25 shows DSC curves with polymer powders of the example series V26.

FIG. 25 shows the first heating run (segment 2) of the various products P1 to P5, measured using the DSC1 method. As expected, the amorphous ground granulate (product P4) is also amorphous in the powder state. Depending on the grinding parameters, an increased melting enthalpy can be observed in the grinding of the crystallized granulate, P1 to P3, in ascending order. The exact values can be found in Table 12. The powder P5 crystallized after amorphous grinding shows the highest melting enthalpy. A corresponding melting enthalpy and melting temperature can also be expected during the post-crystallization of the semi-crystalline ground powder.

Figure 23:
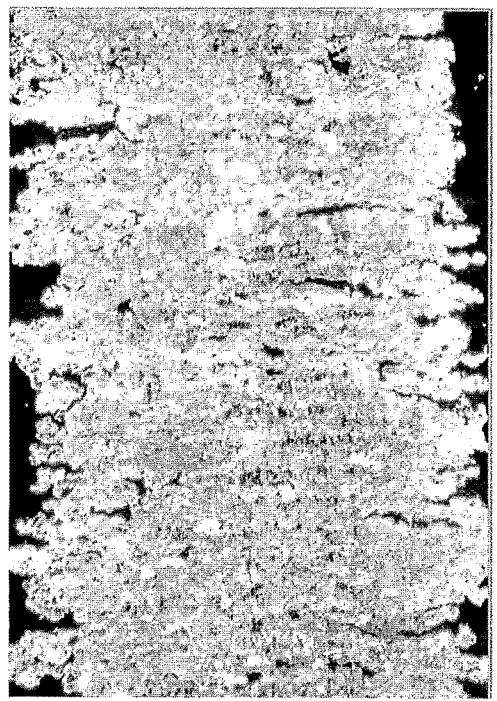
FIG. 23 shows a thin-film image of sample P4 from test series V26.

The different powdery polymer materials P1 to P5 obtained in this way were then used for a laser sintering process under otherwise identical conditions. The processing was carried out on a modified EOS P396 laser sintering machine from EOS GmbH—Electro Optical Systems. In particular, the following parameters were selected for processing:

Withdrawal chamber temperature: 180° C.
Process chamber temperature: upper processing temperature
Energy input during exposure with laser: 0.70 J/mm$^3$ The upper processing temperature was checked by checking the indentation of a drawn pair of tweezers in the powder bed at the appropriate temperature. If the tweezers do not sink into the powder bed and leave no (relevant) impression, the upper processing temperature is reached. Otherwise, the process chamber temperature is increased by 1-2° C., and after a defined number of layers, the powder bed is checked again until the expected effect occurs. At the upper processing temperature, there is also a homogeneous coating process during which there is no adhesion of the particles in the coater, as can be seen, for example, by the formation of stripes parallel to the coating direction within the new powder layer. The upper processing temperatures of the various products are also shown in Table 12. Block-shaped test specimens with the dimensions 20×4×16 (X×Y×Z) and modified tensile test specimens based on DIN EN ISO 527-2 type 1BB with a total length of 60 mm, a height of 2.5 mm and a width in the parallel specimen range of 4 mm in X orientation are produced. There is an obvious dependence of the maximum processing temperature on the enthalpy of the melt. A higher processing temperature is necessary in order to keep the required energy input by means of the laser radiation at a suitable level, on the one hand to obtain an economical processing process and on the other hand to achieve a complete melting of the powder with suitable bonding of the layers and the most possible pore-free solidification of the material without degrading the material. This relationship can be established by the tensile strength and elongation at break of laser-sintered specimens of the material as well as by thin sections of laser-sintered specimens. An exemplary thin section for the amorphously processed material P4 is shown in FIG. 23. The black areas within the white polymer matrix are air inclusions/pores which occur due to insufficient flow at too low a processing temperature. This is particularly noticeable by the unshapely shape of the inclusions of formed gas bubbles (round).

Figure 24:
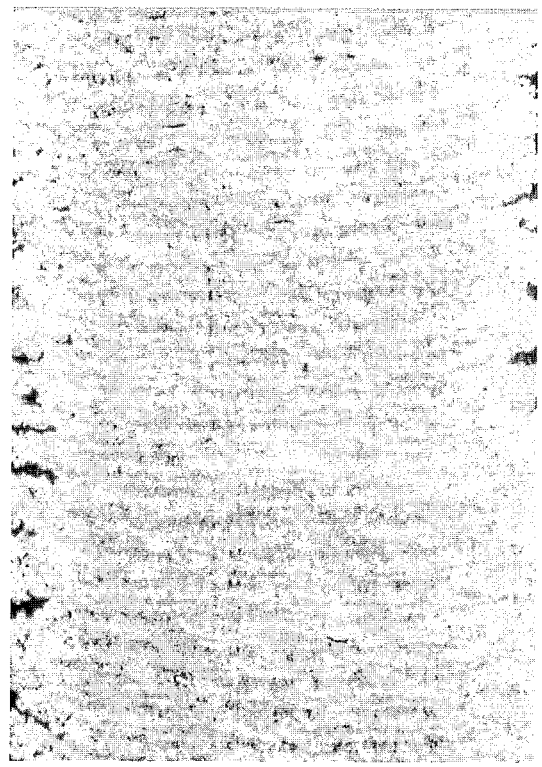
FIG. 24 shows a thin film image of sample P3—according to the invention—from test series V26.

In contrast, the invention material from the processing of P3 (FIG. 24) has significantly fewer inclusions. An examination of the tensile strengths in Table 12 also clearly shows that a higher processing temperature due to higher melting enthalpy has a beneficial effect on the component properties. However, it should also be noted that the melt viscosity determined in accordance with ISO 1133 for the material used was not in the preferred range at a test temperature of 360° C. and 5 kg load. A material with a lower viscosity but chemically identical structure, as marketed by Sabic under the name "Ultem® CRS5011", should exhibit further improved processing. For example, a melt viscosity of 5 cm³/10 min for CRS5001 and a melt viscosity of 16 cm³/10 min for CRS5011 were obtained for exemplary batches.

TABLE 12

| Example | $T_g$ [° C.] | $T_m$ [° C.] | $\Delta H_m$ [J/g] | Max. processing temperature* [° C.] | Tensile strength [MPa] |
|---|---|---|---|---|---|
| P1 | 217 | 256 | 3.6 | 254 | 16.9 |
| P2 | 217 | 256 | 6.2 | 258 | 22.3 |
| P3 | 217 | 256 | 9.8 | 262 | 24.5 |
| P4 | 223 | n/a | n/a | 252 | 13.5 |
| P5 | n/a | 268 | 23.8 | 266 | n/a |

*The maximum processing temperature at P1-P5 was determined by the pyrometer of the LS machine; due to the modification of the machine EOS P396 for applications >200° C. construction temperature with a reduction of installation space, this does not mean a quantitative value, but only a qualitative value.

Figure 26:
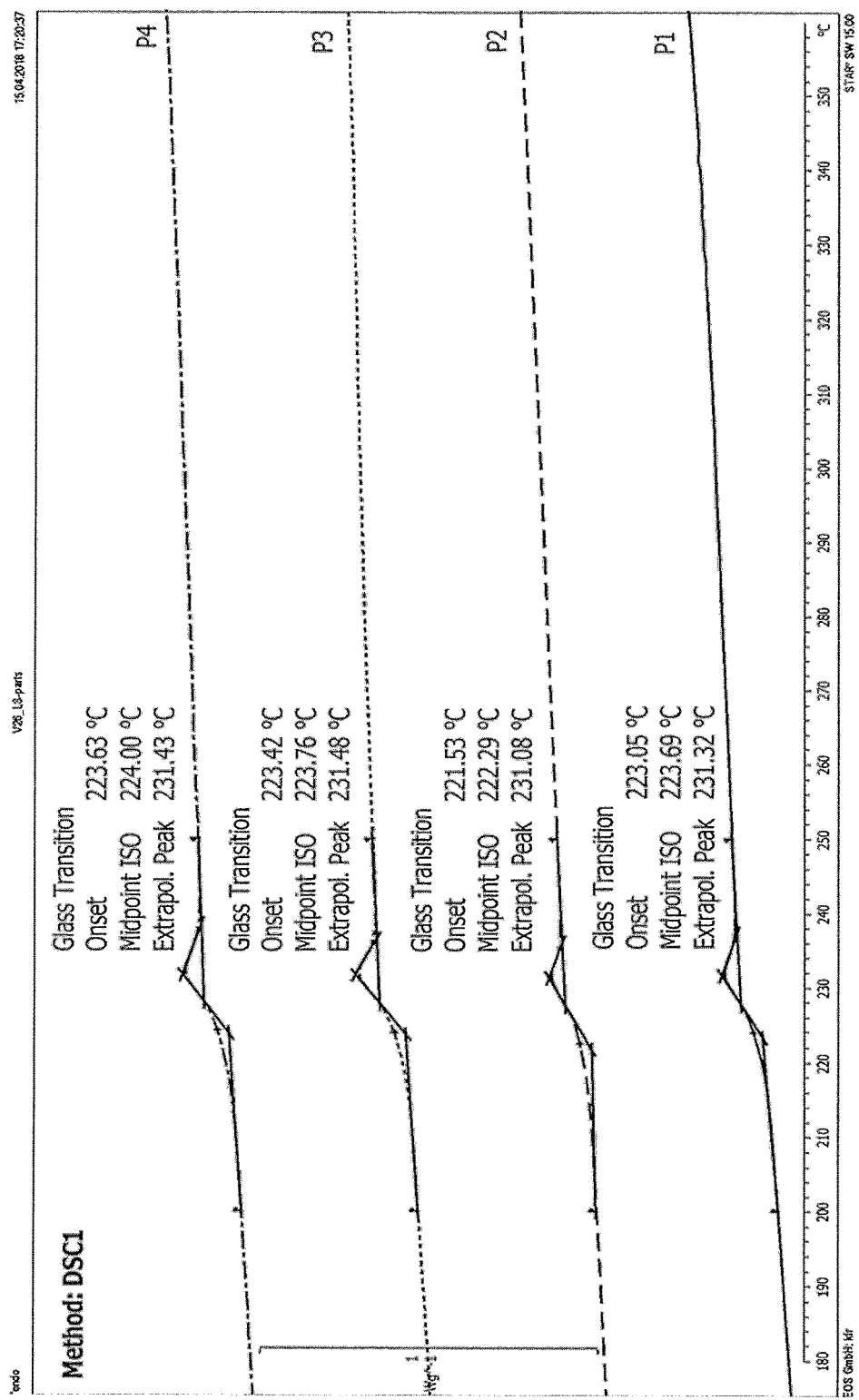
FIG. 26 shows DSC curves of built parts obtained with polymer powders from example series V26.

FIG. 26 shows the first heating run (segment 2) of the various components obtained from the products P1 to P5, measured using the DSC1 method. This makes it clear that the materials P1 to P5 solidify in amorphous form, independent of the initial crystallinity, i.e. that the materials are melt-amorphous.

The results show significantly better effects if the powdery material was produced according to the invention method or if the powdery material had the invention properties.

The invention claimed is:
1. A process for producing a three-dimensional object, the process comprising:
   selectively solidifying, layer-by-layer, a powdery material at locations corresponding to a cross-section of the object in a respective layer by exposure to electromagnetic radiation,
   wherein the powdery material comprises at least one polymer which is obtainable from its melt only in substantially amorphous or completely amorphous form, or a polyblend which is obtainable from its melt only in substantially amorphous or completely amorphous form;
   wherein the powdery material has a specific melting enthalpy of at least 1 J/g;
   wherein the powdery material has a powder distribution with (i) a d90 value of <150 μm and (ii) a mean particle size (d50 value) of at least 20 μm; and
   wherein the powdery material has a bulk density of at least 0.35 g/cm³.
2. The process according to claim 1,
   wherein the powdery material comprises at least one of polymers selected from the group consisting of polyetherimides, polycarbonates, polyphenylene sulfones, polyphenylene oxides, polyethersulfones, acrylonitrile-butadiene-styrene copolymers (ABS), acrylonitrile-styrene-acrylate copolymers (ASA), polyvinyl chloride, polyacrylates, polyesters, polyamides, polyaryletherketones, polyethers, polyurethanes, polyimides, polyamidimides, polysiloxanes, polyolefins and copolymers which comprise at least two different repeating units of the abovementioned polymers, and/or at least one polyblend based on the abovementioned polymers and/or copolymers.
3. The process according to claim 1,
   wherein the powdery material is preheated before being solidified by exposure to electromagnetic radiation; and
   wherein the processing temperature is
   (i) at least 10° C. above a glass transition temperature of the at least one polymer or copolymer or polyblend; and/or
   (ii) at most at the maximum processing temperature at which the powdery material refrains from sticking together.
4. The process according to claim 1, wherein the powdery material has additionally one or more of the following features:
   (iii) the mean particle size (d50 value) is at most 100 μm;
   (iv) the powdery polymer material has a sphericity greater than 0.8;
   (v) the powdery polymer material has a distribution width ((d90−d10)/d50) of less than 3;
   (vi) the powdery polymer material has a bulk density of at most 0.70 g/cm³,
   (vii) the powdery polymer material has a melt viscosity, determined by ISO-1133 at 5 kg load and a test temperature in a temperature range of 50-80° C. above the highest melting temperature, of at least 10 cm³/10 min and/or at most 150 cm³/10 min.
5. The process according to claim 1,
   wherein the powdery material has a polyetherimide content of at least 1% by weight and/or of at most 90% by weight,
   wherein the polyetherimide content respectively refers to a total content of polymers in the powdery material without taking additives and fillers into account, and
   wherein, in a case of the use of a polyetherimide- containing polyblend, a polyetherimide proportion by weight of a polyetherimide-containing polyblend is included in the polyetherimide content.

6. The process according to claim 1, wherein the powdery material comprises a polyetherimide selected from the group consisting of:

a polyetherimide having repeating units A according to a formula

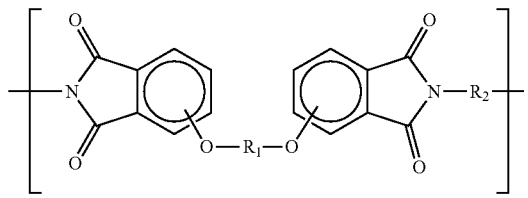

and repeating units B according to a formula

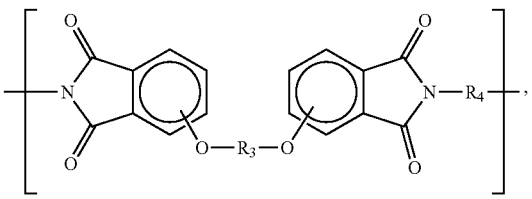

where a proportion of repeating units A and a proportion of repeating units B, respectively based on a total content of A and B, respectively is at least 1% and/or at most 99%, wherein $R_1$ and $R_3$ are moieties which are different from each other and which are independently selected from the group consisting of

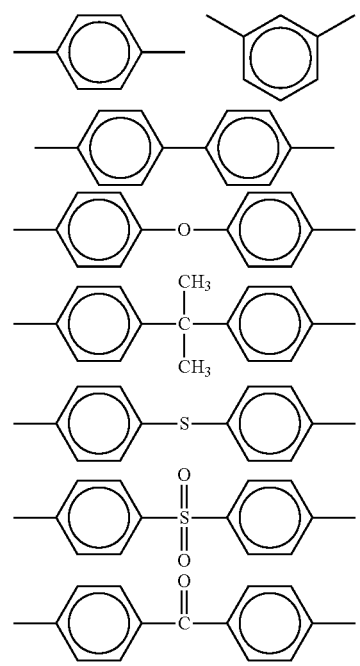

and wherein $R_2$ and $R_4$ are moieties which are different from each other and which are independent of each other and independent of $R_1$ and $R_3$ selected from the group consisting of

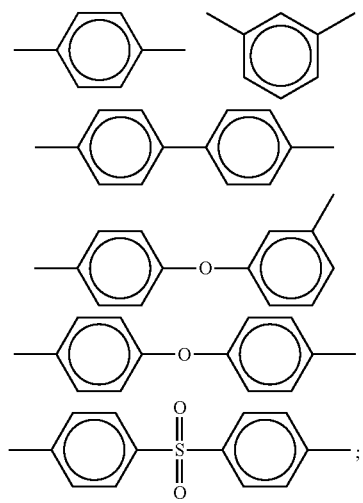

a polyetherimide having repeating units according to a formula

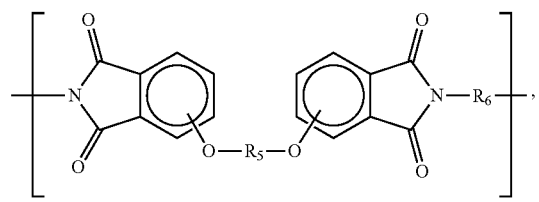

wherein $R_5$ is a moiety selected from the group consisting of

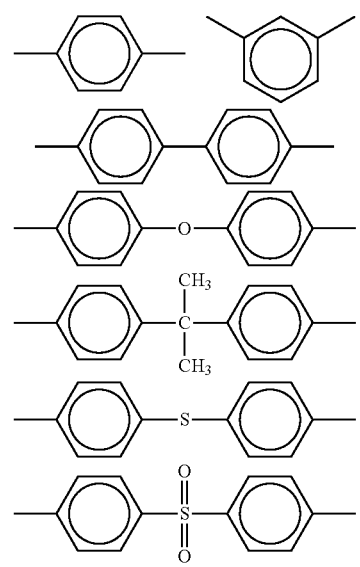

-continued

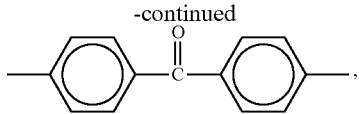

and wherein $R_6$ is a moiety independent of $R_5$ selected from the group consisting of

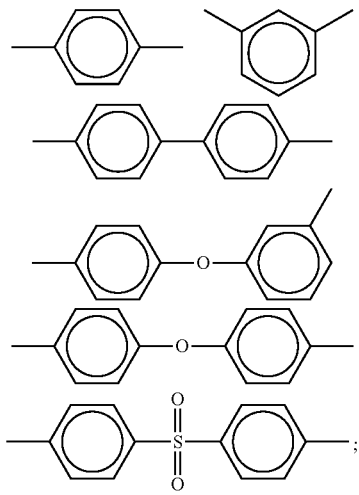

a polyetherimide having repeating units C according to a formula

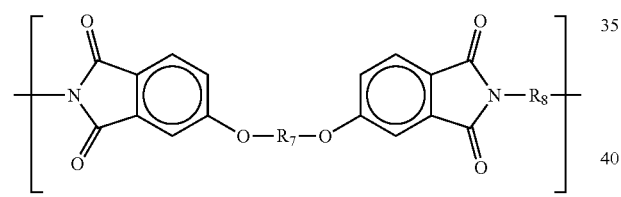

and repeating units D according to a formula

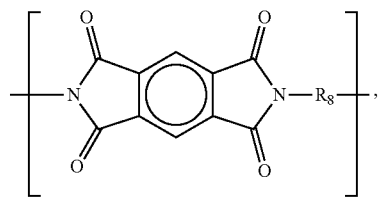

wherein a proportion of the repeating units C and a proportion of the repeating units D, respectively based on a total content of C and D, respectively is at least 1% and/or at most 99%, wherein $R_7$ is a moiety selected from the group consisting of

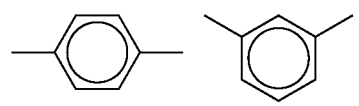

-continued

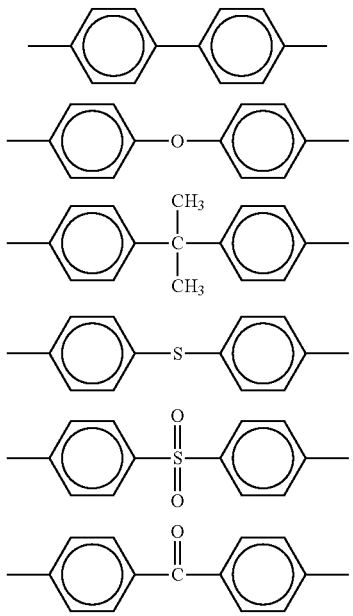

and wherein $R_8$ is a moiety independent of $R_7$ selected from the group consisting of

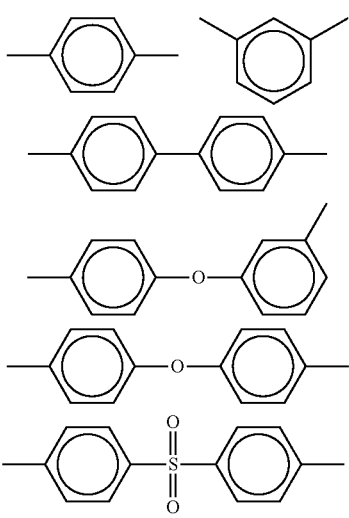

7. The process according to claim 1, wherein the powdery material comprises a polyetherimide having repeating units according to a formula

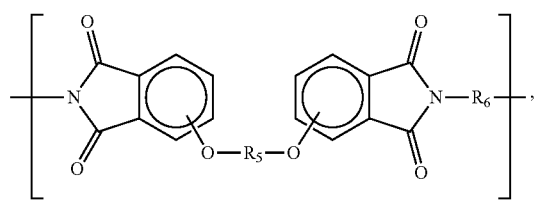

wherein $R_5$ is a moiety selected from the group consisting of
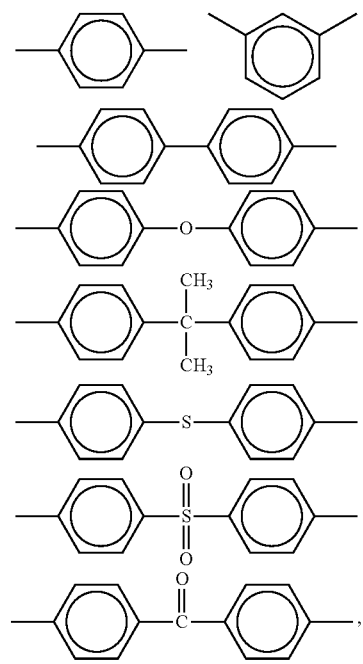
and wherein $R_6$ is a moiety independent of $R_5$ selected from the group consisting of
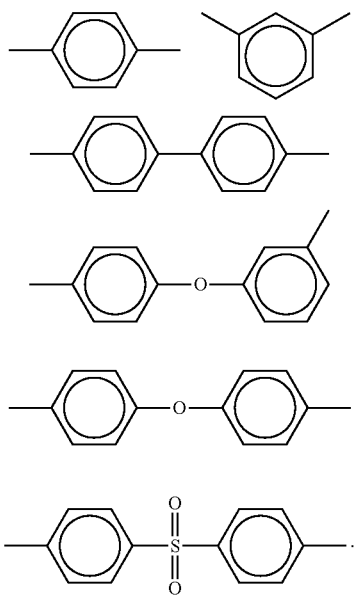
wherein the powdery material comprises polyetherimide having repeating units according to a formula
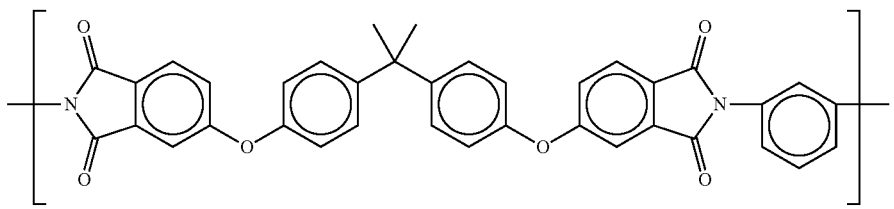
or repeating units according to a formula
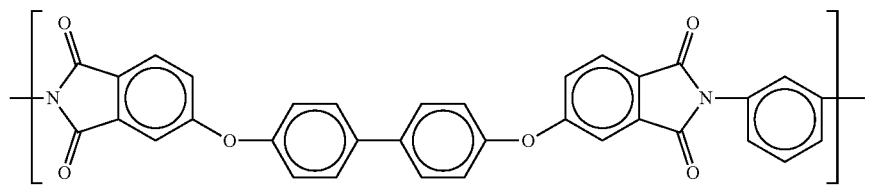
or repeating units according to a formula
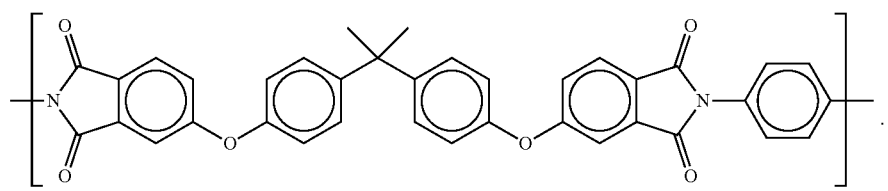

8. The process according to claim 1, wherein the powdery material comprises a polyetherimide-polysiloxane copolymer having repeating units E according to a formula

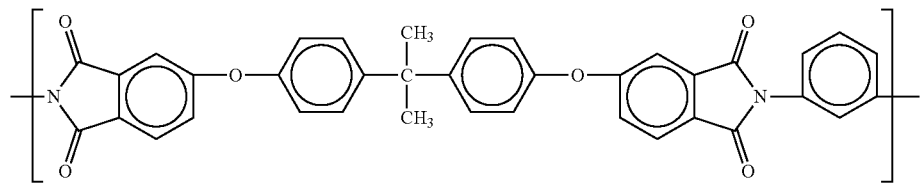

and repeating units F according to a formula

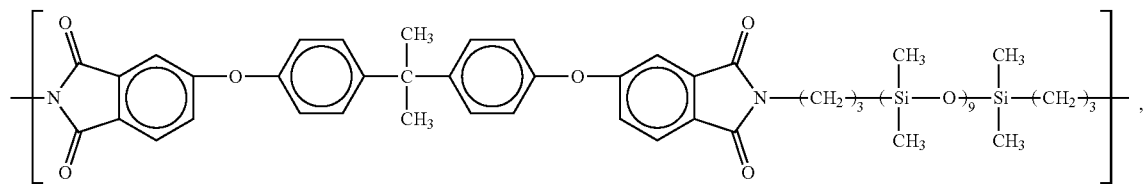

wherein a proportion of the repeating units E and the proportion of the repeating units F, respectively based on the total content of E and F, respectively is at least 1% and/or at most 99%.

9. The process according to claim 1, wherein the powdery material comprises polycarbonate having repeating units G according to a formula

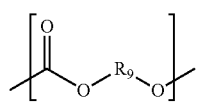

and repeating units H according to a formula

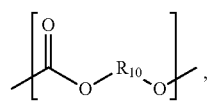

wherein $R_9$ and $R_{10}$ are moieties which are different from each other and which are independently selected from the group consisting of

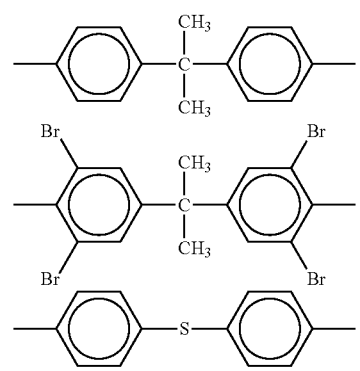

-continued

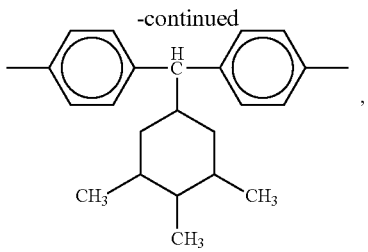

wherein a proportion of the repeating units G and a proportion of the repeating units H, respectively based on the total content of G and H, respectively is at least 1% and/or at most 99%.

10. The process according to claim 1, wherein the powdery material comprises polycarbonate having repeating units according to a formula

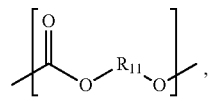

wherein $R_{11}$ is a moiety selected from the group consisting of

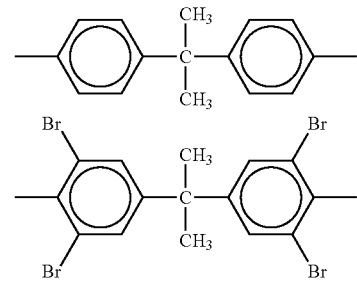

-continued

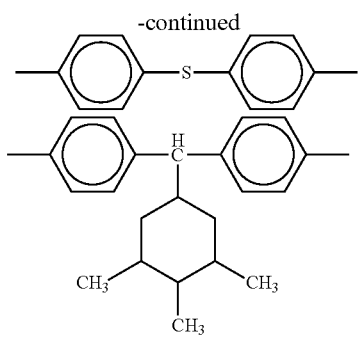

11. The process according to claim 1,
wherein the powdery material comprises
a copolymer having repeating units according to a formula

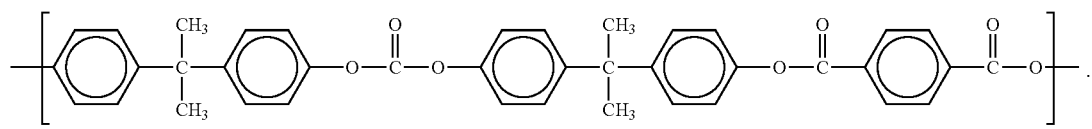

12. The process according to claim 1, wherein the specific melting enthalpy of the powdery material is at least 2 J/g.

13. The process according to claim 1, wherein the powdery material additionally comprises an additive, selected from the group consisting of polysiloxanes, heat stabilizers, oxidation stabilizers, UV stabilizers, fillers, reinforcing fibers, flame retardants, coloring agents, IR absorbers, and flow additives, and mixtures thereof.

14. The process according to claim 1,
wherein the three-dimensional object is produced so as to have at least substantially amorphous or completely amorphous regions; and/or
wherein the three-dimensional object is at least partially composed of a composite material and is produced so that the matrix of the composite material has at least substantially amorphous or completely amorphous regions.

15. The process according to claim 1,
wherein the three-dimensional object is produced to have an xy-shrinkage factor during its solidification of at most 2%.

16. The process according to claim 1,
wherein the powdery material previously had been produced by a process selected from any of the following Processes I to III:
Process I comprising the steps:
dissolving in a first organic solvent a polymer material comprising at least one polymer which is obtainable from its melt only in substantially amorphous or completely amorphous form so as to create a solution;
emulsifying the solution with a liquid having a lower vapor pressure than the first organic solvent, in the presence of an emulsion stabilizer;
precipitating particulate polymer by evaporation of at least part of the first organic solvent, or by extraction of the first organic solvent by a second organic solvent which is miscible with the first organic solvent and the liquid for emulsification, and evaporation of at least part of the first organic solvent; and
obtaining the powdery material;

Process II comprising the steps:
dissolving in an organic solvent a polymer material comprising at least one polymer which is obtainable from its melt only in substantially amorphous or completely amorphous form so as to create a solution;
precipitating particulate polymer by adding the solution to a liquid which does not itself crystallize and in which the organic solvent, in which the polymer material was dissolved, is partially or completely soluble and in which the at least one polymer is less soluble than in the organic solvent in which the polymer material was dissolved, and
obtaining the powdery material;
Process III comprising the steps:
bringing a polymer material comprising at least one polymer, which is obtainable from its melt only in substantially amorphous or completely amorphous form, into contact with a solvent which, at a first lower temperature does not dissolve the polymer at the first temperature, but which dissolves the polymer at a second temperature which is higher than the first lower temperature, so as to obtain a polymer-solvent mixture;
heating the polymer-solvent mixture while stirring to the second temperature or higher to dissolve the polymer in the solvent;
cooling to or below the first temperature with stirring, wherein the polymer precipitates and crystallizes; and
obtaining the powdery material.

17. The process according to claim 1,
wherein the powdery material previously had been produced by a process selected from Process A) or B):
Process A) comprising the steps:
crystallizing a particulate polymer material comprising at least one polymer, which is obtainable from its melt only in substantially amorphous form, by contacting the particulate polymer material in an organic non-solvent or partial solvent to swell the polymer, wherein the contacting is carried out with stirring for a sufficient time that the polymer material is crystallized,
separation of the non-solvent or partial solvent, and subsequently drying,
grinding for reducing the primary particle size of the crystallized powdery polymer material,
post-crystallization after grinding by tempering or by treatment with non-solvent or partial solvent and subsequent separation of the non-solvent or partial solvent, and
obtaining the powdery material;
Process B) comprising the steps:
producing crystalline or semi-crystalline particulate polymer by polymerizing monomers which are capable of making the polymer in a solvent, the solvent being for the monomers but is a non-solvent for the polymer and in which the polymer crystallizes to obtain a crystalline or semi-crystalline powder,
post-crystallization by tempering or by treatment with a non-solvent or a partial solvent, and
obtaining the powdery material.

18. The process according to claim 17,
wherein in Process A), prior to the crystallization step, the particulate polymer material for forming amorphous polymer is carried out by melt based powder generation processes selected from melt dispersion, microgranulation and fiber spinning plus cutting;
or wherein in Process B) the degree of crystallization and/or a grain size distribution is obtained directly in the step of polymerization and crystallization, wherein the particle size distribution and/or the degree of crystallization in the polymerization is controlled by type of non-solvent, by a temperature profile, by a stirring rate, by a polymerization reaction rate and/or by a choice of monomers;
or wherein in Process B) a semi-crystalline coarse powder is obtained which is subsequently further comminuted by grinding into a desired grain size distribution.

19. The process according to claim 17, wherein the powdery material has been obtained in a final particle form and final particle size/size distribution without subjecting particulate polymer intermediate product or the powdery material to a primary particle size-reducing treatment.

20. The process according to claim 1,
wherein the powdery material previously had been produced by a process comprising the steps:
providing a polymer which is obtainable from its melt only in substantially amorphous or completely amorphous form,
spinning fibers from a melt or a solution of the polymer so as to obtain polymer fibers,
stretching the polymer fibers to produce semi-crystalline proportions,
comminution of the polymer fibers to powdery material.

21. The process according to claim 17, wherein the powdery material has been subjected to a tempering treatment below the highest melting point and above the highest glass transition temperature, after the powdery material is produced and before the powdery material is subjected to the production of the three-dimensional object;
and/or the powdery material has been subjected to a tempering treatment which leads to a formation of only one melting point in the presence of a plurality of melting points.

22. The process according to claim 1, wherein the polymer or the polyblend of the powdery material subjected to the process for producing the three-dimensional object previously had been obtained by spinning of the polymer or the polyblend from melt or from solution to make fibers of the polymer or the polyblend, stretching the fibers of the polymer or the polyblend for making semi-crystalline proportions, and diminution of the fibers into the powdery material.

23. The process according to claim 1, wherein the powdery material comprises a polyetherimide or a polyblend of polyetherimide and at least one other polymer.

24. A powdery material for additive manufacturing,
comprising at least one melt-amorphous polymer or melt-amorphous polyblend by being obtainable from its melt only in substantially amorphous or completely amorphous form,
wherein the powdery material has a specific melting enthalpy of at least 1 J/g;
wherein the powdery material has a powder distribution with (i) a d90 value of <150 μm and (ii) a mean particle size (d50 value) of at least 20 μm; and
wherein the powdery polymer material has a bulk density of at least 0.35 g/cm³ and/or at most 0.70 g/cm³,
wherein the powdery material comprises at least one of the polymers selected from the group consisting of polyetherimides, polycarbonates, polyphenylene sulfones, polyphenylene oxides, polyethersulfones, acrylonitrile-butadiene-styrene copolymers (ABS), acrylonitrile-styrene-acrylate copolymers (ASA), polyvinyl chloride, polyacrylates, polyesters, polyamides, polyaryletherketones, polyethers, polyurethanes, polyimides, polyamidimides, polysiloxanes, polyolefins and copolymers which comprise at least two different repeating units of the abovementioned polymers, and/or at least one polyblend based on the abovementioned polymers and copolymers.

25. The powdery material according to claim 24 comprising a polymer selected from the group consisting of
a polymer, copolymer or polyblend of a polyetherimide having repeating units according to a formula

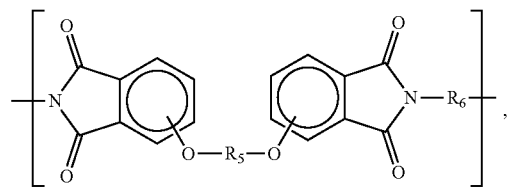

wherein $R_5$ is a moiety selected from the group consisting of

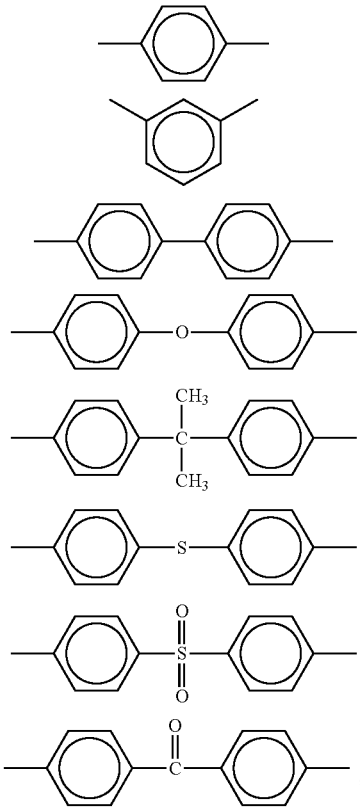

and
wherein $R_6$ is a moiety independently of $R_5$ selected from the group consisting of

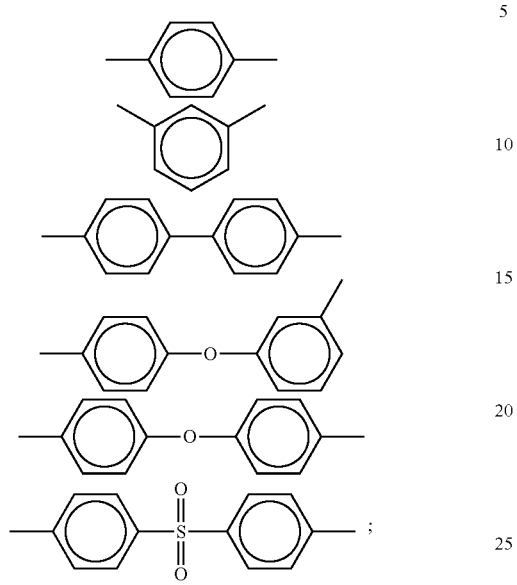

a polymer, copolymer or polyblend comprises repeating units according to a formula

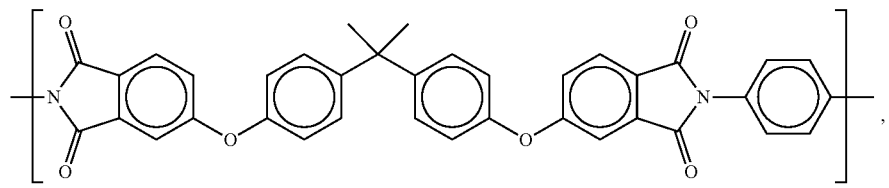

a polymer, copolymer or polyblend of a polyetherimide having a property selected from:
having a melting point of at least 260° C. and a specific melting enthalpy of at least 4 J/g,
having a bulk density of at least 0.40 g/cm' and/or at most 0.70 g/cm³,
having a grain size distribution defined as d90<150 μm and d50 of at least 30 μm and/or at most 70 μm,
having a sphericity of at least 0.8,
having a melt viscosity determined by ISO-1133 at 5 kg load and 360° C. test temperature of at least 10 cm³/10 min and/or at most 150 cm³/10 min.

26. A three-dimensional object obtained by selective layer-by-layer solidification of a powdery material as defined in claim 24.

27. The powdery material according to claim 24 having one or more of the following characteristics:
a mean particle size (d50 value) of at least 20 μm and/or of at most 100 μm;
a sphericity of at least 0.8;
a distribution width ((d90−d10)/d50) of less than 3.

28. The powdery material according to claim 24, having been obtained by spinning of the melt-amorphous polymer or the melt-amorphous polyblend from melt or from solution to make fibers of the polymer or the polyblend, stretching the fibers of the polymer or the polyblend for making semi-crystalline proportions, and diminution of the fibers into the powdery material, wherein the resulting powdery material has an aspect ratio of about 1.

* * * * *